(12) United States Patent
Amir et al.

(10) Patent No.: US 12,545,906 B2
(45) Date of Patent: *Feb. 10, 2026

(54) METHODS AND COMPOSITIONS FOR SELECTION OF FUNCTIONAL APTAMERS

(71) Applicant: Aummune Ltd., Tel Aviv-Jaffa (IL)

(72) Inventors: Yaniv Amir, Tel Aviv-Jaffa (IL); Almogit Abu-Horowitz, Herzliya (IL); Ido Bachelet, Tel Aviv-Jaffa (IL); Liron Anna Bassali, Milan (IT); Elinor Debby, Herzliya (IL); Liron Levy Efrati, Herzliya (IL); Erez Lavi, Yavne (IL); Omer Levy, Bat Yam (IL); Noam Mamet Kedem, Tel Aviv-Jaffa (IL); Anastasia Paz, Ashdod (IL); Neria Reiss, Dolev (IL); Itai Rusinek, Holon (IL); Ye'ela Scharff, Givatayim (IL); Nir Skalka, Rehovot (IL)

(73) Assignee: Aummune Ltd., Tel Aviv-Jaffa (IL)

( * ) Notice: Subject to any disclaimer, the term of this patent is extended or adjusted under 35 U.S.C. 154(b) by 1172 days.

This patent is subject to a terminal disclaimer.

(21) Appl. No.: 17/280,456

(22) PCT Filed: Sep. 27, 2019

(86) PCT No.: PCT/IB2019/001082
§ 371 (c)(1),
(2) Date: Mar. 26, 2021

(87) PCT Pub. No.: WO2020/065404
PCT Pub. Date: Apr. 2, 2020

(65) Prior Publication Data
US 2022/0112485 A1    Apr. 14, 2022

Related U.S. Application Data

(60) Provisional application No. 62/738,235, filed on Sep. 28, 2018.

(51) Int. Cl.
| | | |
|---|---|---|
| *C12N 15/10* | (2006.01) |
| *A61K 31/7088* | (2006.01) |
| *A61P 35/00* | (2006.01) |
| *C12N 15/113* | (2010.01) |
| *C12N 15/115* | (2010.01) |
| *C12Q 1/686* | (2018.01) |

(52) U.S. Cl.
CPC ...... *C12N 15/1058* (2013.01); *A61K 31/7088* (2013.01); *A61P 35/00* (2018.01); *C12N 15/1048* (2013.01); *C12N 15/1136* (2013.01); *C12N 15/1138* (2013.01); *C12N 15/115* (2013.01); *C12Q 1/686* (2013.01); *C12N 2310/16* (2013.01); *C12N 2320/13* (2013.01)

(58) Field of Classification Search
None
See application file for complete search history.

(56) References Cited

U.S. PATENT DOCUMENTS

2017/0233739 A1    8/2017   Richardson et al.

FOREIGN PATENT DOCUMENTS

| CN | 106164293 A | 11/2016 | |
|---|---|---|---|
| JP | 2017/527260 A | 9/2017 | |
| WO | WO-2009/090554 A2 | 7/2009 | |
| WO | WO-2014/088830 A2 | 6/2014 | |
| WO | WO-2015/077441 A2 | 5/2015 | |
| WO | WO-2017127762 A1 * | 7/2017 | ......... C12N 15/1034 |
| WO | WO-2018/178770 A2 | 10/2018 | |
| WO | WO-2020/065404 A2 | 4/2020 | |

OTHER PUBLICATIONS

Zhou et al. (2017, Nat. Rev. Drug Discov., vol. 16(3), pp. 181-202) (Year: 2017).*
Multivalent 4-1BB binding aptamers costimulate CD8+ T cells and inhibit tumor growth in mice; J Clin Invest 2008; 118(1):376-386. (Year: 2008).*
Multiparameter Particle Display (MPPD): A Quantitative Screening Method for the Discovery of Highly Specific Aptamers; Angew Chem Int Ed 2017; 56:744-747 (Year: 2017).*
International Search Report and Written Opinion for International Application No. PCT/IB2019/001082 mailed Mar. 20, 2020.
Kolovskaya et al., "DNA-Aptamer/Protein Interaction as a Cause of Apoptosis and Arrest of Proliferation in Ehrlich Ascites Adenocarcinoma Cells," Biochemistry (Moscow) Supplement Series A: Membrane and Cell Biology, 8: 60-72 (2014).
Mamet et al., "Discovery of tumoricidal DNA oligonucleotides by response-directed in vitro evolution," Communications Biology, 3(29): 1-9 (2020).

* cited by examiner

*Primary Examiner* — Juliet C Switzer
*Assistant Examiner* — Brian Ellis Young
(74) *Attorney, Agent, or Firm* — Foley Hoag LLP; Brendan T. Jones; Mi Cai

(57) ABSTRACT

The present disclosure describes compositions and methods for selection functional aptamers. In certain embodiments, provided herein are methods of using aptamer cluster-containing particles to identify functional aptamers from an aptamer library. In certain embodiments, provided herein are functionally enriched populations of aptamers. In certain embodiments, provided herein are methods for selecting an aptamer for use in personalized cancer treatment and methods for preparing a tumor delivery system. In certain embodiments, provide herein are compositions comprise the aptamer cluster-containing particles, target cells (e.g., cancer cells, immune cells, etc.) and/or a detectable indicator of cellular function (e.g., a fluorescent indicator of apoptosis, cell proliferation, gene or protein expression, etc.).

17 Claims, 14 Drawing Sheets

Specification includes a Sequence Listing.

A. HCT116

B. 4T1

C. CT26

D. Kasumi-1 (DilC(5) probe)

E. AML1

F. AML9

G. CLL1

SEQUENCE LISTING

```
<160> NUMBER OF SEQ ID NOS: 11

<210> SEQ ID NO 1
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 1
taagggtagc aatgcgttag tcgcttaaaa ttcgatttgc gcataacacc tcat         54

<210> SEQ ID NO 2
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 2
cacaagggca gtactctcga gattaatgtg tacatgcact cgcgaaatgt tgag         54

<210> SEQ ID NO 3
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
```

Synthetic oligonucleotide"

<400> SEQUENCE: 3
tgcgtagtat aaccgctaat caatcgtaca atgtaacctt gaccgcacac ggcc            54

<210> SEQ ID NO 4
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 4
cacacagcga cagcatagtc tcgtactggc ttaaaacatg aagttgcgat taat            54

<210> SEQ ID NO 5
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 5
aacaccgcta tctatcgtca tgtcaggcgt gtacttgact tacatctatt gacc            54

<210> SEQ ID NO 6
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 6
acatcacatt tgcctgcgat caagctaaca cgcatgatac catcatgatt aacc            54

<210> SEQ ID NO 7
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 7
ttgctgctcg gatcaggcaa gacgctaccc acaactcggt ttgtaagact acac            54

<210> SEQ ID NO 8
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 8
cggactcacg caagagcgtt tggcagtgta aaactgttta acgtatctgc tcgc            54

<210> SEQ ID NO 9
<211> LENGTH: 54

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 9
attgcgagat cactatgttt tagtctaggc tagcacgcta cttgggactg taga         54

<210> SEQ ID NO 10
<211> LENGTH: 54
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 10
cacgacgaga taccgtggtc ctttggacgc gaatgtcatt tagcacttag catt         54

<210> SEQ ID NO 11
<211> LENGTH: 28
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 11
actggtaccg ctacccgtat aaggtcaa                                      28
```

METHODS AND COMPOSITIONS FOR SELECTION OF FUNCTIONAL APTAMERS

RELATED APPLICATIONS

This application is a § 371 national-stage application based on PCT/IB2019/001082, filed Sep. 27, 2019, which claims the benefit of priority to U.S. Provisional Patent Application Ser. No. 62/738,235, filed Sep. 28, 2018, which is hereby incorporated by reference in its entirety.

SEQUENCE LISTING

The instant application contains a Sequence Listing which has been submitted electronically in ASCII format and is hereby incorporated by reference in its entirety. Said ASCII copy, created on Dec. 11, 2019, is named ANB-00425_SL.txt and is 3,135 bytes in size.

BACKGROUND

Aptamers are short, single-stranded nucleic acid oligomers or peptides that can bind to a specific target molecule. Aptamers are typically selected from a large random pool of candidates in an iterative process. More recently, aptamers have been successfully selected in cells, in-vivo and in-vitro.

The selection of aptamers, their structure-function relationship, and their mechanisms of action are all poorly-understood. Although more than 100 aptamer structures have been solved and reported, almost no recurring structural motifs have been identified.

A variety of different aptamer selection processes have been described for enriching aptamer libraries for aptamers capable of binding to a particular target. Certain of the binding aptamers identified from such binding-enriched pools have later been determined to be capable of mediating a functional effect on a cell. However, the fact that an aptamer binds to a cell does not mean that it will induce a desirable cellular function. For example, many aptamers that merely bind to a particular target cell will have no effect on that cell's function, or may induce a cell function completely different from the one that is desired. Moreover, functional aptamers that bind weakly to a target cell and/or that bind to antigens that are expressed at low levels on the surface of the target cell will not be enriched by conventional aptamer selection processes.

Thus, there is a great need in the art for compositions and methods that allow for the direct enrichment of aptamer libraries for aptamers that mediate a desired cellular function. Importantly, such methods and compositions would enable the direct identification of aptamers able to modulate a desirable functional effect on a target cell of interest, which would have a profound impact on aptamer therapeutics.

SUMMARY

Disclosed herein are compositions and methods that facilitate the direct enrichment of aptamer libraries for aptamers that induce a desirable cellular function. As disclosed herein, the methods provided herein enrich aptamer libraries for different aptamers sequences than conventional binding-based aptamer enrichment processes, resulting in the production of aptamer pools that are highly enriched for aptamers that induce a desired cellular function. This facilitates the identification of functional aptamers useful, for example, as aptamer therapeutics. Also provided herein are functionally enriched aptamer libraries produced according to the methods provided herein, as well as functional aptamers identified using the methods provided herein.

In certain aspects, provided herein are methods for generating a functionally enriched population of aptamers. In certain embodiments, the method comprises: (a) contacting target cells with a plurality of particles on which are immobilized a library of aptamer clusters ("aptamer cluster particles"), wherein at least a subset of the immobilized aptamer clusters bind to at least a subset of the target cells to form cell-aptamer cluster particle complexes; (b) incubating the cell-aptamer cluster particle complexes for a period of time sufficient for at least some of the target cells in the cell-aptamer cluster particle complexes to undergo a cell function; (c) detecting the cell-aptamer cluster particle complexes undergoing the cell function; (d) separating cell-aptamer cluster particle complexes comprising target cells undergoing the cell function detected in step (c) from other cell-aptamer cluster particle complexes; and (e) amplifying the aptamers in the separated cell-aptamer cluster particle complexes to generate a functionally enriched population of aptamers. In some embodiments, steps (c) and (d) are performed using a flow cytometer.

In some embodiments, the cell function is cell viability, cell death (e.g., apoptosis, non-programmed cell death), cell proliferation, gene expression (e.g., cytokine expression), cell morphology, cellular activation, phosphorylation, calcium mobilization, degranulation, cellular migration, or cellular differentiation.

In certain embodiments, the target cells are further contacted with a reporter of the cell function (e.g., a fluorescent reporter of the cell function) prior to and/or during step (b). In some embodiments, the target cell is contacted with the reporter of the cell function prior to, during, or after contacting the target cell with the aptamer cluster particles. In certain embodiments, the target cells are modified such that they express a reporter of the cell function (e.g., a fluorescent protein) when they undergo the cell function. In certain embodiments, the cell-aptamer cluster particle complexes undergoing the cell function are detected in step (c) by detecting the reporter of the cell function. In certain embodiments, the reporter of the cell function is a fluorescent dye. In some embodiments, the reporter of cell function is a luminescent dye. In some embodiments, the fluorescent and/or luminescent dye is a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, or a redox potential dye. In certain embodiments, the reporter of the cell function is an activation associated marker, an oxidative stress reporter, an immunogenic cell death marker, a necrosis marker, a marker for cell differentiation, an angiogenesis marker, an apoptosis marker, an autophagy marker, a cell viability marker, or a marker for ion concentrations. In certain embodiments, the target cells are not contacted with a reporter of cell function. In some embodiments, the cells undergoing the function are detected by changes in morphology and/or behavior.

In some embodiments, the method further comprises separating the aptamer cluster particles from the target cells in the cell-aptamer cluster particle complexes separated in step (d). In certain embodiments, the aptamer cluster particles in the cell-aptamer cluster particle complexes separated in step (d) via cell lysis and centrifugation.

In certain embodiments, the method further comprises dissociating the aptamers from the particles in the separated aptamer cluster particles. In some embodiments, the aptamers in the separated cell-aptamer cluster particles are isolated by HPLC purification prior to step (e). In some embodiments, the method further comprises identifying the enriched population of aptamers via sequencing after the step (e).

In some embodiments, the method further comprises generating the aptamer cluster particles prior to step (a). In certain embodiments, the step of generating the aptamer cluster particles comprises: (1) immobilizing a plurality of aptamers from an aptamer library on particle surfaces; and (2) amplifying the plurality of immobilized aptamers locally on the particle surfaces to form the aptamer cluster particles. In some embodiments, the plurality of immobilized aptamers are amplified in step (2) using emulsion PCR.

In some embodiments, the method further comprises step (f): (i) forming aptamer cluster particles from the functionally enriched population of aptamers of step (e); and (ii) repeating steps (a)-(e) using the newly formed aptamer cluster particles to generate a further functionally enriched population of aptamers. In some embodiments, step (f) is repeated at least 2 times, at least 3 times, at least 4 times, at least 5 times, at least 6 times, at least 7 times, or at least 8 times. In some embodiments, the further enriched population of aptamers of step (f) has decreased sequence diversity compared to the library of aptamer clusters of step (a) by, for example, a factor of at least 1.1, 1.2, 1.3, 1.4, 1.5, 1.6, 1.7, 1.8, 1.9, 2.0, 2.1, 2.2, 2.3, 2.4, or 2.5. In some embodiments, each round of step (f) enriches the population of aptamers for aptamers that modulate the cellular function by, for example, a factor of at least 1.1, 1.2, 1.3, 1.4, 1.5, 1.6, 1.7, 1.8, 1.9, 2.0, 2.1, 2.2, 2.3, 2.4, or 2.5.

In certain embodiments, step (f) further comprises applying a restrictive condition in the successive rounds of enrichment. In some embodiments, the restrictive condition is selected from: (i) reducing the total number of particles, (ii) reducing copy number of aptamers per particle, (iii) reducing the total number of target cells, and/or (iv) reducing the incubation period. In some embodiments, the method comprises introducing errors to the aptamer sequences by amplifying the population of aptamers using error-prone polymerase.

In some embodiments, the aptamers in the aptamer clusters comprise an unexposed single stranded nucleic acids sequence with a molecular cap. In some embodiments, the aptamer clusters comprise aptamers comprising a region of conserved sequence and a region of randomized sequence. In some embodiments, the region of randomized sequence is exposed and the region of conserved sequence is capped. In certain embodiments, the aptamer clusters comprise aptamers comprising a chemical modification or a non-natural nucleotide. In some embodiments, the aptamer clusters comprise aptamers of DNA, RNA, or chemical modifications thereof. In some embodiments, the aptamer clusters are labeled with a fluorescent marker or an element for allowing visibility under a light microscope. In some embodiments, the element for allowing visibility under a light microscope is a nanoparticle.

In certain embodiments, at least 85% (e.g., at least 90%, or at least 95%) of the aptamer cluster particles used in the method individually comprise multiple copies of no more than 3 unique aptamer sequences. In certain embodiments, at least 70% (e.g., at least 75%, at least 80%, at least 85%, at least 90%, or at least 95%) of the aptamer cluster particles used in the method individually comprise multiple copies of no more than 2 unique aptamer sequences. In certain embodiments, at least 60% (e.g., at least 65%, at least 70%, or at least 75%) of the aptamer cluster particles used in the method individually comprise multiple copies no more than 1 unique aptamer sequence.

In some embodiments, the aptamer clusters comprise at least 2, 5, 10, 20, 30, 40, 50, 60, 70, 80, 90, 100, 200, 300, 400, 500, 600, 700, 800, 900, $10^3$, $10^4$, or $10^5$ identical aptamers. In certain embodiments, the library of aptamer clusters collectively comprises at least 100, 200, 300, 400, 500, 600, 700, 800, 900, $10^3$, $10^4$, $10^5$, $10^6$, $10^7$, $10^8$, $10^9$, $10^{10}$, $10^{11}$, $10^{12}$, $10^{13}$, $10^{14}$, $10^{15}$, or $10^{15}$ distinct aptamer sequences. In certain embodiments, the library of aptamer clusters comprises 100 to $10^{14}$ distinct aptamer sequences.

In certain embodiments, the particles in the aptamer cluster particles are selected from a polymer bead, an agarose bead, a polystyrene bead, an acrylamide bead, a solid core bead, a porous bead, a paramagnetic bead, glass bead, controlled pore bead, a microbead, and a nanoparticle. In certain embodiments, the particles have an average diameter of between about 3 nm to about 30 μm (e.g., about 25 nm and about 30 μm) in at least one dimension. In certain embodiments, the particles have an average diameter of about 3 nm, 5 nm, 10 nm, 15 nm, 20 nm, 25 nm, 50 nm, 100 nm, 250 nm, 0.5 μm, 2 μm, 5 μm, 10 μm, 20 μm or 30 μm in at least one dimension.

In certain embodiments, the library of aptamer clusters comprise aptamers that were previously selected via one or more processes selected from the group consisting of binding cell SELEX, negative SELEX, and in vitro evolution. In some embodiments, the method further comprises enriching an initial library of aptamers for aptamers that bind to the target cell to generate a binding enriched population of aptamers and then using the binding enriched population of aptamers to generate the aptamer cluster particles of step (a). In some embodiments, the step of generating the aptamer cluster particles comprises: (1) immobilizing a plurality of aptamers from the binding enriched population of aptamers on particle surfaces; and (2) amplifying the plurality of immobilized aptamers locally on the particle surfaces to form the aptamer cluster particles. In certain embodiments, the initial library of aptamers are enriched by performing one or more rounds (e.g., 1 round, 2 rounds, 3 rounds, 4 rounds, 5 rounds) of binding cell SELEX. In some embodiments, the initial library is not enriched for binding aptamers prior to step (a).

In certain embodiments, the period of time in step (b) is substantial instantaneous. In certain embodiments, the period of time is from 1 microsecond to about 1 month. In certain embodiments, the period of time is from about 10 minutes to about 5 days. In certain embodiments, the period of time is at least 10 minutes, 15 minutes, 20 minutes, 25 minutes, 30 minutes, 35 minutes, 40 minutes, 45 minutes, 50 minutes, 55 minutes, 1 hour, 2 hours, 3 hours, 4 hours, 5 hours, 6 hours, 7 hours, 8 hours, 9 hours, 10 hours, 11 hours, or 12 hours. In certain embodiments, the period of time is no more than 15 minutes, 20 minutes, 25 minutes, 30 minutes, 35 minutes, 40 minutes, 45 minutes, 50 minutes, 55 minutes, 1 hour, 2 hours, 3 hours, 4 hours, 5 hours, 6 hours, 7 hours, 8 hours, 9 hours, 10 hours, 11 hours, or 12 hours. In some embodiments, the period of time is from about 10 minutes to about 1 month. In certain embodiments, the period of time is from about 1 hour to about 24 hours. In some embodiments, the period of time is from about 1 hour to about 2 hours. In some embodiments, the period of time is from about 1.5 hours to about 24 hours. In certain embodiments, the period of time is from about 1.5 hours to about 2 hours.

In certain embodiments the target cell is a prokaryotic cell. In some embodiments, the prokaryotic cell is a bacterium. In certain embodiments, the bacterium is a pathogenic bacterium.

In some embodiments, the target cell is a eukaryotic cell. In certain embodiments, the eukaryotic cell is a mammalian cell. In some embodiments, the mammalian cell is a cancer cell or an immune cell. In certain embodiments, the mammalian cell is a patient-derived cell. In some embodiments, the patient-derived cell is a patient-derived cancer cell or a patient-derived immune cell.

In some embodiments, the target cell is a cancer cell (e.g., a patient derived cancer cell). In certain embodiments when the target cell is a cancer cell, the cell function is cell death and/or apoptosis. In some embodiments when the target cell is a cancer cell, the cell function is a modulation (e.g., an inhibition) of the expression of a ligand of an immune checkpoint protein (e.g., PD-L1, PD-L2).

In certain embodiments, the target cell is an immune cell (e.g., a T cell (such as a helper T cell, a cytotoxic T cell, an regulatory T cell), a B cell, a macrophage, a dendritic cell). In some embodiments when the target cell is an immune cell, the cell function is a modulation (e.g., enhancement or suppression) of the expression of an immune protein (e.g., a cell surface immune protein, such as an immune checkpoint protein (e.g., PD-1, CTLA-4, immune activation markers)). In some embodiments, the immune protein is a cytokine (e.g., an inflammatory cytokine). In some embodiments when the target cell is an immune cell the function is cellular proliferation. In some embodiments when the target cell is an immune cell the function is cell death (e.g., apoptosis). In certain embodiments, the function is increased cytotoxicity by the immune cell.

In certain embodiments, the cell-aptamer cluster particle complexes, on average, comprise about 1 to about 6 particles per target cell. In certain embodiments, the cell-aptamer cluster particle complexes, on average, comprise about 2 to about 4 particles per target cell.

In certain embodiments, the plurality of cell-aptamer cluster particle complexes are incubated in a single reaction volume during step (b).

In some embodiments, the cell-aptamer cluster particle complexes are separated in step (d) via flow cytometry, florescent microscopy, optical tweezers, micropipettes, microfluid separation, micromanipulation, or isolated seeding.

In certain aspects, provided herein is a functionally enriched population of aptamers generated by a method provided herein. In certain embodiments, the aptamer population is characterized by a more than 1.1 fold functional enrichment (e.g., a more than 1.5-fold functional enrichment) compared to the aptamers in the library of aptamer clusters before enrichment. In some embodiments, the cell function is promoting cancer cell death or apoptosis. In certain embodiments, cell function is promotion of an immune response.

In certain aspects, provided herein is a method for selecting an aptamer for use in personalized cancer treatment comprising selecting at least one aptamer candidate that promotes cell death or apoptosis of patient-derived cancer cells from the functionally enriched population of aptamers provided herein. In certain embodiments, the method further comprises sequencing the selected aptamer. In some embodiments, the method further comprises the sequenced aptamer. In some embodiments, the aptamer had been sequenced prior to selection. In certain embodiments the selection process comprises a high throughput functional assay and an additional sequencing of the assay's results. In some embodiments, the data of all candidates is then analyzed (e.g., to detect the best functional candidates in the population).

In certain aspects, provided herein is a method for preparing a tumor delivery system comprising selecting at least one aptamer candidate that promotes cancer cell death or apoptosis from the population of functionally enriched aptamers provided herein and combining the at least one aptamer with a tumor treatment for tumor localized delivery.

In some aspects, provided herein is a method for selecting an aptamer for use in personalized cancer treatment comprising preparing a functionally enriched population of aptamers using a method provided herein and selecting at least one aptamer candidate that promotes cell death or apoptosis of patient-derived cancer cells from the functionally enriched population of aptamers. In some embodiments, the aptamer had been sequenced prior to selection. In some embodiments, the method further comprises sequencing the selected aptamer. In certain embodiments, the method further comprises synthesizing the sequenced aptamer.

In certain aspects, provided herein is a method of treating a cancer in a subject comprising (a) preparing a functionally enriched population of aptamers using a method provided herein using cancer cells from the subject as the target cells; (b) selecting at least one aptamer that promotes cell death or apoptosis of the cancer cells from the functionally enriched population of aptamers; and (c) administering the selected aptamer to the subject. In some embodiments, the method further comprises obtaining the cancer cells from the subject.

In certain aspects, provided herein is a composition comprising a plurality of particles on which are immobilized a library of aptamer clusters ("aptamer clusters particles), a target cell, and, optionally, a reporter of cell function.

In some embodiments, the reporter of cell function is a fluorescent reporter. In certain embodiments, the fluorescent reporter is a membrane integrity reporter. In some embodiments, the fluorescent reporter is a capsid integrity reporter. In some embodiments, the fluorescent reporter is a protein integrity reporter. In some embodiments, the fluorescent reporter is a protein denaturation reporter. In some embodiments, the fluorescent reporter is a cell death reporter. In some embodiments, the fluorescent reporter is a redox potential reporter.

In some embodiments, the composition comprises at least about 10, 100, $10^3$, $10^4$, $10^5$, $10^6$, $10^7$, or $10^8$ aptamer clusters. In some embodiments, the composition comprises $10^6$ to $10^{11}$ (e.g., $10^6$ to $10^9$) aptamer clusters. In certain embodiments, each aptamer cluster comprises at least about 10, 100, $10^3$, or $10^4$ copies of an aptamer. In certain embodiments, each aptamer cluster comprises about $10^4$ to $10^6$ copies of an aptamer.

In some embodiments, the aptamer clusters are labeled with a fluorescent marker. In some embodiments, the aptamer clusters are labeled with an element for allowing visibility under a light microscope. In certain embodiments, the element is a nanoparticle. In some embodiments, the aptamer clusters are labeled with an antisense strand. In certain embodiments, the antisense strand is displaced or removed upon binding of a target.

In some embodiments, the composition further comprises an enzyme. In certain embodiments, the enzyme is a ligase, a polymerase, a nuclease, an editing enzyme, and/or a restriction enzyme.

In certain embodiments of the compositions provided herein, the target cell is a prokaryotic cell. In some embodiments, the prokaryotic cell is a bacterium. In certain embodiments, the bacterium is a pathogenic bacterium.

In certain embodiments of the compositions provided herein, the target cell is a eukaryotic cell. In certain embodiments, the eukaryotic cell is a mammalian cell. In some embodiments, the mammalian cell is a cancer cell or an immune cell. In certain embodiments, the mammalian cell is a patient-derived cell. In some embodiments, the patient-derived cell is a patient-derived cancer cell or a patient-derived immune cell.

In certain embodiments of the compositions provided herein, the target cell is a cancer cell (e.g., a patient derived cancer cell). In certain embodiments when the target cell is a cancer cell, the cell function is cell death and/or apoptosis. In some embodiments when the target cell is a cancer cell, the cell function is a modulation (e.g., an inhibition) of the expression of a ligand of an immune checkpoint protein (e.g., PD-L1, PD-L2).

In certain embodiments of the compositions provided herein, the target cell is an immune cell (e.g., a T cell (such as a helper T cell, a cytotoxic T cell, an regulatory T cell), a B cell, a macrophage, a dendritic cell). In some embodiments when the target cell is an immune cell, the cell function is a modulation (e.g., enhancement or suppression) of the expression of an immune protein (e.g., a cell surface immune protein, such as an immune checkpoint protein (e.g., PD-1, CTLA-4, immune activation markers)). In some embodiments, the immune protein is a cytokine (e.g., an inflammatory cytokine). In some embodiments when the target cell is an immune cell the function is cellular proliferation. In some embodiments when the target cell is an immune cell the function is cell death (e.g., apoptosis).

In certain aspects, provided herein are methods for selecting a population of aptamers that modulate a cellular function. In some embodiments, the methods comprise: (i) incubating a library of labeled aptamer cluster particles (e.g., a bead, such as a microbead or a nanobead) with target cells in a single reaction volume under conditions and for a period of time to form cell-aptamer cluster particle complexes; (ii) partitioning the cell-aptamer cluster particle complexes having altered cellular function from the cell-aptamer cluster particle complexes without the desired effect, the free particles and the free cells; (iii) isolating the aptamer cluster particles from the cell-aptamer cluster particle complexes having altered cellular function; (iv) dissociating the aptamers from the particles; and (v) amplifying individual aptamer sequences to provide a functionally enriched population of aptamers. In certain embodiments, the methods further comprise a step of additional functional enrichment of the population of aptamers by repeating the steps (i)-(v) (e.g., repeating steps (i)-(v) at least 1, 2, 3, 4, 5 or more additional rounds). In certain embodiments, the step of additional functional enrichment of the population of aptamers involves applying a restrictive condition (e.g., reducing the total number of particles, reducing the copy number of aptamers per particle, reducing the total number of target cells, reducing the incubation period) in the successive rounds. In some embodiments, the functionally enriched population of aptamers has decreased sequence diversity relative to the plurality of aptamers from the incubating step by a factor of at least 2 (e.g., a factor of at least 3, 4, 5, 6, 7, 8 or 9). In certain embodiments, the enriched population of aptamers has decreased sequence diversity relative to the plurality of aptamers from the incubating step by a factor of at least 10, $10^2$, $10^3$, $10^4$, $10^5$, or $10^6$. In some embodiments, the population of aptamers of each additional round of screening is enriched by a factor of at least 1.1, 1.2, 1.3 1.4, 1.5, 1.6, 1.7, 1.8, 1.9, 2, or 3. In some embodiments, the number of rounds performed are at least 2 (e.g., at least 3, at least 4, at least 5, at least 6, at least 7, at least 8, at least 9, or at least 10). In certain embodiments, the methods further comprise a step of identifying the enriched population of aptamers via sequencing after the step (v). In certain embodiments, the methods further comprise providing a library of labeled aptamer cluster particles prior to step (i). In some embodiments, the library of aptamer cluster particles is prepared by a method comprising: (a) immobilizing a plurality of aptamers from an aptamer library on a particle surface; and (b) amplifying the plurality of immobilized aptamers locally on the particle surface to form the plurality of immobilized aptamer cluster particles.

In certain embodiments, the aptamer cluster particle comprises a cluster of exposed single stranded nucleic acids immobilized on the surface of a particle (e.g., a bead, such as a microbead or a nanobead). In some embodiments, the exposed single stranded nucleic acids are non-naturally occurring. In some embodiments, the aptamer cluster particle further comprises an unexposed single stranded nucleic acids sequence with a molecular cap. In some embodiments, the molecular caps, 3'cap and/or 5'cap is an oligonucleotide (e.g., 18 nucleotides in length) with sequence complementary to the specific PCR primer sequence. In some embodiments, the aptamer clusters are prepared using emulsion PCR. In some embodiments, each aptamer cluster particle comprises clusters of less than 10 (e.g., less than 7, less than 5, less than 3, or less than 2) different aptamers sequences. In some embodiments, each aptamer cluster particle comprises a unique aptamer sequence in multiple copies as clusters on the surface of the particle. In some embodiments, the aptamers are peptide aptamers.

In some embodiments, each aptamer cluster comprises at least 2 (e.g., at least 50) identical aptamers. In certain embodiments, the library of aptamer cluster particles includes 100 to $10^{14}$ distinct aptamers immobilized on the surface of the particles. In some embodiments, the library of aptamer cluster particles includes at least $10^8$ distinct aptamers immobilized on the surface of the particles. In some embodiments, the aptamer sequence comprises a region of conserved sequence and a region of randomized sequence. In some embodiments, the randomized sequence is exposed and the conserved sequence is capped.

In certain embodiments, the particle is selected from the group consisting of polymer bead, an agarose bead, a polystyrene bead, an acrylamide bead, a solid core bead, a porous bead, a paramagnetic bead, glass bead, controlled pore bead, a microbead and a nanoparticle. In some embodiments, the particles have an average diameter of about 25 nm, 50 nm, 100 nm, 250 nm, 0.5 µm, 2 µm, 5 µm, 10 µm, 20 µm or 30 µm. In some embodiment, the particles have at least one dimension of about 25 nm, 50 nm, 100 nm, 250 nm, 0.5 µm, 2 µm, 5 µm, 10 µm, 20 µm or 30 µm. In some embodiments, the aptamers are previously selected via one or more processes selected from the group consisting of Cell SELEX, negative SELEX, and in vitro evolution. In certain embodiments, the aptamer sequence comprises a chemical modification. In some embodiments, the aptamer is a single stranded nucleic acid (e.g., DNA, RNA, or chemically modifications thereof). In some embodiments, the aptamer is a single stranded nucleic acid hybridized to a partial-length complementary strand (e.g., the primer sequence of the aptamer is capped and the randomized sequence is single stranded). In some embodiments, the aptamer sequence comprises a non-natural nucleotide.

In certain embodiments, the period of time is sufficient to allow the aptamer cluster to provide an effect on the target cells. In some embodiments, the period of time is from about 10 minutes to about 5 days (e.g., from about 1.5 hours to about 24 hours, or from about 1.5 hours to about 2 hours).

In certain embodiments, the target cell is a whole cell having a natural epitope. In some embodiments, the target cell is a prokaryotic cell (e.g., bacterium). In some embodiments, the target cell is a eukaryotic cell (e.g., a mammalian cell, a cancer cell, an immune cell, or a patient-derived cell). In certain embodiments, the target cell is in a substantially native environment.

In some embodiments, the target cell is detectably labeled. In certain embodiments, the target cell is labeled with a detectable label prior to, during, and/or after incubating the library of labeled aptamer cluster particles with the target cell. In some embodiments, the detectable label is a fluorescent dye (e.g., a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, or a redox potential dye). In some embodiments, the detectable label is an activation associated marker, an oxidative stress reporter, an angiogenesis marker, an apoptosis marker, an autophagy marker, a cell viability marker, or a marker for ion concentrations. In some embodiments, the cellular function that is modulated is cell viability, apoptosis, cell proliferation, gene expression, cell morphology, cellular activation, phosphorylation, calcium mobilization, degranulation, cellular migration, or cellular differentiation. In some embodiments, the cellular function that is modulated is apoptosis. In certain embodiments, the cellular function that is modulated is apoptosis and the target cell is a cancer cell. In some other embodiments, the cellular function that is modulated is an immune function (e.g., immune cell activation, immune cell suppression, immune cell proliferation; cytokine expression, immune cell differentiation) and the target cell is an immune cell.

In certain embodiments, the cell-aptamer cluster particle complex comprises about 2 to 4 particles per target cell. In some embodiments, the aptamer cluster particle comprises about 1 to 6 clusters per particle. In some embodiments, the plurality of cell-aptamer cluster particle complexes are contained in a single reaction volume. In some embodiments, the partitioning step is by quantitating a signal from individual cells and then by physically partitioning the cell-aptamer cluster particle complexes having an altered cellular function (e.g., via flow cytometry, florescent microscopy, optical tweezers, micropipettes, microfluid separation, micromanipulation, or isolated seeding). In some embodiments, the aptamer cluster particle is isolated via cell lysis and centrifugation. In certain embodiments, aptamers are isolated by HPLC purification after being dissociated from the particles.

In certain aspects, provided herein are aptamers that induce apoptosis of cancer cells (e.g., triple-negative breast cancer cells). In certain embodiments, the aptamers comprise a sequence that is at least 90% (e.g., at least 91%, at least 92%, at least 93%, at least 94%, at least 95%, at least 96%, at least 97%, at least 98%, at least 99%, or 100%) identical to any one of SEQ ID NOs: 1-10. In certain embodiments, the aptamers are no more than 100, 90, 80, 70, 60, 59, 58, 57, 56, 55 or 54 nucleotides in length. In some embodiments, the aptamers comprise RNA, DNA and/or non-natural nucleotides. In some embodiments, the aptamers are chemically modified. In some embodiments, the aptamers are PEGylated. In certain embodiments, the aptamers induce apoptosis of triple-negative breast cancer cells (e.g., TNBC9) cells. In some embodiments, the aptamers consist of a sequence selected from one of SEQ ID NOs: 1-10.

In certain aspects, provided herein are pharmaceutical compositions comprising an aptamer provided herein. In some embodiments, provided herein are methods of treating cancer comprising the administration of a pharmaceutical composition provided herein. In certain embodiments, the cancer is breast cancer. In some embodiments, the cancer is triple-negative breast cancer.

BRIEF DESCRIPTION OF FIGURES

FIG. 2 discloses SEQ ID NO: 11.

corresponds to functional enrichment rounds. Functional enrichment was initiated from round #3 of Binding Cell-SELEX. The y-axis reflects the relative abundance of individual aptamers in logarithmic scale. The 10,000 most abundant aptamers in each Binding-Cell SELEX round are represented by black lines. The 10,000 most abundant aptamers in each Functional-Cell SELEX round are represented by blue lines. The 10 most abundant aptamers in each Binding-Cell SELEX round are represented by solid bold lines. The 10 most abundant aptamers in each functional enrichment round are represented by dashed lines. Panel A are the profiles from the assays performed on AML1 primary human myeloblasts. Panel B are the profiles from the assays performed on HCT116 colorectal cancer cell line.

Figure 9:
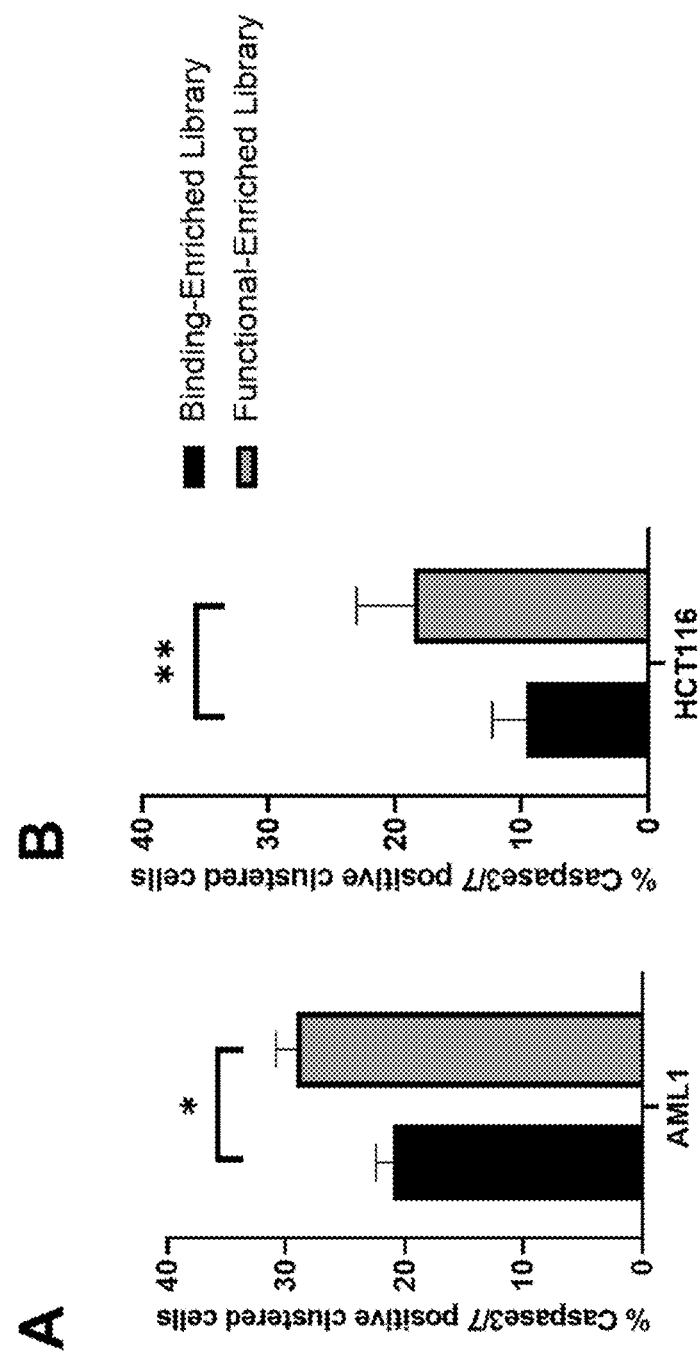

FIG. 9 is a comparison of caspase-3/7 activation after incubation of binding-enriched microbead clustered libraries or functionally-enriched clustered bead libraries with target cells. Percent of microbead-bound cells and caspase-3/7 positive cells were measured by flow cytometry. Panel A shows results after enriched-library incubation with AML1 target cells. Panel B shows results after enriched-library incubation with HCT116 target cells. Each data point was measured in 4 technical replicates and significance was calculated by Welch's one-way t-test.

Figure 10:
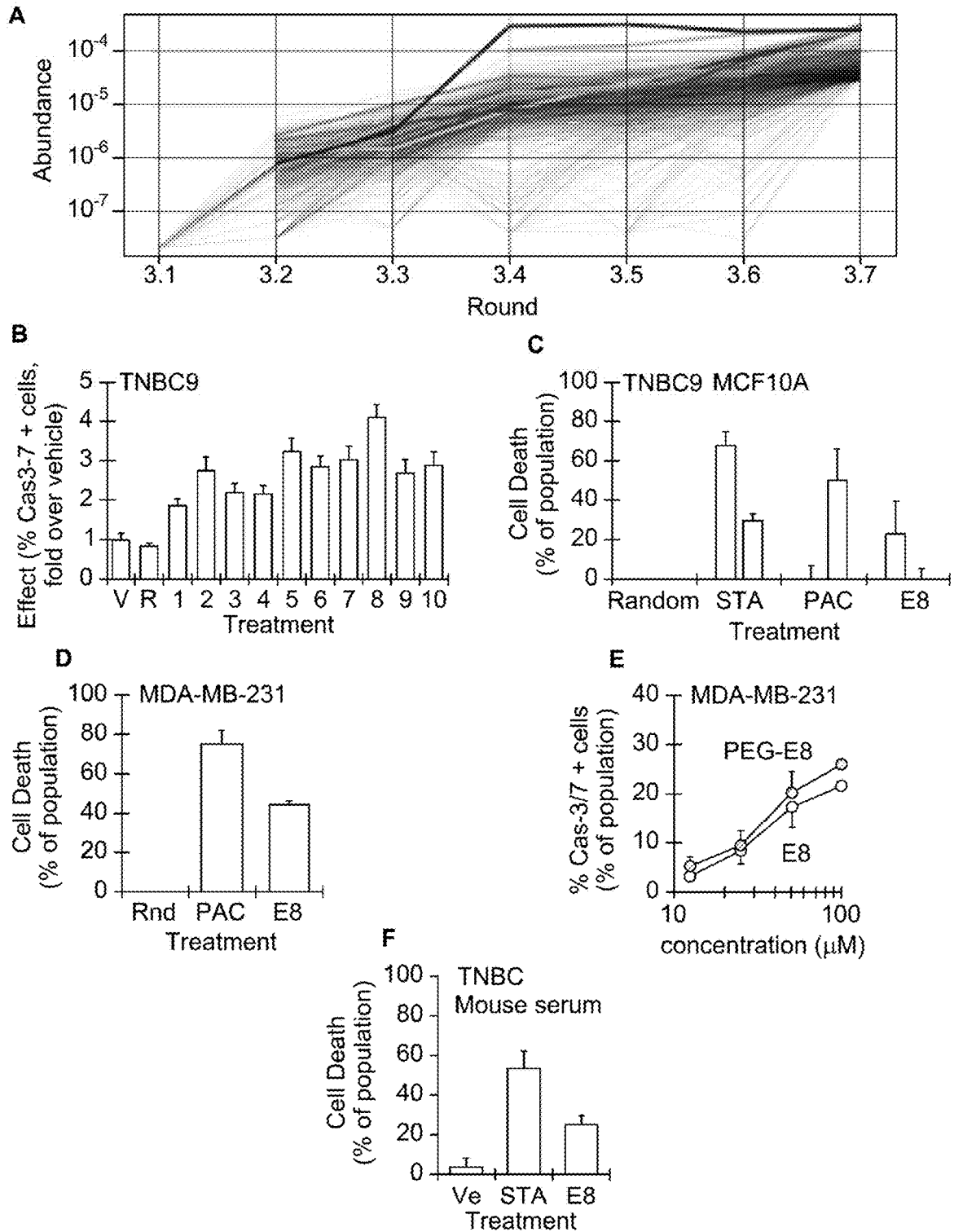

FIG. 10 shows results related to the identification of a lead aptamer candidate, E8, from a functionally-enriched tumoricidal aptamer library. Panel A shows a sequence abundance plot from multiple Functional SELEX rounds. The plot shows a random sample of 1,000 aptamer sequences out of the 10,000 most abundant aptamer sequences in each round. The 10 most abundant aptamer sequences are highlighted. Panel B is a representative screening of the 10 most abundant aptamers from Panel A for significant caspase-3/7 activation in comparison to vehicle (V) and random oligonucleotide (R) in TNBC9 cells. Aptamer IDs labeled 1-10 (E1, E2, . . . . E10). Panel C shows selectivity of aptamer candidate E8 to induce cell death in TNBC9 cells (blue) in comparison to negative MCF10A target cells (red). STA, staurosporine; PAC, paclitaxel; Random, random oligonucleotide. Panel D shows the effect of E8 on MDA-MB-231 cells. Panel E shows the dose-response curve of E8 and PEGylated-E8. Panel F shows the effect of E8 on TNBC cells in mouse serum.

Figure 11:
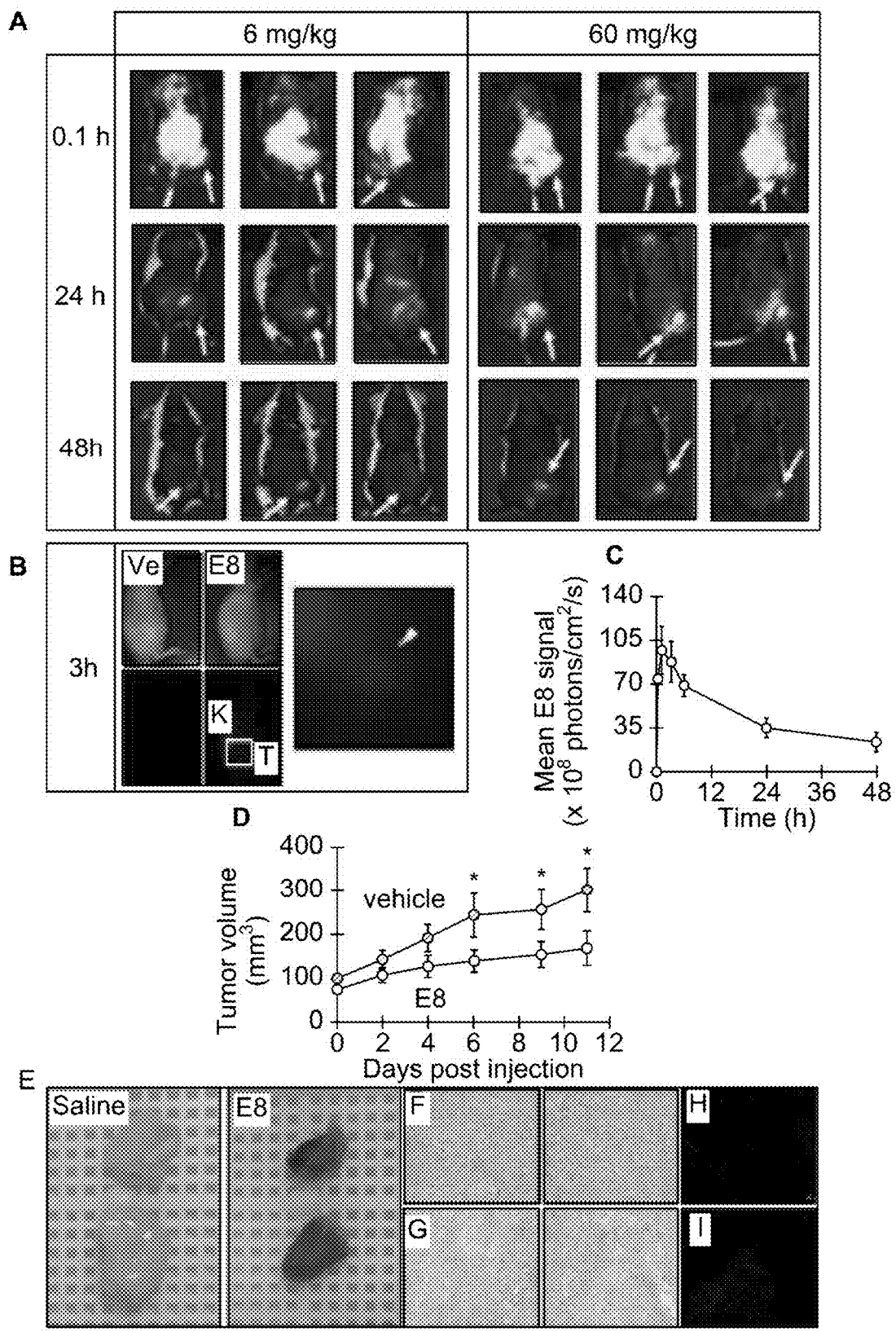

FIG. 11 provides results demonstrating the biodistribution and efficacy of E8 aptamer candidate in an animal model. Panel A shows fluorescence of E8 measured in-vivo at 0.1 h, 24 h, and 48 h after injection into NOD/SCID mice bearing MDA-MB-231-derived tumors. White arrows point to tumor locations. Panel B shows retention of E8 at tumor site 3 h after intravenous injection (Ve, vehicle, K, kidney; T, tumor). Inset region is shown magnified on the right, white arrowhead points to tumor site. Panel C shows a quantitative measurement of E8 fluorescent signal in tumors over a 48 h time period. Panel D shows the efficacy of E8 in reducing tumor volume of mice. Asterisks denote a statistically difference with $p<0.05$ (n=8 mice/group). Panel E shows representative photographs of tumors excised from mice sacrificed at day 11. Panel F-G show histochemical analysis of caspase-3 activity in tumor-derived tissue sections (Panel F, vehicle-treated; Panel G, E8-treated). Panel H-I show TUNEL analysis of tumor-derived tissue sections (H, vehicle-treated; I, E8-treated).

Figure 12:
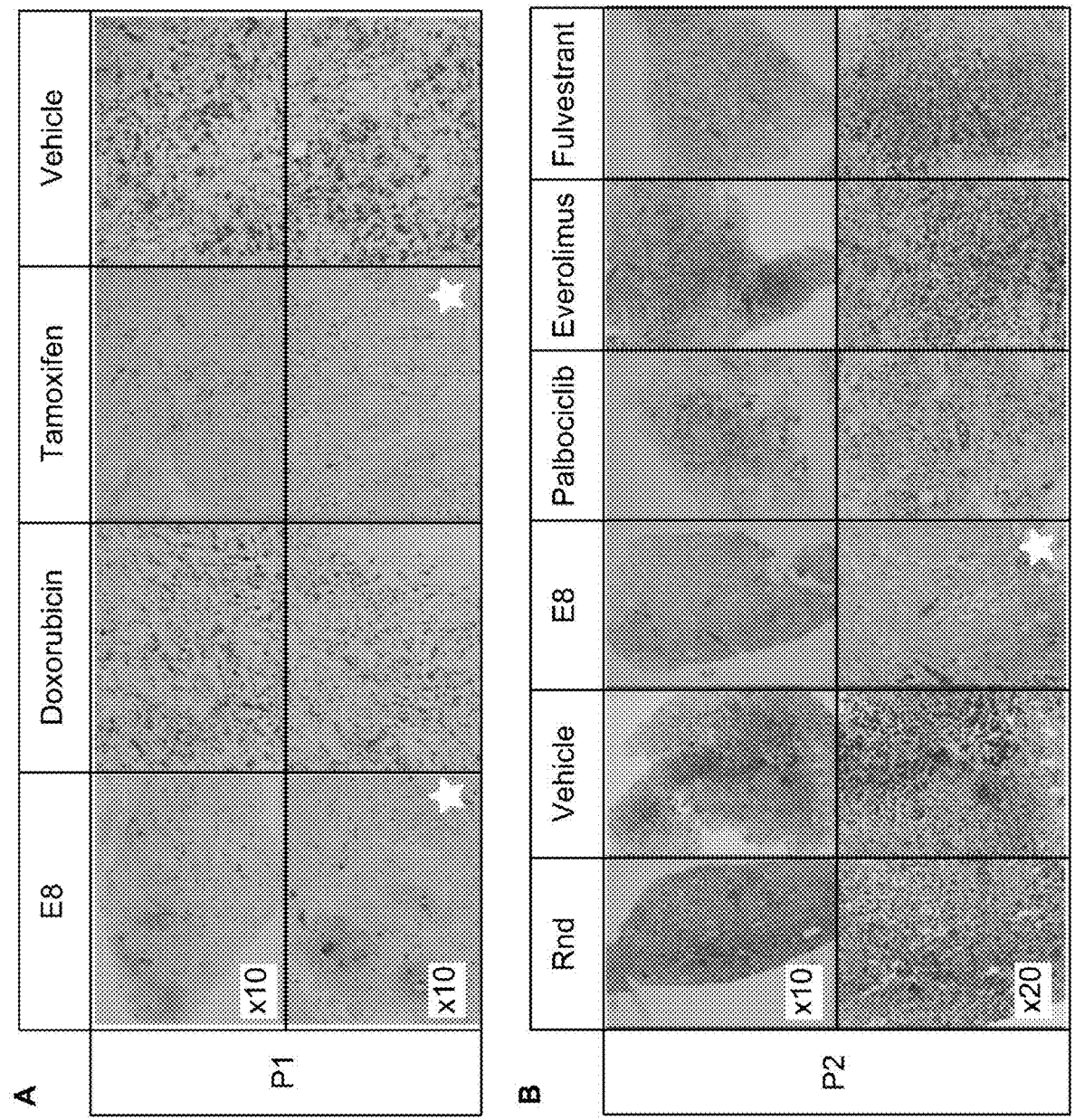

FIG. 12 are results demonstrating the efficacy of E8 in human ex-vivo organ cultures (EVOC). Panel A shows histological samples derived from patient 1 (P1). Panel B shows histological samples derived from patient 2 (P2). Graded pathological assessment was made on a scale of 0-4 by two blinded pathologists. White stars denote samples in which an effect reached a grade of at least 3. Rnd, random.

DETAILED DESCRIPTION

General

Provided herein are methods and composition related to the identification of aptamers that modulate a functional effect on a target cell. In certain embodiments, the methods comprise contacting the target cells to a plurality of aptamer clusters immobilized on a surface (e.g., the surface of a particle such as a bead, including a microbead, a nanobead). Thus, in some embodiments, the method comprises incubating a library of aptamer cluster particles with target cells in a single reaction volume under a condition and for a period of time to form cell-aptamer cluster particle complexes, and isolating and identifying the population of aptamers that modulate the cellular function.

In some embodiments, aptamers that functionally modulate a cellular function are identified by providing a detectable label indicative of the function being modulated (e.g., a fluorescent dye, such as a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, or a redox potential dye) to the target cells, and then by physical partitioning the cell-aptamer cluster particle complexes having altered cell function after measuring the signal of the detectable label. The physical partitioning can be via, for example, flow cytometry, florescent microscopy, optical tweezers, micropipettes, microfluid separation, micromanipulation, or isolated seeding. The aptamer cluster particles can then be isolated from the cell-aptamer cluster particle complexes, for example, via cell lysis and centrifugation. The individual aptamer sequences can be dissociated from the parties, amplified and sequenced.

In certain aspects, also provided herein are methods and compositions related to the creation of immobilized of aptamer clusters on a surface (e.g., a particle surface). In some embodiments, the aptamers (e.g., from an aptamer library disclosed herein) are immobilized on a particle. The particle can be made of any material. For example, in some embodiments, the particle is made of plastic, glass, polymer, or metal. In certain embodiments, the particle is a polymer bead, an agarose bead, a polystyrene bead, an acrylamide bead, a solid core bead, a porous bead, a paramagnetic bead, glass bead, controlled pore bead, a microbead or a nanoparticle. In some embodiments, the particles have at least one dimension of an average diameter of about 0.05, 0.1, 0.2, 0.3, 0.4, 0.5, 1, 1.5, 2, 2.5, 3, 3.5, 4, 4.5, 5, 7.5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 microns. In some embodiments, the particle is coated with a blocker, such as, a polymer, a protein, an oligo, a lipid, and/or a chemical group. In some embodiments, the particle contains an anchor of any length to bind the target cells at proximity to clusters. The anchor may be a polymer, a protein, an oligo, a lipid, and/or a chemical group. In some embodiments, a localized amplification process, such as emulsion PCR is then performed to generate aptamer clusters. The complementary strands can be stripped in order to generate single-stranded aptamer clusters. The aptamer cluster particles are then ready for use in an aptamer identification method provided herein.

Definitions

For convenience, certain terms employed in the specification, examples, and appended claims are collected here.

The articles "a" and "an" are used herein to refer to one or to more than one (e.g., to at least one) of the grammatical object of the article. By way of example, "an element" means one element or more than one element.

As used herein, the term "aptamer" refers to a short (e.g., less than 200 bases), single stranded nucleic acid molecule (ssDNA and/or ssRNA) able to specifically bind to a protein or peptide target or to a topographic feature on a target cell.

As used herein, the term "aptamer cluster" refers to a collection of locally immobilized aptamers (e.g., at least 10) of identical sequence.

The term "binding" or "interacting" refers to an association, which may be a stable association, between two molecules, e.g., between an aptamer and target, e.g., due to, for example, electrostatic, hydrophobic, ionic and/or hydrogen-bond interactions under physiological conditions.

As used herein, two nucleic acid sequences "complement" one another or are "complementary" to one another if they base pair one another at each position.

As used herein, the term "contacting" refers to the bringing together of two or more molecular entities such that they can interact with each other.

As used herein, two nucleic acid sequences "correspond" to one another if they are both complementary to the same nucleic acid sequence.

The term "modulation" or "modulate", when used in reference to a functional property or biological activity or process (e.g., enzyme activity or receptor binding), refers to the capacity to either up regulate (e.g., activate or stimulate), down regulate (e.g., inhibit or suppress) or otherwise change a quality of such property, activity, or process. In certain instances, such regulation may be contingent on the occurrence of a specific event, such as activation of a signal transduction pathway, and/or may be manifest only in particular cell types.

As used herein, "specific binding" refers to the ability of an aptamer to bind to a predetermined target. In certain embodiments, an aptamer specifically binds to the target with a $K_D$ that is significantly less (e.g., at least 2 fold less, at least 5 fold less, at least 10 fold less, at least 50 fold less, at least 100 fold less, at least 500 fold less, or at least 1000 fold less) than its $K_D$ for binding to a non-specific and unrelated target (e.g., BSA, casein, or an unrelated cell, such as an HEK 293 cell or an *E. coli* cell in cases where those cells were not the target of the process and were used as the negative target of the process). In some embodiments, an aptamer specifically binds to its target with an affinity corresponding to a $K_D$ of about $10^{-6}$ M or less, about $10^{-7}$ M or less, about $10^{-8}$ M or less, about $10^{-9}$ M or less, about $10^{-10}$ M or less, about 10-11 M or less, about $10^{-12}$ M or less, about $10^{-13}$ M or less, or about $10^{-14}$ M or less.

As used herein, the Tm or melting temperature of two oligonucleotides is the temperature at which 50% of the oligonucleotide/targets are bound and 50% of the oligonucleotide target molecules are not bound. Tm values of two oligonucleotides are oligonucleotide concentration dependent and are affected by the concentration of monovalent, divalent cations in a reaction mixture. Tm can be determined empirically or calculated using the nearest neighbor formula, as described in Santa Lucia, *J. PNAS (USA)* 95:1460-1465 (1998), which is hereby incorporated by reference.

The terms "polynucleotide" and "nucleic acid" are used herein interchangeably. They refer to a polymeric form of nucleotides of any length, either deoxyribonucleotides or ribonucleotides, or analogs thereof. Polynucleotides may have any three-dimensional structure, and may perform any function, known or unknown. The following are non-limiting examples of polynucleotides: coding or non-coding regions of a gene or gene fragment, loci (locus) defined from linkage analysis, exons, introns, messenger RNA (mRNA), transfer RNA, ribosomal RNA, ribozymes, cDNA, synthetic polynucleotides, recombinant polynucleotides, branched polynucleotides, plasmids, vectors, isolated DNA of any sequence, isolated RNA of any sequence, nucleic acid probes, and primers. A polynucleotide may comprise modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified, such as by conjugation with a labeling component.

Aptamer Libraries

In certain embodiments, the methods and compositions provided herein relate to the identification of aptamers having desired properties from among the aptamers present in an aptamer library. As used herein, an aptamer library is a collection of nucleic acid molecules (e.g., DNA and/or RNA) having distinct sequences (e.g., at least $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{-15}$ distinct sequences) and wherein at least a subset of the nucleic acid molecules is structured such that they are capable of specifically binding to a target protein, peptide, or cellular topographic feature. In some embodiments, any library of potential aptamers can be used in the methods and compositions provided herein.

In some embodiments, the aptamer library used in the methods and compositions provided herein comprises, consists of and/or consists essentially of nucleic acid molecules (e.g., DNA and/or RNA) having a sequence according to Formula (I):

$$P1\text{-}R\text{-}P2 \tag{I}$$

wherein P1 is a 5' primer site sequence of about 10 to 100 bases in length, about 10 to 50 bases in length, about 10 to 30 bases in length, about 15 to 50 bases in length or about 15 to 30 bases in length; P2 is a 3' primer site sequence of about 10 to 100 bases in length, about 10 to 50 bases in length, about 10 to 30 bases in length, about 15 to 50 bases in length or about 15 to 30 bases in length; and R is a sequence comprising randomly positioned bases of about at least 10, 15, 20, 25, 30, 35, 40, 45, 50, 55, 60, 65, 70, 75 or 80 bases in length and/or no more than about 1000, 900, 800, 700, 600, 500, 400, 300, 200, 150, 120, 115, 110, 105, 100, 95, 90, 85, 80, 75, 70, 65, 60, 55 or 50 bases in length.

In one embodiment, R is a sequence comprising about 25% A. In another embodiment, R is a sequence comprising about 25% T. In another embodiment, R is a sequence comprising about 25% G. In another embodiment, R is a sequence comprising about 25% C. In yet another embodiment, R is a sequence comprising about 25% A, about 25% T, about 25% G, and about 25% C.

In some embodiments, the aptamer library used in the methods and compositions provided herein comprises, consists of and/or consists essentially of nucleic acid molecules (DNA and/or RNA) having a sequence according to Formula (I):

$$P1\text{-}R''\text{-}P2 \tag{I}$$

wherein P1 is a 5' primer site sequence of about 10 to 100 bases in length, about 10 to 50 bases in length, about 10 to 30 bases in length, about 15 to 50 bases in length or about 15 to 30 bases in length; P2 is a 3' primer site sequence of about 10 to 100 bases in length, about 10 to 50 bases in length, about 10 to 30 bases in length, about 15 to 50 bases in length or about 15 to 30 bases in length; and R" is a sequence of about at least 10, 15, 20, 25, 30, 35, 40, 45, 50, 55, 60, 65, 70, 75 or 80 bases in length and/or no more than about 120, 115, 110, 105, 100, 95, 90, 85, 80, 75, 70, 65, 60, 55 or 50 bases in length comprising randomly positioned bases from a biased mixture or any combination of random strings with repetitive or biased strings.

Figure 4:
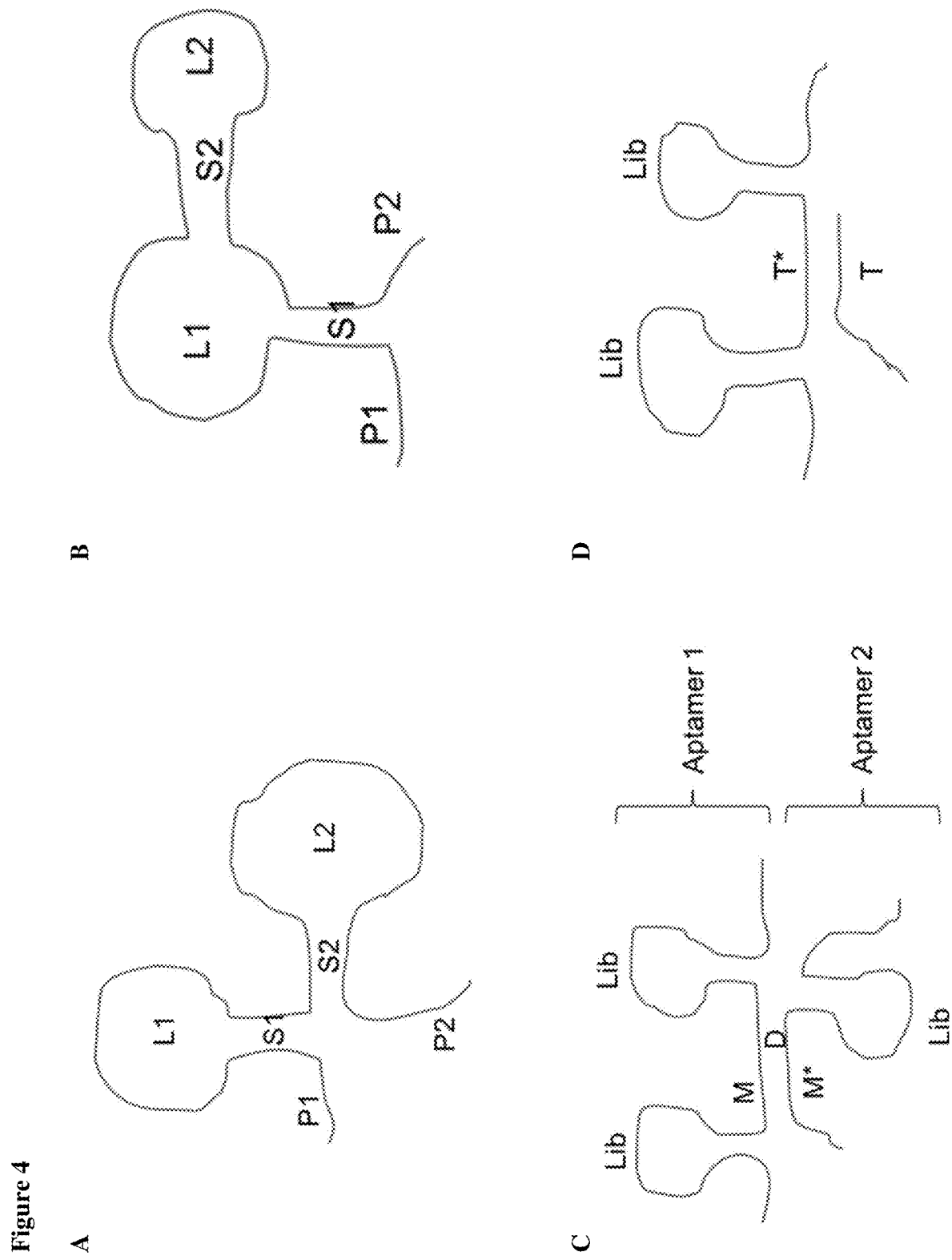
FIG. 4 is a schematic representation of certain aptamer structures according to certain exemplary embodiments provided herein.

In some embodiments, the aptamer library used in the methods and compositions provided herein comprises, consists of and/or consists essentially of nucleic acid molecules (DNA and/or RNA) having a sequence according to Formula II (an exemplary schematic representation is provided in FIG. 4A), $$P1\text{-}S1\text{-}L1\text{-}S1^{*}\text{-}S2\text{-}L2\text{-}S2^{*}\text{-}P2 \qquad (II),$$

wherein:

P1 is a 5' primer site sequence of about 10 to 100 bases in length, about 10 to 50 bases in length, about 10 to 30 bases in length, about 15 to 50 bases in length or about 15 to 30 bases in length; P2 is a 3' primer site sequence of about 10 to 100 bases in length, about 10 to 50 bases in length, about 10 to 30 bases in length, about 15 to 50 bases in length or about 15 to 30 bases in length; S1 and S2 are each independently a stem region sequence of at least one base (e.g., of about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length); S1* is a complementary sequence to S1; S2* is a complementary sequence to S2; L1 and L2 are each independently a Loop region sequence of at least one base (e.g., of about 1 to 50 bases in length or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 bases in length); and S1-L1-S1*-S2-L2-S2* is collectively about at least 10, 15, 20, 25, 30, 35, 40, 45, 50, 55, 60, 65, 70, 75 or 80 bases in length and/or no more than about 120, 115, 110, 105, 100, 95, 90, 85, 80, 75, 70, 65, 60, 55 or 50 bases in length.

In some embodiments, the aptamer library used in the methods and compositions provided herein comprises, consists of and/or consists essentially of nucleic acid molecules (DNA and/or RNA) having a sequence according Formula III (an exemplary schematic representation is provided in FIG. 4B):

$$P1\text{-}S1\text{-}L1\text{-}S2\text{-}L2\text{-}S2^{*}\text{-}L1\text{-}S1^{*}\text{-}P2 \qquad (III),$$

wherein:

P1 is a 5' primer site sequence of about 10 to 100 bases in length, about 10 to 50 bases in length, about 10 to 30 bases in length, about 15 to 50 bases in length or about 15 to 30 bases in length; P2 is a 3' primer site sequence of about 10 to 100 bases in length, about 10 to 50 bases in length, about 10 to 30 bases in length, about 15 to 50 bases in length or about 15 to 30 bases in length; S1 and S2 are each independently a stem region sequence of at least one base (e.g., of about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length); S1* is a complementary sequence to S1; S2* is a complementary sequence to S2;

L1 and L2 are each independently a Loop region sequence of at least one base (e.g., of about 1 to 50 bases in length or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 bases in length); and S1-L1-S2-L2-S2*-L1-S1* is collectively about at least 10, 15, 20, 25, 30, 35, 40, 45, 50, 55, 60, 65, 70, 75 or 80 bases in length and/or no more than about 120, 115, 110, 105, 100, 95, 90, 85, 80, 75, 70, 65, 60, 55 or 50 bases in length.

In some embodiments, the aptamer library used in the methods and compositions provided herein comprises, consists of and/or consists essentially of nucleic acid molecules (DNA and/or RNA) having a sequence according Formula IV (an exemplary schematic representation is provided in FIG. 4C):

$$P1\text{-}Lib\text{-}M1/M2\text{-}D\text{-}M1/M2^{*}\text{-}Lib\text{-}P2 \qquad (IV),$$

wherein:

P1 is a 5' primer site sequence of about 10 to 100 bases in length, about 10 to 50 bases in length, about 10 to 30 bases in length, about 15 to 50 bases in length or about 15 to 30 bases in length; P2 is a 3' primer site sequence of about 10 to 100 bases in length, about 10 to 50 bases in length, about 10 to 30 bases in length, about 15 to 50 bases in length or about 15 to 30 bases in length;

Lib is sequence having a formula selected from: (i) R; (ii) R"; (iii) S1-L1-S1*-S2-L2-S2*; and (iv) S1-L1-S2-L2-S2*-L1-S1*;

R is a sequence comprising randomly positioned bases of about at least 10, 15, 20, 25, 30, 35, 40, 45, 50, 55, 60, 65, 70, 75 or 80 bases in length and/or no more than about 1000, 900, 800, 700, 600, 500, 400, 300, 200, 150, 120, 115, 110, 105, 100, 95, 90, 85, 80, 75, 70, 65, 60, 55 or 50 bases in length;

R" is a sequence of about at least 10, 15, 20, 25, 30, 35, 40, 45, 50, 55, 60, 65, 70, 75 or 80 bases in length and/or no more than about 1000, 900, 800, 700, 600, 500, 400, 300, 200, 150, 120, 115, 110, 105, 100, 95, 90, 85, 80, 75, 70, 65, 60, 55 or 50 bases in length comprising randomly positioned bases from a biased mixture or any combination of random strings with repetitive or biased strings;

S1 and S2 are each independently a stem region sequence of at least one base (e.g., of about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length); S1* is a complementary sequence to S1; S2* is a complementary sequence to S2;

L1 and L2 are each independently a Loop region sequence of at least one base (e.g., of about 1 to 50 bases in length or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 bases in length);

wherein S1-L1-S1*-S2-L2-S2* is collectively about at least 10, 15, 20, 25, 30, 35, 40, 45, 50, 55, 60, 65, 70, 75 or 80 bases in length and/or no more than about 120, 115, 110, 105, 100, 95, 90, 85, 80, 75, 70, 65, 60, 55 or 50 bases in length;

D is a spacer sequence comprising at least one base (e.g., of about 1 to 20 bases in length or 1, 2, 3, 4, 5, 6, 7, 8, 9, 10, 11, 12, 13, 14, 15, 16, 17, 18, 19 or 20 bases in length);

M1 is a multimer-forming domain sequence of about 10 to 18 bases in length or 10, 11, 12, 13, 14, 15, 16, 17 or 18 bases in length that enables a strand of the sequence to interact with another strand that contains a complementary domain; and M2 is a complementary domain of M1 comprising a strand that interacts with a strand of the M1 sequence.

In some embodiments, the aptamer library used in the methods and compositions provided herein comprises, consists of and/or consists essentially of nucleic acid molecules (DNA and/or RNA) having a sequence according Formula V (an exemplary schematic representation is provided in FIG. 4D):

$$P1\text{-}Lib\text{-}T^*\text{-}Lib\text{-}P2 \qquad (V),$$

wherein:

P1 is a 5' primer site sequence of about 10 to 100 bases in length, about 10 to 50 bases in length, about 10 to 30 bases in length, about 15 to 50 bases in length or about 15 to 30 bases in length; P2 is a 3' primer site sequence of about 10 to 100 bases in length, about 10 to 50 bases in length, about 10 to 30 bases in length, about 15 to 50 bases in length or about 15 to 30 bases in length;

Lib is sequence having a formula selected from: (i) R; (ii) R"; (iii) S1-L1-S1*-S2-L2-S2*; and (iv) S1-L1-S2-L2-S2*-L1-S1*;

R is a sequence comprising randomly positioned bases of about at least 10, 15, 20, 25, 30, 35, 40, 45, 50, 55, 60, 65, 70, 75 or 80 bases in length and/or no more than about 1000, 900, 800, 700, 600, 500, 400, 300, 200, 150, 120, 115, 110, 105, 100, 95, 90, 85, 80, 75, 70, 65, 60, 55 or 50 bases in length;

R" is a sequence of about at least 10, 15, 20, 25, 30, 35, 40, 45, 50, 55, 60, 65, 70, 75 or 80 bases in length and/or no more than about 1000, 900, 800, 700, 600, 500, 400, 300, 200, 150, 120, 115, 110, 105, 100, 95, 90, 85, 80, 75, 70, 65, 60, 55 or 50 bases in length comprising randomly positioned bases from a biased mixture or any combination of random strings with repetitive or biased strings;

S1 and S2 are each independently a stem region sequence of at least one base (e.g., of about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length); S1* is a complementary sequence to S1; S2* is a complementary sequence to S2;

L1 and L2 are each independently a Loop region sequence of at least one base (e.g., of about 1 to 50 bases in length or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 bases in length);

wherein S1-L1-S1*-S2-L2-S2* is collectively about at least 10, 15, 20, 25, 30, 35, 40, 45, 50, 55, 60, 65, 70, 75 or 80 bases in length and/or no more than about 120, 115, 110, 105, 100, 95, 90, 85, 80, 75, 70, 65, 60, 55 or 50 bases in length;

T is a second strand bound by Watson/Crick or Hoogsteen base pairing to any part of the Lib sequence or T*, wherein the strand optionally contains unpaired domains on its 5' and 3' ends (e.g., to facilitate attachment of a functional moiety to the aptamer); and T* is a dedicated domain sequence (e.g., of about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length).

In some embodiments, the aptamer library used in the methods and compositions provided herein comprises, consists of and/or consists essentially of nucleic acid molecules (DNA and/or RNA) having a sequence according to a formula selected from:

P1-R-P1*, P1-S1-R-S1-P2, and P1-R-S1-R-S1-R-P2 wherein:

P1 is a 5' primer site sequence of about 10 to 100 bases in length, about 10 to 50 bases in length, about 10 to 30 bases in length, about 15 to 50 bases in length or about 15 to 30 bases in length; P2 is a 3' primer site sequence of about 10 to 100 bases in length, about 10 to 50 bases in length, about 10 to 30 bases in length, about 15 to 50 bases in length or about 15 to 30 bases in length; P1* is a complementary sequence to P1.

R is a sequence comprising randomly positioned bases of about at least 10, 15, 20, 25, 30, 35, 40, 45, 50, 55, 60, 65, 70, 75 or 80 bases in length and/or no more than about 1000, 900, 800, 700, 600, 500, 400, 300, 200, 150, 120, 115, 110, 105, 100, 95, 90, 85, 80, 75, 70, 65, 60, 55 or 50 bases in length;

S1 is a stem region sequence of at least one base (e.g., of about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length);

In some embodiments of the formulae above, R, P, or S comprises a CpG island and/or a G-quadruplex sequence.

In some embodiments of the Formulae above, R is randomly positioned bases from any random mixture (e.g., for canonical bases, 25% A, 25% T, 25% G, 25% C) of about at least 10, 15, 20, 25, 30, 35, 40, 45, 50, 55, 60, 65, 70, 75 or 80 bases in length and/or no more than about 120, 115, 110, 105, 100, 95, 90, 85, 80, 75, 70, 65, 60, 55 or 50 bases in length.

In one embodiment of the Formulae above, R is a sequence comprising about 25% A. In another embodiment, R is a sequence comprising about 25% T. In another embodiment, R is a sequence comprising about 25% G. In another embodiment, R is a sequence comprising about 25% C. In yet another embodiment, R is a sequence comprising about 25% A, about 25% T, about 25% G, and about 25% C.

In some embodiments of the Formulae above, R" is a sequence comprising comprises randomly positioned bases from a biased mixture (e.g., for canonical bases, any mixture deviating from 25% per base). In some embodiments, R" is a sequence that comprises about 0%, 5%, 10%, 15%, 20%, 25%, 30%, 35%, 40%, 45%, 50%, 55%, 60%, 65%, 70% or 75% A. In some embodiments, R" is a sequence that comprises about 0%, 5%, 10%, 15%, 20%, 25%, 30%, 35%, 40%, 45%, 50%, 55%, 60%, 65%, 70% or 75% T. In some embodiments, R" is a sequence that comprises about 0%, 5%, 10%, 15%, 20%, 25%, 30%, 35%, 40%, 45%, 50%, 55%, 60%, 65%, 70% or 75% C. In some embodiments, R" is a sequence that comprises about 0%, 5%, 10%, 15%, 20%, 25%, 30%, 35%, 40%, 45%, 50%, 55%, 60%, 65%, 70% or 75% G. In some embodiments, R" is a sequence that comprises any combination of random strings (string is any sequence including a single base) with repetitive or biased strings.

In some embodiments of the Formulae above, R" is randomly positioned bases from a biased mixture (e.g., for canonical bases, any mixture deviating from 25% per base); or any combination of random strings (string is any sequence including a single base) with repetitive or biased strings of about at least 10, 15, 20, 25, 30, 35, 40, 45, 50, 55, 60, 65, 70, 75 or 80 bases in length and/or no more than about 120, 115, 110, 105, 100, 95, 90, 85, 80, 75, 70, 65, 60, 55 or 50 bases in length.

In some embodiments of the Formulae above, S1 is a stem region sequence of at least 1 base or more. In other embodiments, S1 is a stem region sequence of between about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length.

In some embodiments of the Formulae above, S2 is a stem region sequence of at least 1 base or more. In other embodiments, S2 is a stem region sequence of between about 4 to 40 bases in length or 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 bases in length.

In some embodiments of the Formulae above, L1 is a Loop region sequence of at least one base. In other embodiments, L1 is a Loop region sequence of about 1 to 50 bases in length or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 bases in length.

In some embodiments of the Formulae above, L2 is a Loop region sequence of at least one base. In other embodiments, L2 is a Loop region sequence of about 1 to 50 bases in length or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 bases in length.

In some embodiments of the Formulae above, T may include unpaired domains on its 5' and 3' ends, or it may be a padlock tail (e.g., a loop between two domains paired with the library). The aptamers of the present disclosure may contain any number of stems and loops, and other structures comprised of stems and loops (e.g.,. hairpins, bulges, etc.). In some embodiments, the loops in the aptamer contain bases implanted in order to form stable loop-loop WC pairing forming a stem which is orthogonal to the main library axis. In other embodiments, two loops in the aptamer together form an orthogonal stem. In yet other embodiments, the loops in the aptamer contain bases implanted in order to form stable Hoogsteen pairing with an existing stem along the main library axis. In other embodiments, the loops in the aptamer can form Hoogsteen pairing with any stem in the aptamer.

In some embodiments of the formulae above, the aptamer sequence further contains one or more multimer-forming domains.

In some embodiments of the formulae above, the aptamer sequence further contains one or more spacers (e.g., of about 1 to 20 bases in length or 1, 2, 3, 4, 5, 6, 7, 8, 9, 10, 11, 12, 13, 14, 15, 16, 17, 18, 19 or 20 bases in length).

The aptamers of the present disclosure can be prepared in a variety of ways. In one embodiment, the aptamers are prepared through chemical synthesis. In another embodiment, the aptamers are prepared through enzymatic synthesis. In one embodiment, the enzymatic synthesis can be carried out using any enzyme that can add nucleotides to elongate a primer, with or without template. In some embodiments, the aptamers are prepared by assembling together k-mers (e.g., k≥2 bases).

In some embodiments, the aptamers of the present disclosure may contain any combination of DNA, RNA, and their natural and/or synthetic analogs. In one embodiment, the aptamer comprises DNA. In one embodiment, the aptamer comprises RNA.

In other embodiments, the aptamers of the present disclosure may contain any modification on the 5' end, 3' end, or internally. Modifications of the aptamers include, but are not limited to, spacers, phosphorylation, linkers, conjugation chemistries, fluorophores, quenchers, photoreactive, and modified bases (e.g., locked nucleic acid (LNA™), PNA, UNA, PS, methylation, 2-O-methyl, halogenated, superbases, iso-dN, inverted bases, L-ribose, other sugars as backbone, etc.).

In some embodiments, the aptamers of the present disclosure may be conjugated to external, non-nucleic acid molecules on the 5' end, 3' end, or internally. Non-limiting examples of non-nucleic acid molecules include, but are not limited to amino acids, peptides, proteins, small molecule drugs, mono- and polysaccharides, lipids, antibodies and antibody fragments, or a combination thereof.

The aptamers of the present disclosure may contain any domain which has a biological function. Non-limiting examples of biological functions of the aptamers described herein include, but are not limited to, acting as templates for RNA transcription, binding to, recognizing, and/or modulating the activity of proteins, binding to transcription factors, specialized nucleic acid structure (e.g., Z-DNA, H-DNA, G-quad, etc.), and acting as an enzymatic substrate for restriction enzymes, specific exo- and endonucleases, recombination sites, editing sites, or siRNA. In one embodiment, the aptamers modulate the activity of at least one protein. In another embodiment, the aptamers inhibit the activity of at least one protein.

In other embodiments, the aptamers of the present disclosure may contain any domain for integration into a nucleic acid nanostructure built by any one of several known methods (Shih et al, Nature 427:618-621 (2004); Rothemund, Nature 440:297-302 (2006); Zheng et al, Nature 461:74-77 (2009); Dietz et al, Science 325:725-730 (2009); Wei et al, Nature 485:623-626 (2012); Ke et al, Science 338:1177-1183 (2012); Douglas et al, Science 335:831-834 (2012), each of which are hereby incorporated by reference). In yet other embodiments, the aptamers of the present disclosure may contain any domain that serves a function in molecular logic and computation (Seelig et al, Science 314:1585-1588 (2006); Macdonald et al, Nano Lett 6:2598-2603 (2006); Qian et al, Nature 475:368-372 (2011); Douglas et al, Science 335:831-834 (2012); Amir et al, Nat Nanotechnol 9:353-357 (2014), each of which is hereby incorporated by reference).

In some embodiments, the aptamers of the present disclosure undergo one or more cycles of negative selection versus a negative control target including but not limited to eukaryotic or prokaryotic cell, virus or viral particle, protein, molecule, tissue, or whole organism, in-vivo or ex-vivo. In other embodiments, the aptamers of the present disclosure undergo one or more cycles of positive selection versus a positive target (e.g., eukaryotic or prokaryotic cell, virus or viral particle, molecule, tissue, or whole organism, in-vivo or ex-vivo).

The aptamers of the present disclosure can be in solution or attached to a solid phase (e.g., surface, particles, resin, matrix, etc.). In some embodiments, the aptamer is attached to a surface. In one embodiment, the surface is a particle surface.

In some embodiments, the aptamers of the present disclosure are synthesized in an aptamer library. The aptamer library of the present disclosure can be prepared in a variety of ways. In one embodiment, the aptamer library is prepared through chemical synthesis. In another embodiment, the aptamer library is prepared through enzymatic synthesis. In one embodiment, the enzymatic synthesis can be carried out using any enzyme that can add nucleotides to elongate a primer, with or without template.

In some embodiments, the aptamers synthesized in an aptamer library may contain any combination of DNA, RNA, and their natural and/or synthetic analogs. In one embodiment, the aptamers synthesized in an aptamer library comprise DNA. In one embodiment, the aptamers synthesized in an aptamer library comprise RNA.

In some embodiments, the aptamers synthesized in an aptamer library are a nucleic acid (e.g., DNA, RNA, natural or synthetic bases, base analogs, or a combination thereof) collection of 10K species (K≥2), with Z copies per species (1≤Z≤K−1).

In other embodiments, the aptamers synthesized in an aptamer library of the present disclosure may contain any modification on the 5' end, 3' end, or internally. Modifications of the aptamers include, but are not limited to, spacers, phosphorylation, linkers, conjugation chemistries, fluorophores, quenchers, photoreactive modifications, and modified bases (e.g., locked nucleic acid (LNA™), PNA, UNA, PS, methylation, 2-O-methyl, halogenated, superbases, iso-dN, inverted bases, L-ribose, other sugars as backbone).

In some embodiments, the aptamers synthesized in an aptamer library may be conjugated to external, non-nucleic acid molecules on the 5' end, 3' end, or internally. Non-limiting examples of non-nucleic acid molecules include, but are not limited to amino acids, peptides, proteins, small molecule drugs, mono- and polysaccharides, lipids, antibodies and antibody fragments, or a combination thereof.

The aptamers synthesized in an aptamer library may contain any domain which has a biological function. Non-limiting examples of biological functions of the aptamers described herein include, but are not limited to, acting as templates for RNA transcription, binding to, recognizing, and/or modulating the activity of proteins, binding to transcription factors, specialized nucleic acid structure (e.g., Z-DNA, H-DNA, G-quad, etc.), acting as an enzymatic substrate for restriction enzymes, specific exo- and endonucleases, recombination sites, editing sites, or siRNA. In one embodiment, the aptamers synthesized in an aptamer library modulate the activity of at least one protein. In another embodiment, the aptamers synthesized in an aptamer library inhibit the activity of at least one protein.

In other embodiments, the aptamers synthesized in an aptamer library may contain any domain for integration into a nucleic acid nanostructure built by one of several known methods (Shih et al, Nature 427:618-621 (2004); Rothemund, Nature 440:297-302 (2006); Zheng et al, Nature 461:74-77 (2009); Dietz et al, Science 325:725-730 (2009); Wei et al, Nature 485:623-626 (2012); Ke et al, Science 338:1177-1183 (2012); Douglas et al, Science 335:831-834 (2012), each of which are hereby incorporated by reference). In yet other embodiments, the aptamers of the present disclosure may contain any domain that serves a function in molecular logic and computation (Seelig et al, Science 314:1585-1588 (2006); Macdonald et al, Nano Lett 6:2598-2603 (2006); Qian et al, Nature 475:368-372 (2011); Douglas et al, Science 335:831-834 (2012); Amir et al, Nat Nanotechnol 9:353-357 (2014), each of which is hereby incorporated by reference)

In some embodiments, the aptamers synthesized in an aptamer library undergo one or more cycles of negative selection versus a target (e.g., eukaryotic or prokaryotic cell). In other embodiments, the aptamers of the present disclosure undergo one or more cycles of positive selection versus a target (e.g., eukaryotic or prokaryotic cell).

The aptamers synthesized in an aptamer library can be in solution or attached to a solid phase (e.g., surface, particles, resin, matrix, etc.). In some embodiments, the aptamers synthesized in an aptamer library are attached to a surface. In one embodiment, the surface is a particle surface.

Immobilized Aptamer Clusters

In certain aspects, provided herein are methods for identifying aptamers that modulate a target cell by incubating a sample comprising the target cells with a plurality of aptamer clusters (e.g., clusters of aptamers from the aptamer libraries provided herein) immobilized on a particle surface. In some embodiments, the surface is a bead (e.g., a microbead, a nanobead).

Any method known in the art can be used to generate the immobilized aptamer clusters on the particle surface. In certain embodiments, the surface-immobilized aptamer clusters are generated by first immobilizing aptamers (e.g., from an aptamer library disclosed herein) onto the surface (e.g., the surface of a particle). In some embodiments, at least about $10^2$, $10^3$, $10^4$, $10^5$, $10^6$, $10^7$, $10^8$, $10^9$ or $10^{10}$ distinct aptamers are immobilized onto the surface (e.g., the surface of a particle). Following aptamer immobilization, a localized amplification process (e.g., emulsion PCR, bridge amplification, or rolling circle amplification), is then performed to generate clusters of copies of each immobilized aptamer positioned proximal to the immobilization site of the original immobilized aptamer. In certain embodiments (e.g., embodiments in which rolling circle amplification is performed) the aptamer cluster is housed in a nano-pit or pore on the surface rather than being directly immobilized on the surface. In some embodiments, the aptamer clusters are prepared using emulsion PCR. In some embodiments, amplification results in each aptamer cluster comprising at least about 10, 20, 30, 40, 50, 60, 70, 80, 90, 100, 125, 150, 175, 200, 250, 300, 350, 400, 450, 500, 600, 700, 800, 900, 1000, 2000, 3000, 4000, 5000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, or 1000,000 identical aptamer molecules. In certain embodiments, the aptamer clusters are then sequenced (e.g., by Illumina® next-generation sequencing or Polonator sequencing). If present, complementary strands can be stripped from the aptamer cluster by washing the surface under conditions not amenable to strand hybridization (e.g., due to salt concentration and/or temperature) in order to generate clusters of single-stranded aptamers. The surface (e.g., the particle surface) is then ready for use in an aptamer identification method provided herein. In some embodiments, the immobilized aptamer clusters are prepared and/or sequenced on one instrument, and then transferred to a separate instrument for aptamer identification. In other embodiments, the aptamer clusters are prepared and/or sequenced on the same instrument as is used for aptamer identification.

In some embodiments, each aptamer cluster particle comprises clusters of less than 1000 different aptamers sequences, for examples, less than 900, less than 800, less than 700, less than 600, less than 500, less than 400, less than 300, or less than 200, less than 100, less than 90, less than 80, less than 70, less than 60, less than 50, less than 40, less than 30, or less than 20, less than 10, less than 9, less than 8, less than 7, less than 6, less than 5, less than 4, less than 3, or less than 2 different aptamers sequences. In one embodiment, each aptamer cluster particle comprises a unique aptamer sequence in multiple copies as clusters on the surface of the particle. In some embodiments, each aptamer cluster comprises at least 2 identical aptamers (e.g., at least 10, 20, 30, 40 50 60, 70, 80, 90, 100, 150, 200, 250, 300, 350, 400, 450, 500, 550, 600, 650, 700, 750, 800, 850, 900, 950, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, or 1,000,000 identical aptamers).

In some embodiments of the methods above, the aptamers or aptamer clusters (e.g., from the aptamer library) comprise an adapter that will bring the aptamers to surface height (e.g., in cases where the surface is not flat, such as in particles that include pores). In one embodiment, the aptamers or aptamer clusters are immobilized inside pores on a particle surface and adapters are used to bind the aptamer to the surface in order to bring the aptamers to surface height. In some embodiments, the adapter is a nucleic acid adapter (e.g., a sequence of at least about 10, 15, 20, 25, 30, 35, 40, 45, 50, 55, 60, 65, 70, 75, 80, 85, 90, 95 or 100 bases in length). In some embodiments, a sequence complementary to the adapter sequence is hybridized to the adapter prior to aptamer screening. In some embodiments, the adapter is a chemical adapter (e.g., a polymer connecting the aptamer to the surface).

Aptamer Library Screening

In certain aspects, provided herein are methods for identifying one or more aptamers that specifically modulate a target cell function, the method generally comprising: (i) incubating the library with target cells in a single reaction volume under a condition and for a period of time to form cell-aptamer cluster particle complexes; (ii) partitioning the cell-aptamer cluster particle complexes having altered cell function from the cell-aptamer cluster particle complexes without the desired effect, the free particles and the free cells; (iii) isolating the aptamer cluster particles from the cell-aptamer cluster particle complexes having altered cellular function; (iv) dissociating the aptamers from the particles; and (v) amplifying individual aptamer sequences to provide a functionally enriched population of aptamers.

In certain embodiments, the methods further comprise a step of enriching the population of functional aptamers by repeating the steps (i)-(v) in additional rounds to yield a specific and enriched population of functional aptamers. In certain embodiments, the step of enriching the population of functional aptamers involves applying a restrictive condition (e.g., reducing the total number of particles) in the successive rounds. In some embodiments, the enriched population of aptamers has decreased sequence diversity relative to the plurality of aptamers from the incubating step by a factor of at least 1.5 (e.g., by a factor of about 1.5, 1.6, 1.7. 1.8, 1.9, or 2.0). In some embodiments, the population of aptamers of each additional round of screening is enriched by a factor of at least 1.1 (e.g., by a factor of about 1.1, 1.2, 1.3, 1.4, 1.5, 1.6, 1.7. 1.8, 1.9, or 2.0). The number of rounds of enrichment can be as many as desired. For example, in some embodiments, the number of rounds are at least 2 (e.g., at least 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100). In certain embodiments, the methods further comprise a step of identifying the enriched population of functional aptamers via sequencing after the step (v).

The library of aptamer cluster particles can be incubated with target cells under any condition conductive to form cell-aptamer cluster particle complexes and to allow the aptamer cluster particles to provide an effect on the target cells. The condition includes, but is not limited to, for examples, a controlled period of time, an optimal temperature (e.g., 37° C.), and/or an incubating medium (e.g., target cell culture medium), etc. The period of time of incubation can be from about 10 minutes to about 5 days, from about 30 minutes to about 4 days, from about 1 hour to about 3 days, from about 1.5 hours to about 24 hours, or from about 1.5 hours to about 2 hours. In some embodiments, the period of time of incubation may be, for example, 10 min, 15 min, 30 min, 45 min, 1 hour, 2 hours, 4 hours, 6 hours, 8 hours, 12 hours, 16 hours, 24 hours, 2 days, 3 days, 4 days, 5 days, 6 days, or 7 days.

The target cells and the library of aptamer cluster particles may be mixed at a ratio such that the formed cell-aptamer cluster particle complexes comprise about 1 to 10 particles per target cell (e.g., 1, 2, 3, 4, 5, 6, 7, 8, 9, or 10 particles per target cell). In certain embodiment, the formed cell-aptamer cluster particle complexes comprise about 2 to 4 particles per target cell. In some embodiments, the aptamer cluster particle in the formed cell-aptamer cluster particle complexes comprises about 1 to 10 clusters per particle (e.g., 1, 2, 3, 4, 5, 6, 7, 8, 9, or 10 clusters per particle). In certain embodiments, the aptamer cluster particle in the formed cell-aptamer cluster particle complexes comprises about 1 to 6 clusters per particle.

In some embodiments, the target cells are labeled with and/or comprises a detectable label. The target (e.g., target cells) can be detectably labeled directly (e.g., through a direct chemical linker) or indirectly (e.g., using a detectably labeled target-specific antibody). In embodiments in which the target is a cell, it can be labeled by incubating the target cell with the detectable label under conditions such that the detectable label is internalized by the cell. In some embodiments, the target is detectably labeled before performing the aptamer screening methods described herein. In some embodiments, the target is labeled during the performance of the aptamer screening methods provided herein. In some embodiments, the target is labeled after is it is bound to an aptamer cluster (e.g., by contacting the bound target with a detectably labeled antibody). In some embodiments, any detectable label can be used. Examples of detectable labels include, but are not limited to, fluorescent moieties, radioactive moieties, paramagnetic moieties, luminescent moieties and/or colorimetric moieties. In some embodiments, the targets described herein are linked to, comprise and/or are bound by a fluorescent moiety. Examples of fluorescent moieties include, but are not limited to, Allophycocyanin, Fluorescein, Phycoerythrin, Peridinin-chlorophyll protein complex, fluorescent dye Alexa Fluor® 350, fluorescent dye Alexa Fluor® 405, fluorescent dye Alexa Fluor® 430, fluorescent dye Alexa Fluor® 488, fluorescent dye Alexa Fluor® 514, fluorescent dye Alexa Fluor® 532, fluorescent dye Alexa Fluor® 546, fluorescent dye Alexa Fluor® 555, fluorescent dye Alexa Fluor® 568, fluorescent dye Alexa Fluor® 594, fluorescent dye Alexa Fluor® 633, fluorescent dye Alexa Fluor® 635, fluorescent dye Alexa Fluor® 647, fluorescent dye Alexa Fluor® 660, fluorescent dye Alexa Fluor® 680, fluorescent dye Alexa Fluor® 700, fluorescent dye Alexa Fluor® 750, fluorescent dye Alexa Fluor® 790, EGFP, mPlum, mCherry, mOrange, mKO, EYFP, mCitrine, Venus, YPet, Emerald, Cerulean and CyPet.

The target can be a non-molecular or a supramolecular target. Non-limiting examples of targets to which the aptamers of the present disclosure can bind to and/or modulate include, but are not limited to, cells, bacteria, fungi, archaea, protozoa, viruses, virion particles, synthetic and naturally-occurring microscopic particles, and liposomes. In some embodiments, the target contacted with the aptamer cluster particles is live/native. In other embodiments, the target contacted with the aptamer cluster particles is fixed or in a solution.

In some embodiments, the target cell is a prokaryotic cell. In some embodiments, the cell is a bacterial cell. non-limiting examples of bacteria include *Aspergillus, Brugia, Candida, Chlamydia, Coccidia, Cryptococcus, Dirofilaria, Gonococcus, Histoplasma, Klebsiella, Legionella, Leishmania, Meningococci, Mycobacterium, Mycoplasma*, Paramecium, Pertussis, *Plasmodium, Pneumococcus, Pneumocystis, Pseudomonas, Rickettsia, Salmonella, Shigella, Staphylococcus, Streptococcus, Toxoplasma* and *Vibriocholerae*. Exemplary species include *Neisseria gonorrhea, Mycobacterium tuberculosis, Candida albicans, Candida tropicalis, Trichomonas vaginalis, Haemophilus vaginalis*, Group B *Streptococcus* sp., *Microplasma hominis, Hemophilus ducreyi, Granuloma inguinale, Lymphopathia venereum, Treponema pallidum, Brucella abortus. Brucella melitensis, Brucella suis, Brucella canis, Campylobacter fetus, Campylobacter fetus intestinalis, Leptospira pomona, Listeria monocytogenes, Brucella ovis, Chlamydia psittaci, Trichomonas foetus, Toxoplasma gondii, Escherichia coli, Actinobacillus equuli, Salmonella abortus ovis, Salmonella abortus equi, Pseudomonas aeruginosa, Corynebacterium equi, Corynebacterium pyogenes, Actinobaccilus seminis, Mycoplasma bovigenitalium, Aspergillus fumigatus, Absidia ramosa, Trypanosoma equiperdum, Babesia caballi, Clostridium tetani*, and *Clostridium botulinum*.

In some embodiments, the cell is a eukaryotic cell. In some embodiments, the cell is an animal cell (e.g., a mammalian cell). In some embodiments, the cell is a human cell. In some embodiments, the cell is from a non-human animal, such as a mouse, rat, rabbit, pig, bovine (e.g., cow, bull, buffalo), deer, sheep, goat, llama, chicken, cat, dog, ferret, or primate (e.g., marmoset, rhesus monkey). In some embodiments, the cell is a parasite cell (e.g., a malaria cell, a leishmanias cell, a *cryptosporidium* cell or an amoeba cell). In some embodiments, the cell is a fungal cell, such as, e.g., *Paracoccidioides brasiliensis*.

In some embodiments, the cell is a cancer cell (e.g., a human cancer cell or a patient-derived cancer cell). In some embodiments, the cell is from any cancerous or pre-cancerous tumor. Non-limiting examples of cancer cells include cancer cells from the bladder, blood, bone, bone marrow, brain, breast, colon, esophagus, gastrointestine, gum, head, kidney, liver, lymph nodes, lung, nasopharynx, neck, ovary, pancreas, prostate, skin, stomach, testis, tongue, or uterus. In addition, the cancer may specifically be of the following histological type, though it is not limited to these: neoplasm, malignant, carcinoma, carcinoma, undifferentiated, giant and spindle cell carcinoma, small cell carcinoma, papillary carcinoma, squamous cell carcinoma, lymphoepithelial carcinoma, basal cell carcinoma, pilomatrix carcinoma, transitional cell carcinoma, papillary transitional cell carcinoma, adenocarcinoma, gastrinoma, malignant, cholangiocarcinoma, hepatocellular carcinoma, combined hepatocellular carcinoma and cholangiocarcinoma, trabecular adenocarcinoma, adenoid cystic carcinoma, adenocarcinoma in adenomatous polyp, adenocarcinoma, familial polyposis *coli*, solid carcinoma, carcinoid tumor, malignant, branchiolo-alveolar adenocarcinoma, papillary adenocarcinoma, chromophobe carcinoma, acidophil carcinoma, oxyphilic adenocarcinoma, basophil carcinoma, clear cell adenocarcinoma, granular cell carcinoma, follicular adenocarcinoma, papillary and follicular adenocarcinoma, nonencapsulating sclerosing carcinoma, adrenal cortical carcinoma, endometroid carcinoma, skin appendage carcinoma, apocrine adenocarcinoma, sebaceous adenocarcinoma, ceruminous adenocarcinoma, mucoepidermoid carcinoma, cystadenocarcinoma, papillary cystadenocarcinoma, papillary serous cystadenocarcinoma, mucinous cystadenocarcinoma, mucinous adenocarcinoma, signet ring cell carcinoma, infiltrating duct carcinoma, medullary carcinoma, lobular carcinoma, inflammatory carcinoma, paget's disease, mammary, acinar cell carcinoma, adenosquamous carcinoma, adenocarcinoma w/squamous metaplasia, thymoma, malignant, ovarian stromal tumor, malignant, thecoma, malignant, granulosa cell tumor, malignant, and roblastoma, malignant, sertoli cell carcinoma, leydig cell tumor, malignant, lipid cell tumor, malignant, paraganglioma, malignant, extra-mammary paraganglioma, malignant, pheochromocytoma, glomangiosarcoma, malignant melanoma, amelanotic melanoma, superficial spreading melanoma, malig melanoma in giant pigmented nevus, epithelioid cell melanoma, blue nevus, malignant, sarcoma, fibrosarcoma, fibrous histiocytoma, malignant, myxosarcoma, liposarcoma, leiomyosarcoma, rhabdomyosarcoma, embryonal rhabdomyosarcoma, alveolar rhabdomyosarcoma, stromal sarcoma, mixed tumor, malignant, mullerian mixed tumor, nephroblastoma, hepatoblastoma, carcinosarcoma, mesenchymoma, malignant, brenner tumor, malignant, phyllodes tumor, malignant, synovial sarcoma, mesothelioma, malignant, dysgerminoma, embryonal carcinoma, teratoma, malignant, struma ovarii, malignant, choriocarcinoma, mesonephroma, malignant, hemangiosarcoma, hemangioendothelioma, malignant, kaposi's sarcoma, hemangiopericytoma, malignant, lymphangiosarcoma, osteosarcoma, juxtacortical osteosarcoma, chondrosarcoma, chondroblastoma, malignant, mesenchymal chondrosarcoma, giant cell tumor of bone, ewing's sarcoma, odontogenic tumor, malignant, ameloblastic odontosarcoma, ameloblastoma, malignant, ameloblastic fibrosarcoma, pinealoma, malignant, chordoma, glioma, malignant, ependymoma, astrocytoma, protoplasmic astrocytoma, fibrillary astrocytoma, astroblastoma, glioblastoma, oligodendroglioma, oligodendroblastoma, primitive neuroectodermal, cerebellar sarcoma, soft tissue sarcoma, ganglioneuroblastoma, neuroblastoma, retinoblastoma, olfactory neurogenic tumor, meningioma, malignant, neurofibrosarcoma, neurilemmoma, malignant, granular cell tumor, malignant, malignant lymphoma, Hodgkin's disease, Hodgkin's lymphoma, paragranuloma, malignant lymphoma, small lymphocytic, malignant lymphoma, large cell, diffuse, malignant lymphoma, follicular, mycosis fungoides, other specified non-Hodgkin's lymphomas, malignant histiocytosis, multiple myeloma, mast cell sarcoma, immunoproliferative small intestinal disease, leukemia, lymphoid leukemia, plasma cell leukemia, erythroleukemia, lymphosarcoma cell leukemia, myeloid leukemia, basophilic leukemia, eosinophilic leukemia, monocytic leukemia, mast cell leukemia, megakaryoblastic leukemia, myeloid sarcoma, and hairy cell leukemia.

In some embodiments, the target cell is an immune cell (e.g., a human immune cell or a patient-derived immune cell). As used herein, the term "immune cell" refers to cells that play a role in the immune response. Immune cells are of hematopoietic origin, and include lymphocytes, such as B cells and T cells; natural killer cells; myeloid cells, such as monocytes, macrophages, eosinophils, mast cells, basophils, and granulocytes.

In some embodiments, the target cell is infected with a virus. For example, in some embodiments, the virus is HIV, hepatitis A, hepatitis B, hepatitis C, herpes virus (e.g., HSV-1, HSV-2, CMV, HAV-6, VZV, Epstein Barr virus), adenovirus, influenza virus, flavivirus, echovirus, rhinovirus, coxsackie virus, coronavirus, respiratory syncytial virus, mumps virus, rotavirus, measles virus, rubella virus, parvovirus, vaccinia virus, HTLV, dengue virus, papillomavirus, molluscum virus, poliovirus, rabies virus, JC virus, or Ebola virus In some embodiments, the cellular function that is modulated is cell viability, cell proliferation, gene expression, cellular morphology, cellular activation, phosphorylation, calcium mobilization, degranulation, cellular migration, and/or cellular differentiation. In certain embodiments, the target is linked to, bound by or comprises a detectable label that allows for the detection of a biological or chemical effect on the target. In some embodiments, the detectable label is a fluorescent dye. Non-limiting examples of fluorescent dyes include, but are not limited to, a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, and a redox potential dye. In one embodiment, the target is labeled with a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, or a redox potential dye.

In certain embodiments, the target cell is labeled with an activation associated marker, an oxidative stress reporter, an angiogenesis marker, an apoptosis marker, an autophagy marker, a cell viability marker, or a marker for ion concentrations. In yet another embodiment, the target cell is labeled with an activation associated marker, an oxidative stress reporter, an angiogenesis marker, an apoptosis marker, an autophagy marker, a cell viability marker, or a marker for ion concentrations prior to exposure of aptamers to the target.

In some embodiments, the target cell is labeled after to exposure of aptamers to the target. In one embodiment, the target is labeled with fluorescently-labeled antibodies, annexin V, antibody fragments and artificial antibody-based constructs, fusion proteins, sugars, or lectins. In another embodiment, the target cell is labeled with fluorescently-labeled antibodies, annexin V, antibody fragments and artificial antibody-based constructs, fusion proteins, sugars, or lectins after exposure of aptamers to the target.

In some embodiments, the target cell is labeled with a fluorescent dye. Non-limiting examples of fluorescent dyes include, but are not limited to, a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, and a redox potential dye.

In some embodiments, the target cell is labeled with a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, or a redox potential dye. In certain embodiments, the target cell is labeled with an activation associated marker, an oxidative stress reporter, an angiogenesis marker, an apoptosis marker, an autophagy marker, a cell viability marker, or a marker for ion concentrations. In yet another embodiment, target cell is labeled with an activation associated marker, an oxidative stress reporter, an angiogenesis marker, an apoptosis marker, an autophagy marker, a cell viability marker, or a marker for ion concentrations prior to exposure of aptamers to the cell.

In some embodiments, the target cell is labeled after to exposure of aptamers to the target. In one embodiment, the target cell is labeled with a fluorescently-labeled antibody or antigen-binding fragment thereof, annexin V, a fluorescently-labeled fusion protein, a fluorescently-labeled sugar, or fluorescently labeled lectin. In one embodiment, the target cell is labeled with a fluorescently-labeled antibody or antigen-binding fragment thereof, annexin V, a fluorescently-labeled fusion protein, a fluorescently-labeled sugar, or fluorescently labeled lectin after exposure of aptamers to the cell.

In some embodiments, any reporter of cellular function can be used in the methods provided herein.

In certain embodiments, the cellular function is bacterial membrane integrity. Examples of reporters of bacterial membrane integrity include, but are not limited to, the LIVE/DEAD™ BacLight™ Bacterial Viability Kit. In certain embodiments, the cellular function is expression of bacterial oxidases and reductases. Examples of reporters of expression of bacterial oxidases and reductases include, but are not limited to, the BacLight™ RedoxSensor™ Bacterial Vitality Assay. In certain embodiments, the cellular function is a change in bacterial membrane potential. Examples of reporters of change in bacterial membrane potential include, but are not limited to, the BacLight™ Bacterial Membrane Potential Kit.

In certain embodiments, the cellular function is apoptosis. Exemplary apoptosis reporters are provided in Table 14.

In some embodiments, the reporter of cellular function is an antibody. In certain embodiments, the antibody is labeled with a fluorescent moiety. Examples of fluorescent moieties include, but are not limited to, Allophycocyanin, Fluorescein, Phycoerythrin, Peridinin-chlorophyll protein complex, fluorescent dye Alexa Fluor® 350, fluorescent dye Alexa Fluor® 405, fluorescent dye Alexa Fluor® 430, fluorescent dye Alexa Fluor® 488, fluorescent dye Alexa Fluor® 514, fluorescent dye Alexa Fluor® 532, fluorescent dye Alexa Fluor® 546, fluorescent dye Alexa Fluor® 555, fluorescent dye Alexa Fluor® 568, fluorescent dye Alexa Fluor® 594, fluorescent dye Alexa Fluor® 633, fluorescent dye Alexa Fluor® 635, fluorescent dye Alexa Fluor® 647, fluorescent dye Alexa Fluor® 660, fluorescent dye Alexa Fluor® 680, fluorescent dye Alexa Fluor® 700, fluorescent dye Alexa Fluor® 750, fluorescent dye Alexa Fluor® 790, EGFP, mPlum, mCherry, mOrange, mKO, EYFP, mCitrine, Venus, YPet, Emerald, Cerulean and CyPet.

In certain embodiments, the cellular function is autophagy and the antibody binds to a marker of autophagy (e.g., LC3, p62).

In some embodiments, the cellular function is cell proliferation and the antibody binds to a proliferation marker (e.g., Ki67, MCM2, PCNA).

In some embodiments, the cellular function is tumor antigen expression and the antibody binds to a tumor antigen (e.g., Prostate-specific antigen (PSA), Prostate Membrane Antigen (PSMA) Cancer antigen 15-3 (CA-15-3), Carcinoembryonic antigen (CEA), Cancer antigen 125 (CA-125), Alpha-fetoprotein (AFP), NY-ESO-1, MAGEA-A3, WT1, hTERT, Tyrosinase, gp100, MART-1, melanA, B catenin, CDC27, HSP70-2-m, HLA-A2-R17OJ, AFP, EBV-EBNA, HPV16-E7, MUC-1, HER-2/neu, Mammaglobin-A).

In some embodiments, the cellular function is expression of an immune checkpoint protein and the antibody binds to an immune checkpoint receptor and/or an immune checkpoint receptor ligand (e.g., B7-H3 (CD276), B7-H4 (VTCN1), B7-H5 (VISTA), BTLA (CD272), CD96 (Tactile), CD112 (Nectin-2), CD134 (OX40), CD137 (4-1BB), CD137L (4-1BBL), CD152 (CTLA-4), CD155 (PVR), CD223 (LAG3), CD226 (DNAM1), CD252 (OX40L), CD258 (LIGHT), CD273 (PD-L2), CD274 (PD-L1), CD278 (ICOS), CD279 (PD-1), CD357 (GITR), DR3 (TNFRSF25), Galectin-9, GITRL, HVEM, ICOSL (B7-H2), IDO, TIGIT, TIM3, TL1A, VSIG4).

In some embodiments, the cellular function is cytokine expression and the antibody binds to a cytokine (e.g., IL-6, TNF-α, IFN-γ, IL-1β, IL-3, IL-4, IL-5, IL-13, GM-CSF, IL-2, IL-8, GRO-α, IL-10, MCP-1, MIP-1, MCP-3, MIG, IL-12, CCL5).

In some embodiments, the cellular function is a macrophage function and the antibody binds to a marker of macrophage function (e.g., IDO, CD163, CD206, Arginase-1, CD204 (MSR-1), CD369, GPNMB, VSIG4, Marco, MerTK, Osteopontin, Axl, VISTA).

In some embodiments, the cellular function is a dendritic cell function and the antibody binds to a marker of dendritic cell function (e.g., CD103, CD11b, XCR1, CD80, CD86).

Figure 1:
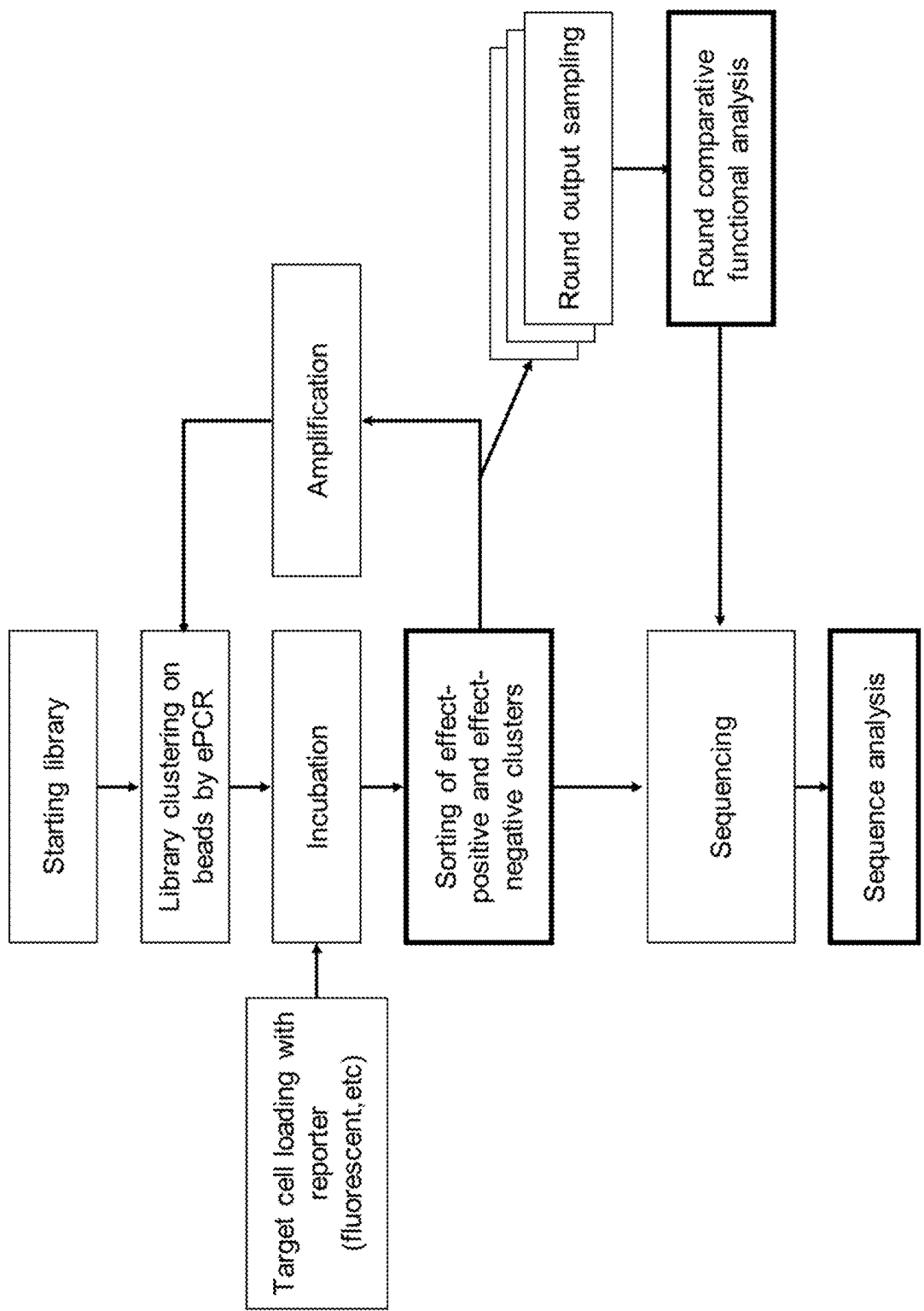
FIG. 1 is a schematic diagram of aptamer library synthesis, sequencing and target identification work flow according to certain embodiments described herein.

FIG. 1 provides an exemplary workflow illustrating certain embodiments of the methods provided herein. The workflow begins with an initial aptamer library (e.g., an aptamer library provided herein) chosen and prepared as though for Illumina® next-generation sequencing. The library can be, for example, newly synthesized, or an output of a previous selection process. This process can involve one or more positive selection cycles, one or more negative selection cycles, or both, in either combination and sequence.

Figure 3:
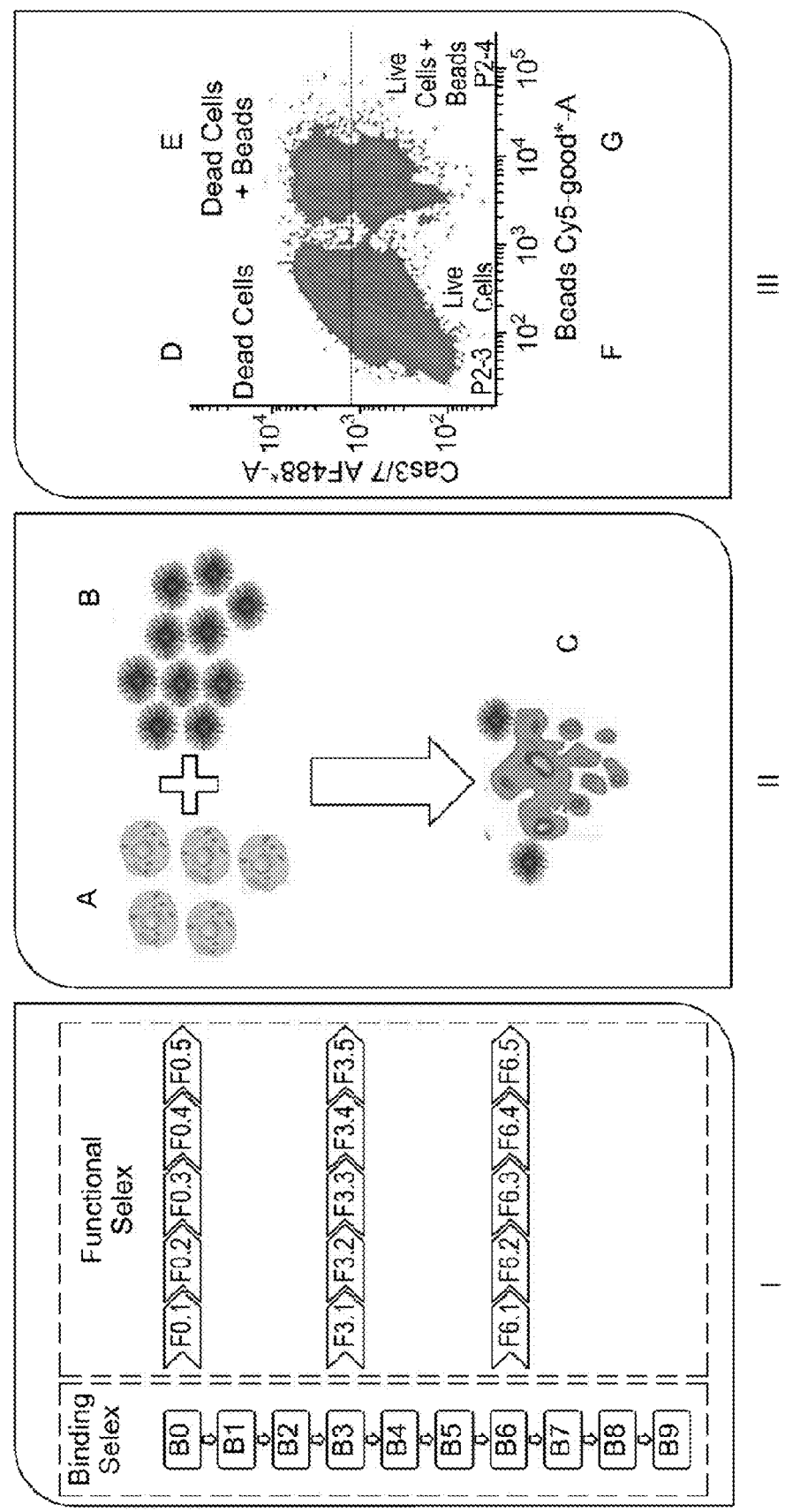
FIG. 3 is a schematic diagram of functional SELEX assay work flow described herein.

FIG. 3 provides an exemplary diagram of some of the stages in the process. FIG. 3I illustrates sequential binding SELEX stage in order to select binding specific aptamers to the target cell and the Functional SELEX performed in order to enrich the population with binding aptamers which provide a functional effect on a cell. Many options are possible for any number of binding and functional SELEX may be repeated. FIG. 3II illustrates the step of combining the aptamer cluster particles described herein (see B) and the cells (see A) to form aptamer cluster particle cell complexes (see C) which are detectably labeled. FIG. 3III is an illustration of resulting flow cytometry results which detect intensity of florescent marker of cellular function (y-axis) as well as particle complexing with cells (x-axis) which allows one to partition the cell-aptamer cluster particle complexes having altered cellular function (labeled as ii) from the cell-aptamer cluster particle complexes without the desired effect (labeled as iv), the free particles (v) and the free cells, both with desired effect (labeled as i) and without desired function (labeled iii).

The prepared library is mounted on particles, such as beads. Emulsion PCR (ePCR) amplification turns each single sequence from the initial library into a cluster of at least, e.g., 10,000 copies of the same sequence. The library of aptamer cluster particles are then incubated with target cells. The target cells can be labeled prior to introduction into the aptamer cluster particles with a fluorescent dye, for the purpose of reporting a biological or chemical effect on the target cells. The target cells and the library of aptamer cluster particles are incubated for a certain amount of time to allow the effect to take place. Fluorescent dyes or markers for reporting the biological or chemical effect (e.g., cell activation, apoptosis, etc.) can then be pumped into the target cells (See FIG. 1). In some embodiments, the reporter is added to the cells before the incubation. In some embodiments the reporter is added during the incubation. In certain embodiments the reporter is added after incubation. In some embodiments a second reporter is used (e.g., before incubation) to mark cells expressing the wanted phenotype (e.g. apoptosis) with no relation to the incubation process with the aptamers. In certain embodiments, the second reporter helps distinguish false positives. In some embodiments a second (or third) reporter is used (e.g., a reporter that works via a different mechanism) in order to make sure the phenotype detected is not false positive. Effect positive clusters are then sorted away from the effect-negative clusters and corresponding functional aptamer sequences are analyzed. The sorted positive clusters can also be amplified and immobilized to the surface of particles as the initial library for additional rounds of screening. A portion of the enriched functional aptamers after each round of screening is subjected to output sampling and comparative functional analysis before the identification of the aptamers by sequencing.

Other Compositions and Methods

In certain aspects, also provided herein are compositions comprising functionally enriched population of aptamers, such as the population of aptamers selected using the aptamer library screening methods described herein. In some embodiments, the functional enriched population of aptamers is characterized by a more than 1.1-fold increase in function compared to a control aptamer, for example, more than 1.2-fold, more than 1.3-fold, more than 1.4-fold, more than 1.5-fold, more than 1.6-fold, more than 1.7-fold, more than 1.8-fold, more than 1.9-fold, more than 2.0-fold, more than 2.1-fold, more than 2.2-fold, more than 2.3-fold, more than 2.4-fold, more than 2.5-fold, more than 2.6-fold, more than 2.7-fold, more than 2.8-fold, more than 2.9-fold, more than 3-fold, more than 3.5-fold, more than 4-fold, more than 4.5-fold, more than 5-fold, more than 5.5-fold, more than 6-fold, more than 6.5-fold, more than 7-fold, more than 7.5-fold, more than 8-fold, more than 8.5-fold, more than 9-fold, more than 9.5-fold, or more than 10-fold increase in function compared to the control library. The control library may be, for example, one or more nonfunctional aptamers, a random pool of aptamers, a library of aptamer clusters before any functional screening or enrichment, or a population of aptamers that do not modulate the specific cellular function of interest. In certain embodiment, the function is measured as the quantitative fluorescence of the detectable label of cellular function, quantitative luminescence of the detectable label of the cellular function, or a morphological change in the cell. In some embodiments, the function measured is cancer cell death or apoptosis, for example, cell death or apoptosis of tumor-derived cells. Thus, a tumor derived personalized cell modifying population of aptamers is also encompassed by the present invention. In some other embodiments, the function measured is immune cell activation/deactivation or other phenotypic switching/skewing/polarization, In certain aspects, provided herein are compositions comprising aptamer clusters (e.g., a clustered aptamer library generated during the performance of a method provided herein). In certain embodiments, the aptamer clusters are immobilized on a solid support (e.g., a particle surface). In certain embodiments, the composition further comprises a target cell (e.g., a cancer cell, an immune cell, a bacterial cell). In certain embodiments, the composition further comprises a reporter of cell function. In certain embodiments, the reporter is a fluorescent reporter (e.g., a membrane integrity reporter, a capsid integrity reporter, a protein integrity reporter, a protein denaturation reporter, a cell death reporter, or a redox potential reporter).

In some embodiments, the composition comprises at least about $10^2$ aptamer clusters (e.g., at least about $5 \times 10^2$, $10^3$, $5 \times 10^3$, $10^4$, $5 \times 10^4$, $10^5$, $5 \times 10^5$, $10^6$, $5 \times 10^6$, $10^7$, $5 \times 10^7$, $10^8$, $5 \times 10^8$, or $10^9$ aptamer clusters). In certain embodiments, the composition comprises at least about $10^6$ aptamer clusters. In some embodiments, the composition comprises $10^5$ to $10^{10}$ aptamer clusters (e.g., $10^5$ to $5 \times 10^9$, $10^5$ to $10^9$, $10^5$ to $5 \times 10^8$, $10^5$ to $10^8$, $10^5$ to $5 \times 10^7$, $10^5$ to $10^7$, $10^5$ to $5 \times 10^6$, $10^5$ to $10^6$, $10^5$ to $5 \times 10^5$, $5 \times 10^5$ to $10^{10}$, $10^6$ to $10^{10}$, $5 \times 10^6$ to $10^{10}$, $10^7$ to $10^{10}$, $5 \times 10^7$ to $10^{10}$, $10^8$ to $10^{10}$, $5 \times 10^8$ to $10^{10}$, $10^9$ to $10^{10}$, $5 \times 10^9$ to $10^{10}$, $5 \times 10^5$ to $5 \times 10^9$, $10^6$ to $10^9$, $5 \times 10^6$ to $5 \times 10^8$, $10^7$ to $10^8$ aptamer clusters). In certain embodiments, the composition comprises $10^6$ to $10^9$ aptamer clusters. In some embodiments, each aptamer cluster comprises at least about 2 copies of an aptamer (e.g., at least about $10^3$, $5 \times 10^3$, $10^4$, $5 \times 10^4$, $10^5$, $5 \times 10^5$, or $10^6$ copies of an aptamer). In certain embodiments, each aptamer cluster comprises at least about $10^4$ copies of an aptamer. In some embodiments, each aptamer cluster comprises $10^3$-$10^7$ of aptamers (e.g., $10^3$ to $5 \times 10^6$, $10^3$ to $10^6$, $10^3$ to $5 \times 10^5$, $10^3$ to $10^5$, $10^3$ to $5 \times 10^4$, $10^3$ to $10^4$, $10^3$ to $5 \times 10^3$, $5 \times 10^3$ to $10^7$, $10^4$ to $10^7$, $5 \times 10^4$ to $10^7$, $10^5$ to $10^7$, $5 \times 10^5$ to $10^7$, $10^6$ to $10^7$, $5 \times 10^6$ to $10^7$, $5 \times 10^3$ to $5 \times 10^6$, $10^4$ to $10^6$, or $5 \times 10^4$ to $5 \times 10^5$ aptamers per cluster). In certain embodiments, each aptamer cluster comprises $10^4$ to $10^6$ of aptamers.

In some embodiments, the target can be a cell of any type (e.g. prokaryotic cell, such as a bacterium or archaea, or a eukaryotic cell, such as an animal cell, a plant cell, a protozoan cell, a mammalian cell), a virus, etc.

In some embodiments, the reporter of cell function is a fluorescent reporter. In some embodiments, the fluorescent reporter of function is a cell death reporter, a redox potential reporter, a membrane integrity reporter. Examples of cell death reporters are 7-AAD, and Annexin V fluorophore. In some embodiments, the fluorescent reporter of function is a virus reporter, such as a capsid integrity reporter (e.g., a reporter for measuring the capsid integrity and or functions of a virus). In some embodiments, the fluorescent reporter of function is a protein reporter, such as a protein integrity reporter (i.e., a reporter for measuring a protein's structural integrity and stability) or a protein denaturation reporter (i.e., a reporter to detect protein denaturation).

In some aspects, methods for selecting an aptamer for cancer treatment are also provided. For example, in some embodiments, a method for selecting an aptamer for use in personalized cancer treatment comprising: a) providing a population of aptamers characterized by a more than 1.5-fold increase in promoting cell death or apoptosis of the patient-derived cancer cells compared to a control aptamer; b) selecting at least one aptamer candidate from the population of aptamers; and c) formulating the at least one aptamer for use in the personalized cancer treatment. In some embodiments, the functionally enriched population of aptamers is prepared using the aptamer library screening methods described herein.

In some aspects, methods for preparing a tumor targeted delivery system comprising: a) providing a population of aptamers characterized by a more than 1.1-fold (e.g., 1.5-fold) increase in promoting cell death or apoptosis of the patient-derived cancer cells compared to a control aptamer; b) selecting at least one aptamer candidate from the population of aptamers; and c) combining the at least one aptamer with a tumor treatment for a tumor localized delivery. In some embodiments, the functionally enriched population of aptamers is prepared using the aptamer library screening methods described herein.

Aptamers that Induce Apoptosis of Cancer Cells

In certain aspects, provided herein are aptamers that selectively bind to and/or selectively kill cancer cells (e.g., breast cancer cells, such as triple-negative breast cancer cells), including by inducing apoptosis. In some aspects, provided herein are pharmaceutical compositions comprising such aptamers, methods of using such aptamers to treat cancer and/or to kill cancer cells and methods of making such aptamers.

In certain aspects, provided herein are aptamers comprising a nucleic acid sequence that is at least 60% identical (e.g., at least 65% identical, at least 70% identical, at least 75% identical, at least 80% identical, at least 85% identical, at least 90% identical, at least 92% identical, at least 94% identical, at least 96% identical, at least 98% identical) to any one of SEQ ID NOs: 1-10 (Table 1). In some embodiments, the aptamers comprise a nucleic acid sequence of any one of SEQ ID NOs: 1-10. In certain embodiments, the aptamers comprise at least 20 (e.g., at least 25, at least 30, at least 35, at least 40, at least 41, at least 42, at least 43, at least 44, at least 45, at least 46, at least 47, at least 48, at least 49, at least 50, at least 51, at least 52, at least 53) consecutive nucleotides of any one of SEQ ID NO: 1-10. In certain embodiments, the aptamers provided herein comprise a nucleic acid sequence of any one of SEQ ID NOs: 1-10. In some embodiments, the aptamers provided herein have a sequence consisting essentially of SEQ ID NOs: 1-10. In certain embodiments, the aptamers provided herein have a sequence consisting of SEQ ID NO: 1-10.

TABLE 1

Exemplary Aptamer Sequences In certain embodiments the thymine bases can be replaced with uracil bases (e.g., for RNA aptamers).

| Seq ID No. | Sequence |
| --- | --- |
| 1 | TAAGGGTAGCAATGCGTTAGTCGCTTAAAATTCGATTTGCGCATAACACCTCAT |
| 2 | CACAAGGGCAGTACTCTCGAGATTAATGTGTACATGCACTCGCGAAATGTTGAG |
| 3 | TGCGTAGTATAACCGCTAATCAATCGTACAATGTAACCTTGACCGCACACGGCC |
| 4 | CACACAGCGACAGCATAGTCTCGTACTGGCTTAAAACATGAAGTTGCGATTAAT |
| 5 | AACACCGCTATCTATCGTCATGTCAGGCGTGTACTTGACTTACATCTATTGACC |
| 6 | ACATCACATTTGCCTGCGATCAAGCTAACACGCATGATACCATCATGATTAACC |
| 7 | TTGCTGCTCGGATCAGGCAAGACGCTACCCACAACTCGGTTTGTAAGACTACAC |

TABLE 1-continued

Exemplary Aptamer Sequences In certain embodiments the thymine bases can be replaced with uracil bases (e.g., for RNA aptamers).

| Seq ID No. | Sequence |
|---|---|
| 8 | CGGACTCACGCAAGAGCGTTTGGCAGTGTAAAACTGTTTAACGTATCTGCTCGC |
| 9 | ATTGCGAGATCACTATGTTTTAGTCTAGGCTAGCACGCTACTTGGGACTGTAGA |
| 10 | CACGACGAGATACCGTGGTCCTTTGGACGCGAATGTCATTTAGCACTTAGCATT |

The terms "identical" or "percent identity," in the context of two or more nucleic acids, refer to two or more sequences or subsequences that are the same or have a specified percentage of nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms with default parameters described below, or by manual alignment and visual inspection (see, e.g., NCBI web site http://www.ncbi.nlm.nih.gov/BLAST/or the like).

In certain embodiments, the aptamers are no more than 100 nucleotides in length (e.g., no more than 90 nucleotides in length, no more than 85 nucleotides in length, no more than 80 nucleotides in length, no more than 75 nucleotides in length, no more than 70 nucleotides in length, no more than 65 nucleotides in length, no more than 60 nucleotides in length, no more than 59 nucleotides in length, no more than 58 nucleotides in length, no more than 57 nucleotides in length, no more than 56 nucleotides in length, no more than 55 nucleotides in length, or no more than 54 nucleotides in length.

In some embodiments, the aptamers provided herein are able to bind to a cancer cell (e.g., a human cancer cell). In some embodiments, the aptamers provided herein are able to induce cell death (e.g., apoptosis) of a cancer cell (e.g., a human cancer cell) when contacted to the cancer cell. In some embodiments, the cancer cell is a patient-derived cancer cell. In some embodiments, the cancer cell is a solid tumor cell. In certain embodiments, the cancer cell is a carcinoma cell. In some embodiments, the cancer cell is a breast cancer cell. In some embodiments, the cancer cell is a triple-negative breast cancer cell (i.e., a breast cancer cell that does not express the genes for estrogen receptor (ER), progesterone receptor (PR) and HER/2neu). In some embodiments, the aptamers induce cell death when contacted to a the cancer cell in vitro. In certain embodiments, the aptamers induce cell death when contacted to a the cancer cell in vivo (e.g., in a human and/or an animal model).

In some embodiments, the aptamers provided herein comprise one or more chemical modifications. Exemplary modifications are provided in Table 2.

TABLE 2

Exemplary chemical modifications.

| Terminal | Sugar ring | Nitrogen base | Backbone |
|---|---|---|---|
| biotin | 2'-OH (RNA) | BzdU | Phosphorothioate |

TABLE 2-continued

Exemplary chemical modifications.

| Terminal | Sugar ring | Nitrogen base | Backbone |
|---|---|---|---|
| Inverted-dT | 2'-OMe | Naphtyl | Methylphosphorothioate |
| PEG (0.5-40 kDa) | 2'-F | Triptamino | Phosphorodithioate |
| Cholesteryl | 2'-NH2 | Isobutyl | Triazole |
| Albumin | LNA | 5-Methyl Cytosine | Amide (PNA) |
| Chitin (0.5-40 kDa) | UNA | Alkyne (dibenzocyclooctyne) | Alkyne (dibenzocyclooctyne) |
| Chitosan (0.5-40 kDa) | 2'-F ANA | Azide | Azide |
| Cellulose (0.5-40 kDa) | L-DNA | Maleimide | Maleimide |
| Terminal amine (alkyne chain with amine) | CeNA | | |
| Alkyne (dibenzocyclooctyne) | TNA | | |
| Azide | HNA | | |
| Thiol | | | |
| Maleimide | | | |
| NHS | | | |

In certain embodiments, the aptamers comprise a terminal modification. In some embodiments, the aptamers are chemically modified with poly-ethylene glycol (PEG) (e.g., 0.5-40 kDa) (e.g., attached to the 5' end of the aptamer). In some embodiments, the aptamers comprise a 5' end cap (e.g., is an inverted thymidine, biotin, albumin, chitin, chitosan, cellulose, terminal amine, alkyne, azide, thiol, maleimide, NHS). In certain embodiments, the aptamers comprise a 3' end cap (e.g., is an inverted thymidine, biotin, albumin, chitin, chitosan, cellulose, terminal amine, alkyne, azide, thiol, maleimide, NHS).

In certain embodiments, the aptamers provided herein comprise one or more (e.g., at least 1, 2, 3, 4, 5, 6, 7, 8, 9, 10 11, 12, 13, 14, 15, 16, 17, 18, 19, 20, 21, 22, 23, 24, 25, 26, 27, 28, 29, 30 31, 32, 33, 34, 35, 36, 37, 38, 39, 40, 41, 42, 43, 44, 45, 46, 47, 48, 49, 50, 51, 52, 53, or 54) modified sugars. In some embodiments, the aptamers comprise one or more 2' sugar substitutions (e.g. a 2'-fluoro, a 2'-amino, or a 2'-O-methyl substitution). In certain embodiments, the aptamers comprise locked nucleic acid (LNA™), unlocked nucleic acid (UNA) and/or 2'deozy-2'fluoro-D-arabino-nucleic acid (2'-F ANA) sugars in their backbone.

In certain embodiments, the aptamers comprise one or more (e.g., at least 1, 2, 3, 4, 5, 6, 7, 8, 9, 10 11, 12, 13, 14, 15, 16, 17, 18, 19, 20, 21, 22, 23, 24, 25, 26, 27, 28, 29, 30 31, 32, 33, 34, 35, 36, 37, 38, 39, 40, 41, 42, 43, 44, 45, 46, 47, 48, 49, 50, 51, 52, 53, or 54) methylphosphonate internucleotide bonds and/or a phosphorothioate internucleotide bonds. In certain embodiments, the aptamers comprise one or more (e.g., at least 1, 2, 3, 4, 5, 6, 7, 8, 9, 10 11, 12, 13, 14, 15, 16, 17, 18, 19, 20, 21, 22, 23, 24, 25, 26, 27, 28, 29, 30 31, 32, 33, 34, 35, 36, 37, 38, 39, 40, 41, 42, 43, 44, 45, 46, 47, 48, 49, 50, 51, 52, 53, or 54) triazole internucleotide bonds. In certain embodiments, the aptamers are modified with a cholesterol or a dialkyl lipid (e.g., on their 5' end).

In some embodiments, the aptamers comprise one or more modified bases (e.g., BzdU, Naphtyl, Triptamino, Isobutyl, 5-Methyl Cytosine, Alkyne (dibenzocyclooctyne, Azide, Maleimide).

In certain embodiments, the aptamers provided herein are DNA aptamers (e.g., D-DNA aptamers or R-DNA aptamers). In some embodiments, the aptamers provided herein are RNA aptamers (e.g., D-RNA aptamers or R-RNA aptamers). In some embodiments, the aptamers comprise a mixture of DNA and RNA.

Aptamers may be synthesized by methods which are well known to the skilled person. For example, aptamers may be chemically synthesized, e.g. on a solid support. Solid phase synthesis may use phosphoramidite chemistry. Briefly, a solid supported nucleotide is detritylated, then coupled with a suitably activated nucleoside phosphoramidite to form a phosphite triester linkage. Capping may then occur, followed by oxidation of the phosphite triester with an oxidant, typically iodine. The cycle may then be repeated to assemble the aptamer.

Therapeutic Methods

In certain aspects, provided herein are pharmaceutical compositions comprising an aptamer (e.g., a therapeutically effective amount of an aptamer) provided herein. In some embodiments, the pharmaceutical compositions further comprises a pharmaceutically acceptable carrier. In some embodiments, the pharmaceutical composition is formulated for parenteral administration.

In certain embodiments, the pharmaceutical composition is for use in treating cancer. In some embodiments, the cancer is a solid tumor. In certain embodiments, the cancer is a carcinoma. In some embodiments, the cancer is a breast cancer. In some embodiments, the breast cancer is triple-negative breast cancer.

"Pharmaceutically acceptable carrier" refers to a substance that aids the administration of an active agent to and absorption by a subject and can be included in the compositions described herein without causing a significant adverse toxicological effect on the patient. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions (such as Ringer's solution), alcohols, oils, gelatins, carbohydrates such as lactose, amylase or starch, fatty acid esters, hydroxymethy cellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with the compositions described herein. One of skill in the art will recognize that other pharmaceutical excipients are useful.

In some embodiments, provided herein are methods of treating cancer comprising the administration of a pharmaceutical composition comprising one or more aptamer provided herein. In certain embodiments, the cancer is breast cancer. In some embodiments, the cancer is triple-negative breast cancer. Thus, in certain aspects, provided herein is a method of delivering an aptamer and/or pharmaceutical composition described herein to a subject.

In certain embodiments, the pharmaceutical compositions and aptamers described herein can be administered in conjunction with any other conventional anti-cancer treatment, such as, for example, radiation therapy and surgical resection of the tumor. These treatments may be applied as necessary and/or as indicated and may occur before, concurrent with or after administration of the pharmaceutical compositions, dosage forms, and kits described herein. In certain embodiments, the method comprises the administration of multiple doses of the aptamer. Separate administrations can include any number of two or more administrations (e.g., doses), including two, three, four, five or six administrations. One skilled in the art can readily determine the number of administrations to perform, or the desirability of performing one or more additional administrations, according to methods known in the art for monitoring therapeutic methods and other monitoring methods provided herein. In some embodiments, the doses may be separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 days or 1, 2, 3, or 4 weeks. Accordingly, the methods provided herein include methods of providing to the subject one or more administrations of a bacterium, where the number of administrations can be determined by monitoring the subject, and, based on the results of the monitoring, determining whether or not to provide one or more additional administrations. Deciding on whether or not to provide one or more additional administrations can be based on a variety of monitoring results, including, but not limited to, indication of tumor growth or inhibition of tumor growth, appearance of new metastases or inhibition of metastasis, the subject's anti-bacterium antibody titer, the subject's anti-tumor antibody titer, the overall health of the subject and/or the weight of the subject.

The time period between administrations can be any of a variety of time periods. The time period between administrations can be a function of any of a variety of factors, including monitoring steps, as described in relation to the number of administrations, the time period for a subject to mount an immune response and/or the time period for a subject to clear the bacteria from normal tissue. In one example, the time period can be a function of the time period for a subject to mount an immune response; for example, the time period can be more than the time period for a subject to mount an immune response, such as more than about one week, more than about ten days, more than about two weeks, or more than about a month; in another example, the time period can be less than the time period for a subject to mount an immune response, such as less than about one week, less than about ten days, less than about two weeks, or less than about a month. In another example, the time period can be a function of the time period for a subject to clear the bacteria from normal tissue; for example, the time period can be more than the time period for a subject to clear the bacteria from normal tissue, such as more than about a day, more than about two days, more than about three days, more than about five days, or more than about a week.

The effective dose of an aptamer described herein is the amount of the aptamer that is effective to achieve the desired therapeutic response for a particular patient, composition, and mode of administration, with the least toxicity to the patient. The effective dosage level can be identified using the methods described herein and will depend upon a variety of pharmacokinetic factors including the activity of the particular compositions administered, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors well known in the medical arts. In general, an effective dose of a cancer therapy will be the amount of the therapeutic agent which is the lowest dose effective to produce a therapeutic effect. Such an effective dose will generally depend upon the factors described above.

Examples of routes of administration include oral administration, rectal administration, topical administration, inhalation (nasal) or injection. Administration by injection includes intravenous (IV), intralesional, peritumoral, intramuscular (IM), and subcutaneous (SC) administration. The compositions described herein can be administered in any form by any effective route, including but not limited to oral, parenteral, enteral, intravenous, intratumoral, intraperitoneal, topical, transdermal (e.g., using any standard patch), intradermal, ophthalmic, (intra) nasally, local, non-oral, such as aerosol, inhalation, subcutaneous, intramuscular, buccal, sublingual, (trans) rectal, vaginal, intra-arterial, and intrathecal, transmucosal (e.g., sublingual, lingual, (trans) buccal, (trans) urethral, vaginal (e.g., trans- and perivaginally), implanted, intravesical, intrapulmonary, intraduodenal, intragastrical, and intrabronchial. In preferred embodiments, the bacterial compositions described herein are administered orally, rectally, topically, intravesically, by injection into or adjacent to a draining lymph node, intravenously, by inhalation or aerosol, or subcutaneously.

The dosage regimen can be any of a variety of methods and amounts, and can be determined by one skilled in the art according to known clinical factors. As is known in the medical arts, dosages for any one patient can depend on many factors, including the subject's species, size, body surface area, age, sex, immunocompetence, tumor dimensions and general health, the particular microorganism to be administered, duration and route of administration, the kind and stage of the disease, for example, tumor size, and other compounds such as drugs being administered concurrently.

The methods of treatment described herein may be suitable for the treatment of a primary tumor, a secondary tumor or metastasis, as well as for recurring tumors or cancers. The dose of the pharmaceutical compositions described herein may be appropriately set or adjusted in accordance with the dosage form, the route of administration, the degree or stage of a target disease, and the like.

In some embodiments, the dose administered to a subject is sufficient to prevent cancer, delay its onset, or slow or stop its progression or prevent a relapse of a cancer, or contribute to the overall survival of the subject. One skilled in the art will recognize that dosage will depend upon a variety of factors including the strength of the particular compound employed, as well as the age, species, condition, and body weight of the subject. The size of the dose will also be determined by the route, timing, and frequency of administration as well as the existence, nature, and extent of any adverse side-effects that might accompany the administration of a particular compound and the desired physiological effect.

Suitable doses and dosage regimens can be determined by conventional range-finding techniques known to those of ordinary skill in the art. Generally, treatment is initiated with smaller dosages, which are less than the optimum dose of the compound. Thereafter, the dosage is increased by small increments until the optimum effect under the circumstances is reached. An effective dosage and treatment protocol can be determined by routine and conventional means, starting e.g., with a low dose in laboratory animals and then increasing the dosage while monitoring the effects, and systematically varying the dosage regimen as well. Animal studies are commonly used to determine the maximal tolerable dose ("MTD") of bioactive agent per kilogram weight. Those skilled in the art regularly extrapolate doses for efficacy, while avoiding toxicity, in other species, including humans.

In accordance with the above, in therapeutic applications, the dosages of the aptamers provided herein may vary depending on the specific aptamer, the age, weight, and clinical condition of the recipient patient, and the experience and judgment of the clinician or practitioner administering the therapy, among other factors affecting the selected dosage. Generally, the dose should be sufficient to result in slowing, and preferably regressing, the growth of the tumors and most preferably causing complete regression of the cancer.

Examples of cancers that may treated by methods described herein include, but are not limited to, hematological malignancy, acute nonlymphocytic leukemia, chronic lymphocytic leukemia, acute granulocytic leukemia, chronic granulocytic leukemia, acute promyelocytic leukemia, adult T-cell leukemia, aleukemic leukemia, a leukocythemic leukemia, basophilic leukemia, blast cell leukemia, bovine leukemia, chronic myelocytic leukemia, leukemia cutis, embryonal leukemia, eosinophilic leukemia, Gross' leukemia, Rieder cell leukemia, Schilling's leukemia, stem cell leukemia, subleukemic leukemia, undifferentiated cell leukemia, hairy-cell leukemia, hemoblastic leukemia, hemocytoblastic leukemia, histiocytic leukemia, stem cell leukemia, acute monocytic leukemia, leukopenic leukemia, lymphatic leukemia, lymphoblastic leukemia, lymphocytic leukemia, lymphogenous leukemia, lymphoid leukemia, lymphosarcoma cell leukemia, mast cell leukemia, megakaryocytic leukemia, micromyeloblastic leukemia, monocytic leukemia, myeloblastic leukemia, myelocytic leukemia, myeloid granulocytic leukemia, myelomonocytic leukemia, Naegeli leukemia, plasma cell leukemia, plasmacytic leukemia, promyelocytic leukemia, acinar carcinoma, acinous carcinoma, adenocystic carcinoma, adenoid cystic carcinoma, carcinoma adenomatosum, carcinoma of adrenal cortex, alveolar carcinoma, alveolar cell carcinoma, basal cell carcinoma, carcinoma basocellulare, basaloid carcinoma, basosquamous cell carcinoma, bronchioalveolar carcinoma, bronchiolar carcinoma, bronchogenic carcinoma, cerebriform carcinoma, cholangiocellular carcinoma, chorionic carcinoma, colloid carcinoma, comedo carcinoma, corpus carcinoma, cribriform carcinoma, carcinoma en cuirasse, carcinoma *cutaneum*, cylindrical carcinoma, cylindrical cell carcinoma, duct carcinoma, carcinoma durum, embryonal carcinoma, encephaloid carcinoma, epiennoid carcinoma, carcinoma epitheliale adenoides, exophytic carcinoma, carcinoma ex ulcere, carcinoma fibrosum, gelatiniform carcinoma, gelatinous carcinoma, giant cell carcinoma, signet-ring cell carcinoma, carcinoma simplex, small-cell carcinoma, solanoid carcinoma, spheroidal cell carcinoma, spindle cell carcinoma, carcinoma spongiosum, squamous carcinoma, squamous cell carcinoma, string carcinoma, carcinoma telangiectaticum, carcinoma telangiectodes, transitional cell carcinoma, carcinoma *tuberosum*, tuberous carcinoma, verrucous carcinoma, carcinoma *villosum*, carcinoma gigantocellulare, glandular carcinoma, granulosa cell carcinoma, hair-matrix carcinoma, hematoid carcinoma, hepatocellular carcinoma, Hurthle cell carcinoma, hyaline carcinoma, hypernephroid carcinoma, infantile embryonal carcinoma, carcinoma in situ, intraepidermal carcinoma, intraepithelial carcinoma, Krompecher's carcinoma, Kulchitzky-cell carcinoma, large-cell carcinoma, lenticular carcinoma, carcinoma lenticulare, lipomatous carcinoma, lymphoepithelial carcinoma, carcinoma medullare, medullary carcinoma, melanotic carcinoma, carcinoma molle, mucinous carcinoma, carcinoma muciparum, carcinoma mucocellulare, mucoepidermoid carcinoma, carcinoma *mucosum*, mucous carcinoma, carcinoma myxomatodes, naspharyngeal carcinoma, oat cell carcinoma, carcinoma ossificans, osteoid carcinoma, papillary carcinoma, periportal carcinoma, preinvasive carcinoma, prickle cell carcinoma, pultaceous carcinoma, renal cell carcinoma of kidney, reserve cell carcinoma, carcinoma sarcomatodes, schneiderian carcinoma, scirrhous carcinoma, carcinoma scroti, chondrosarcoma, fibrosarcoma, lymphosarcoma, melanosarcoma, myxosarcoma, osteosarcoma, endometrial sarcoma, stromal sarcoma, Ewing's sarcoma, fascial sarcoma, fibroblastic sarcoma, giant cell sarcoma, Abemethy's sarcoma, adipose sarcoma, liposarcoma, alveolar soft part sarcoma, ameloblastic sarcoma, botryoid sarcoma, chloroma sarcoma, chorio carcinoma, embryonal sarcoma, Wilms' tumor sarcoma, granulocytic sarcoma, Hodgkin's sarcoma, idiopathic multiple pigmented hemorrhagic sarcoma, immunoblastic sarcoma of B cells, lymphoma, immunoblastic sarcoma of T-cells, Jensen's sarcoma, Kaposi's sarcoma, Kupffer cell sarcoma, angiosarcoma, leukosarcoma, malignant mesenchymoma sarcoma, parosteal sarcoma, reticulocytic sarcoma, rhabdosarcoma, serocystic sarcoma, synovial sarcoma, telangiectaltic sarcoma, Hodgkin's Disease, Non-Hodgkin's Lymphoma, multiple myeloma, neuroblastoma, bladder cancer, breast cancer, ovarian cancer, lung cancer, colorectal cancer, rhabdomyosarcoma, primary thrombocytosis, primary macroglobulinemia, small-cell lung tumors, primary brain tumors, stomach cancer, colon cancer, malignant pancreatic insulanoma, malignant carcinoid, premalignant skin lesions, testicular cancer, lymphomas, thyroid cancer, neuroblastoma, esophageal cancer, genitourinary tract cancer, malignant hypercalcemia, cervical cancer, endometrial cancer, adrenal cortical cancer, Harding-Passey melanoma, juvenile melanoma, lentigo maligna melanoma, malignant melanoma, acral-lentiginous melanoma, amelanotic melanoma, benign juvenile melanoma, Cloudman's melanoma, S91 melanoma, nodular melanoma subungal melanoma, superficial spreading melanoma, plasmacytoma, colorectal cancer, rectal cancer.

In some embodiments, the methods and compositions provided herein relate to the treatment of a sarcoma. The term "sarcoma" generally refers to a tumor which is made up of a substance like the embryonic connective tissue and is generally composed of closely packed cells embedded in a fibrillar, heterogeneous, or homogeneous substance. Sarcomas include, but are not limited to, chondrosarcoma, fibrosarcoma, lymphosarcoma, melanosarcoma, myxosarcoma, osteosarcoma, endometrial sarcoma, stromal sarcoma, Ewing's sarcoma, fascial sarcoma, fibroblastic sarcoma, giant cell sarcoma, Abemethy's sarcoma, adipose sarcoma, liposarcoma, alveolar soft part sarcoma, ameloblastic sarcoma, botryoid sarcoma, chloroma sarcoma, chorio carcinoma, embryonal sarcoma, Wilms' tumor sarcoma, granulocytic sarcoma, Hodgkin's sarcoma, idiopathic multiple pigmented hemorrhagic sarcoma, immunoblastic sarcoma of B cells, lymphoma, immunoblastic sarcoma of T-cells, Jensen's sarcoma, Kaposi's sarcoma, Kupffer cell sarcoma, angiosarcoma, leukosarcoma, malignant mesenchymoma sarcoma, parosteal sarcoma, reticulocytic sarcoma, Rous sarcoma, serocystic sarcoma, synovial sarcoma, and telangiectaltic sarcoma.

Additional exemplary neoplasias that can be treated using the methods and compositions described herein include Hodgkin's Disease, Non-Hodgkin's Lymphoma, multiple myeloma, neuroblastoma, breast cancer, ovarian cancer, lung cancer, rhabdomyosarcoma, primary thrombocytosis, primary macroglobulinemia, small-cell lung tumors, primary brain tumors, stomach cancer, colon cancer, malignant pancreatic insulanoma, malignant carcinoid, premalignant skin lesions, testicular cancer, lymphomas, thyroid cancer, neuroblastoma, esophageal cancer, genitourinary tract cancer, malignant hypercalcemia, cervical cancer, endometrial cancer, and adrenal cortical cancer.

In some embodiments, the cancer treated is a melanoma. The term "melanoma" is taken to mean a tumor arising from the melanocytic system of the skin and other organs. Non-limiting examples of melanomas are Harding-Passey melanoma, juvenile melanoma, lentigo maligna melanoma, malignant melanoma, acral-lentiginous melanoma, amelanotic melanoma, benign juvenile melanoma, Cloudman's melanoma, S91 melanoma, nodular melanoma subungal melanoma, and superficial spreading melanoma.

Particular categories of tumors that can be treated using methods and compositions described herein include lymphoproliferative disorders, breast cancer, ovarian cancer, prostate cancer, cervical cancer, endometrial cancer, bone cancer, liver cancer, stomach cancer, colon cancer, colorectal cancer, pancreatic cancer, cancer of the thyroid, head and neck cancer, cancer of the central nervous system, cancer of the peripheral nervous system, skin cancer, kidney cancer, as well as metastases of all the above. Particular types of tumors include hepatocellular carcinoma, hepatoma, hepatoblastoma, rhabdomyosarcoma, esophageal carcinoma, thyroid carcinoma, ganglioblastoma, fibrosarcoma, myxosarcoma, liposarcoma, chondrosarcoma, osteogenic sarcoma, chordoma, angiosarcoma, endotheliosarcoma, Ewing's tumor, leimyosarcoma, rhabdotheliosarcoma, invasive ductal carcinoma, papillary adenocarcinoma, melanoma, pulmonary squamous cell carcinoma, basal cell carcinoma, adenocarcinoma (well differentiated, moderately differentiated, poorly differentiated or undifferentiated), bronchioloalveolar carcinoma, renal cell carcinoma, hypernephroma, hypernephroid adenocarcinoma, bile duct carcinoma, choriocarcinoma, seminoma, embryonal carcinoma, Wilms' tumor, testicular tumor, lung carcinoma including small cell, non-small and large cell lung carcinoma, bladder carcinoma, glioma, astrocyoma, medulloblastoma, craniopharyngioma, ependymoma, pinealoma, retinoblastoma, neuroblastoma, colon carcinoma, rectal carcinoma, hematopoietic malignancies including all types of leukemia and lymphoma including: acute myelogenous leukemia, acute myelocytic leukemia, acute lymphocytic leukemia, chronic myelogenous leukemia, chronic lymphocytic leukemia, mast cell leukemia, multiple myeloma, myeloid lymphoma, Hodgkin's lymphoma, non-Hodgkin's lymphoma.

Cancers treated in certain embodiments also include precancerous lesions, e.g., actinic keratosis (solar keratosis), moles (dysplastic nevi), acitinic chelitis (farmer's lip), cutaneous horns, Barrett's esophagus, atrophic gastritis, dyskeratosis congenita, sideropenic dysphagia, lichen planus, oral submucous fibrosis, actinic (solar) elastosis and cervical dysplasia.

Cancers treated in some embodiments include non-cancerous or benign tumors, e.g., of endodermal, ectodermal or mesenchymal origin, including, but not limited to cholangioma, colonic polyp, adenoma, papilloma, cystadenoma, liver cell adenoma, hydatidiform mole, renal tubular adenoma, squamous cell papilloma, gastric polyp, hemangioma, osteoma, chondroma, lipoma, fibroma, lymphangioma, leiomyoma, rhabdomyoma, astrocytoma, nevus, meningioma, and ganglioneuroma.

EXAMPLES

Example 1—Reagents for Use in Examples 2 and 3

To make binding buffer (×10), 50 mg tRNA was weighed and distributed into a 50 ml tube, and 5 ml of azide solution (10% azide in PBSX1), 0.5 ml $MgCl_2$ (1M) and 44.5 mL PBSX1 were added. Medium with 10% human serum was made by adding 10% human serum to the standard growth medium of the target cancer cells (e.g., DMEM, IMDM, RPMI etc.). Random DNA library was generated by dissolving DNA library in DNase/RNase free ultra-pure water (UPW) to a final concentration of 1 mM and aliquot to Eppendorf Tubes® (plastic test tubes). Aptamer capping (cap 3' and cap 5') solution was made by preparing oligonucleotide sequences complementary to the primer sequence and dissolving each of cap 3' and cap 5' in DNase/RNase free UPW to a final concentration of 100 mM and aliquot the volume to Eppendorf Tubes® (plastic test tubes). A tube of both cap 3' and cap 5' in a concentration of 50 mM was prepared. The above solutions were made fresh and stored at 4° C., and then pre-warmed to room temperature before each experiment.

Figure 2:
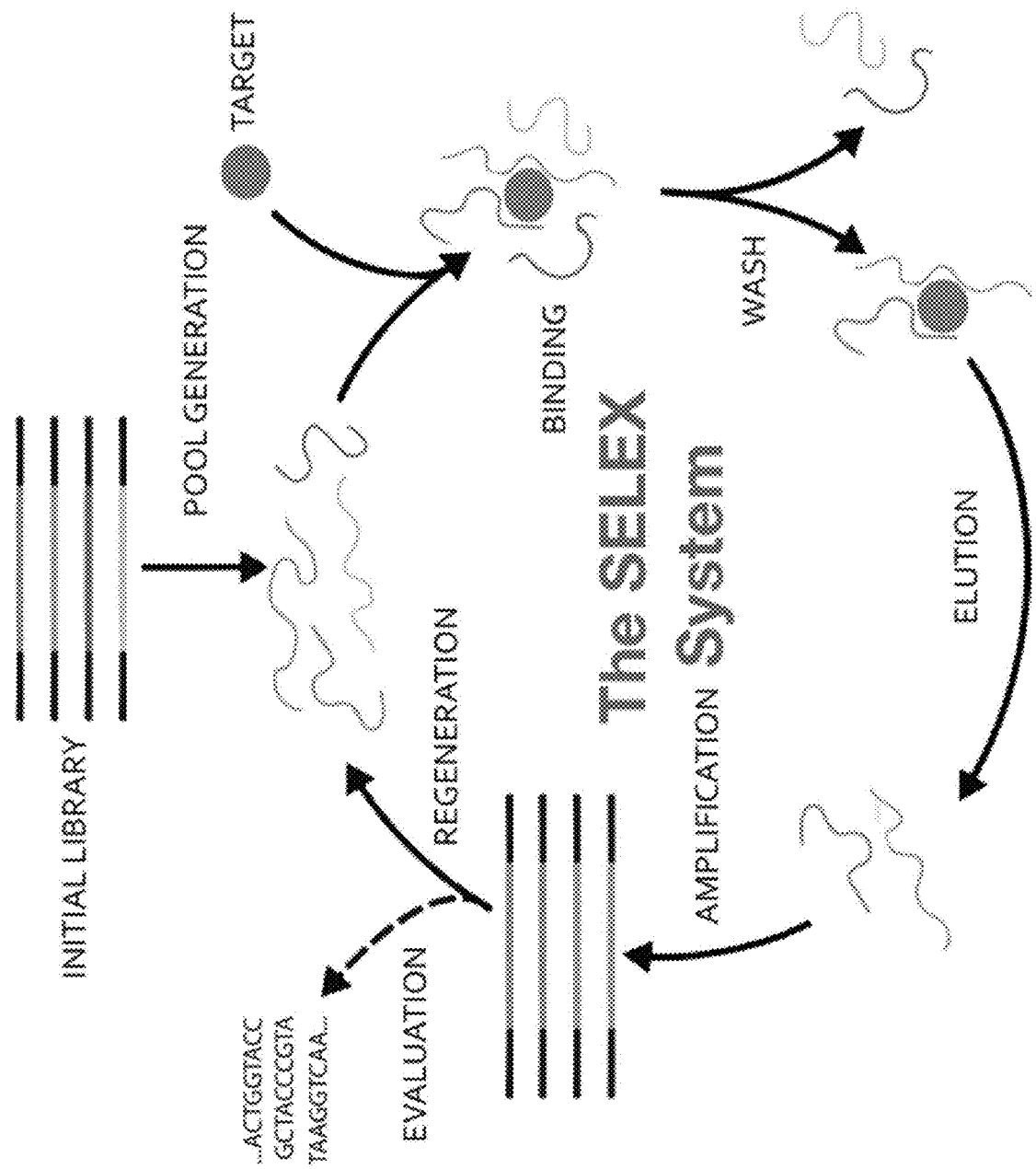
FIG. 2 is a schematic diagram of binding SELEX assay work flow described herein.

Example 2—Binding CELL-SELEX: Selection of Binding Aptamers to Target Cells (See FIG. 2)

a. Binding SELEX on Cancer cells, Round #1

Cells were prepared a day in advance. Cells were split in a ratio of 1:2 or 1:3 depending on the growth rate of the cells being tested. Cells were counted with PI and run at the flow cytometer Cytoflex®.

The pool of aptamers was prepared in a DNase/RNase free Eppendorf Tube® (plastic test tube) as described in Table 3.

TABLE 3 library preparation for round 1 of binding SELEX

| Reagent | Stock concentration | Volume [μl] | Final concentration |
|---|---|---|---|
| CAP 3' | 1 mM | 21.45 | 42.9 μM |
| CAP 5' | 1 mM | 21.45 | 42.9 μM |
| PBS (—Ca—Mg) | X10 | 5.56 | X1 |
| Binding buffer + NaN3 | X10 | 6.18 | X1 |
| Random Library | 1 mM | 7.15 | 14.3 μM |

The pool of aptamers was denatured by heating it at 95° C. for 5 min., spin down, and then cool on ice for 10 min. 438.21 μl medium plus 10% human serum was added to the pool of aptamers, and the tube was incubated at room temperature for at least 10 min. 5.0E6 cells were transferred into an Eppendorf Tube® (plastic test tube) and centrifuged at 300×g for 5 min. The supernatant was discarded and the cells were resuspended in 1 ml of medium. The cells were centrifuged at 300×g for 5 min again and the supernatant was discarded. The pool of aptamers was then added to the cell pellet, mixed gently, and incubated at 37° C., 50 rpm for 1 hour. Cells were then centrifuged at 300×g for 5 min, and the unbound sequences were removed by removing most supernatant (leaving only about 10 μl supernatant in the tube). The cells were then washed using 1 ml medium twice by repeating the steps of suspending cells with 1 ml medium, centrifuging the cells at 300×g for 5 min, removing most supernatant (leaving only about 10 μl supernatant in the tube), and transferring cells to a new tube twice. To elute the bound DNA, 590 μL UPW was added to the pellet and then heated at 95° C. for 10 min. The reaction was then centrifuged at 13.1×g for 5 min at room temperature, and the supernatant was transferred into a new tube.

PCR calibration was prepared with the following conditions: 30% and 60% template, 30 and 36 cycles, primer ratio 1:10, and the Tm is the lower Tm of the 2 primers. The reaction was assembled according to the Table 4, vortexed and spin down. Experiment was done on ice and quickly after herculase addition.

TABLE 4

PCR calibration

| | 60% template | | 30% template | |
|---|---|---|---|---|
| tube number | x1 | x5 (20 μl) | x1 | x5 (20 μl) |
| UPW | 1.7 | 8.5 | 7.7 | 38.5 |
| Buffer | 4 | 20 | 4 | 20 |
| dNTPs | 1.6 | 8 | 1.6 | 8 |
| For primer 100 uM | 0.25 | 1.25 | 0.25 | 1.25 |
| Rev primer 10 uM | 0.25 | 1.25 | 0.25 | 1.25 |
| Elution | 12 | | 6 | |
| Herculase | 0.2 | 1 | 0.2 | 1 |
| | 20 | 100 | 20 | 100 |

8 PCR tubes were prepared, 4 for 60% template and 4 for 30% template. 12 μl UPW was added to the negative of 60% template and 6 μl UPW was added to the negative of 30% template. The same volumes of elution were added to the test tubes. 8 μl of the PCR calibration 5 mix was added to each 60% template tube and 14 μl of the mix was added to each 30% template tube. Marker of lib was prepared by diluting the marker with UPW to a concentration of 10 μM and mixing with the loading dye. Marker can be stored at 4° C. and used for calibrating the library. Run the PCR reaction using the program as follows (the Tm can change based on the primers Tm):

TABLE 5

PCR program for binding

| Temp. | Time | Cycles |
|---|---|---|
| 95 | 3 min | 1 |
| 95 | 30 sec | 36 |
| Tm = 56* | 30 sec | 36 |
| 72 | 30 sec | 36 |
| 4 | infinite | ∞ |

20 μl of each sample was loaded to a 3% agarose gel with 4 μl loading dye. The strongest band of single strand at the size of the marker was isolated. The PCR reaction condition that gave rise to the strongest band was used to run the large-scale PCR reaction. For example, the condition of 30% template, 30 cycles, 1:10, and Tm=56° C. was used for the large-20 scale PCR reaction.

TABLE 6

Large scale PCR

| 30% template 1:10 | x35 |
|---|---|
| UPW | 673.75 |
| Buffer | 350 |
| dNTPs | 140 |
| For primer 100 uM | 21.875 |
| Rev primer 10 uM | 21.875 |
| Elution | 525 |
| Herculase | 17.5 |
|  | 50 each |

The sample was concentrated with 10 k Amicon® Ultra Centrifugal Filters. The column was inserted into the designated tube and 500 µl of the sample was added into each tube. The tube was centrifuged at 14,000×g for 20 min. Each column was transferred upside down into a new Eppendorf Tube® (plastic test tube) and the new tube was centrifuged at 1000×g for 2 min. Samples in all tubes were merged and about 80 to 100 µl in total obtained.

HPLC vial with insert was prepared. The volume of the sample was measured and up to 102 µl of sample was transfer into the insert. The sample was ran through the HPLC vial until completion, which took about 20 min. The results from HPLC was analyzed. The fractions were ran on 3% agarose gel and the desired fractions were merged. DNA was cleaned and the concentration was determined using Nano Drop® Microvolume Spectrophotometer.

b. Binding SELEX on Cancer cells, Round #2

Round #2 was performed by repeating steps of round #1 with changes described below. The pool of aptamers was prepared in a DNase/RNase free Eppendorf Tube® (plastic test tube) as described in Table 7.

incubate at 37° C., 50 rpm for 50 min (rather than 1 hr as in round #1). Washing and Elution steps were identical to Round #1. Negative selection was performed, for example, against PBMCs. 80 µl Binding BufferX1 was added without azide to the pellet. The bound DNA was eluted by heating at 95° C. for 10 min and centrifuged at 13.1×g for 5 min at room temperature. The supernatant was transferred into a new tube. The eluted DNA was denatured by heating at 95° C. for 5 min (spin down) and then cooling on ice for 10 min. 220 µl medium plus 10% human serum was added. A vial of PBMCs was thawed and counted, and an amount of 5.0E6 cells was aliquot into an Eppendorf Tube® (plastic test tube). The cells were Centrifuged at 300×g for 5 min. Supernatant was discarded and 1 ml of clean medium (without supplements) was added to suspend the cells. The cells were centrifuged at 300×g for 5 min again. The supernatant was discarded and fresh medium was added to the pellet. The Eppendorf Tube® (plastic test tube) was incubated at 37° C., 50 rpm for 1 hour. The cells were centrifuged at 300×g for 10 min. The sup was transferred into a new tube. The amplification and purification was done by repeat procedures of round #1 with 150 µl from the elution (total of 500 µl sample).

c. Binding SELEX on Cancer cells, Round #3

Round #3 was performed by repeating steps of round #2 with increased restriction of conditions: for example, 3.0E6 cells were used for incubation and the incubation time was reduced to 40 min.

Example 3—Functional SELEX for Suspended Cells: Selection of the Functional Aptamers to Target Cells (See FIG. 3)

Log PCR calibration was prepared for the supernatant from round #3 in Example 3. Samples were prepared using

TABLE 7

Pool preparation for round #2

|  | Calculation | Example | Final volume |
|---|---|---|---|
| Elution | $C_{\mu M} = \dfrac{C_{ng}/\mu l \times 1000}{29700}$ | $C_{\mu M} = \dfrac{76.5_{ng}/\mu l \times 1000}{29700} = 4.76\ \mu M$ | 58.36 µl |
|  | $C_{\mu M} \times V_{Elution} = 0.5\ \mu M \times 300\ \mu l$ | $4.76_{\mu M} \times V_{Elution} = 0.5\ \mu M \times 500\ \mu l$ <br> $V_{Elution} = 58.36\ \mu l$ |  |
| Mix caps 5' + 3' | $\dfrac{V_{Elution} \times C_{Elution}}{50\ \mu M} \times 3 = V_{mix\ caps}$ | $\dfrac{58.36\ \mu l \times 2.57\ \mu M}{50\ \mu M} \times 3 = 9\ \mu l = V_{mix\ caps}$ | 9 µl |
| PBS × 10 | $\dfrac{V_{Elution} + V_{mix\ caps}}{9} = V_{PBSX10}$ | $\dfrac{58.36\ \mu l + 9\ \mu l}{9} = 7.48\ \mu l = V_{PBSX10}$ | 7.48 µl |
| Binding buffer × 10 | $\dfrac{V_{Elution} + V_{mix\ caps} + V_{PBSX10}}{9} = V_{BBX10}$ | $\dfrac{58.36\ \mu l + 9\ \mu l + 7.48\ \mu l}{9} = 8.31\ \mu l$ | 8.31 µl |
| Medium + 10% human serum | If needed add × volume in order to reach 300 µl total |  | 216.81 µl |
| Total volume |  |  | 300 µl |

5.0E6 cells were transferred into an Eppendorf Tube® (plastic test tube) (this number can be changed according to cell type however should be more restricted than previous conditions). The Eppendorf Tube® (plastic test tube) was Table 8 with 8, 10, 12 and 14 cycles of PCR (the first 3 cycles with Tm 56° C. and the rest with the Tm of the primers). 20 µl of each sample was loaded to 3% agarose gel with 4 µl loading dye.

TABLE 8

Log PCR calibration

|  | X1 (20 µl) template 15% | X9 (µl) | X1 (20 µl) template 30% | X9 |
|---|---|---|---|---|
| UPW | 9.2 | 82.8 | 6.2 | 55.8 |
| Herculase buffer x5 | 4 | 36 | 4 | 36 |
| dNTPs 10 mM | 1.6 | 14.4 | 1.6 | 14.4 |
| Primer P1- for 10 µM | 1 | 9 | 1 | 9 |
| Primer A-rev 10 µM | 1 | 9 | 1 | 9 |
| Enzyme herculase | 0.2 | 1.8 | 0.2 | 1.8 |
| Sample | 3 | 3 each | 6 | 6 each |
| tot | 20 | | | |

Large scale PCR reactions were run, for example, using conditions of 15% template, 12 cycles, and Tm=56° C.

TABLE 9

Large scale PCR

|  | X3 (150 µl) template 15% |
|---|---|
| UPW | 69 |
| Herculase buffer | 30 |
| dNTPs 10 mM | 12 |
| Primer P1- for 10 µM | 7.5 |
| Primer A-rev 10 µM | 7.5 |
| Enzyme herculase | 1.5 |
| Sample | 22.5 |
| Total | 150 |

Samples from all PCR tubes were merged, and 102 µl of sample was purified using HPLC. The concentration of purified DNA was measured in Qubit™ fluorometer.

Beads were prepared using 2 nM of Invitrogen's Template beads for ion Torrent™ according to Table 10.

TABLE 10

Beads preparation

|  | Volume (µl) |
|---|---|
| Invitrogen's Template beads for ion Torrent™ in UPW 2 nM | 25 |
| CapFull 3' ATTO 100 µM | 5 |
| CapFull 5' 100 µM | 5 |
| PBS X10 | 3.89 |
| Bining bufferX10 (no azide) | 4.32 |

The purified DNA sample was denatured by heating at 95° C. for 5 min, and centrifuged down and then cooled on ice for 10 min. The tube was incubated at room temperature for 30 min, at 90/60 rpm. 800 µl medium plus 10% human serum was added to the pool.

5.0E6 cells was transferred into an Eppendorf Tube® (plastic test tube). Two controls were prepared: Negative (cells only) and Positive (cells and toxin). The cells were centrifuged at 300×g for 5 min. the supernatant was discarded and 1 ml of clean medium (without supplements) was added. the cells were centrifuged at 300×g for 5 min. The supernatant was discarded and the beads pool was added to the pellet and mixed gently. The Eppendorf Tube® (plastic test tube) was incubated at 37° C., 90/60 rpm for 1 hour, and then centrifuged at 300×g for 5 min. the supernatant was removed. 800 µl medium plus 10% human serum and 0.8 µl caspase 3/7 green were added. The tube was Incubated 15 min at 37° C. Two FACS tubes coated with BSA labeled as dead complex and live complex were prepared. The samples were ran in BD FACSMelody™ Cell Sorter (controls were ran first to adjust the gain). The sample was sorted based on yield for round 1 and purity for round 2 and on. Both sorted cells, the dead cancer cells in complex with bead aptamer in tube #1, and the live cancer cells in complex with bead aptamer in tube #2, were obtained. The bound DNA was eluted by heating at 95° C. for 10 min and centrifuged at 300×g for 5 min at room temperature. The supernatant was transferred into a new tube.

PCR calibration was prepared with the following conditions: 15% template (upscale to 30% and more if not enough), and 14 to 22 cycles with the first 3 cycles unchanged (Table 11) and using the lower Tm of the 2 primers as the Tm.

TABLE 11

PCR calibration before beads

|  | X1 (20 µl) template 15% |
|---|---|
| UPW | 9.2 |
| Herculase buffer | 4 |
| dNTPs 10 mM | 1.6 |
| Primer P1- for 10 µM | 1 |
| Primer A-rev 10 µM | 1 |
| Enzyme herculase | 0.2 |
| Sample | 3 |
| Total | 20 |

The PCR reaction was performed with the program as follows:

TABLE 12

PCR program

| Cycles | Time | Temp ° C. |
|---|---|---|
| 1 | 3 min | 95 |
| x3 | 30 sec | 95 |
| x3 | 30 sec | 56 |
| x3 | 30 sec | 72 |
| X7 | 30 sec | 95 |
| X7 | 30 sec | Tm = 67.2* |
| X7 | 30 sec | 72 |
| 1 | ∞ | 4 |

20 µl of each sample was loaded to 3% agarose gel with 4 µl loading dye. Large scale PCR was ran as follows:

TABLE 13

Large scale PCR

|  | X1 (50 µl) template 15% | X4 (200 µl) |
|---|---|---|
| UPW | 23 | 92 |
| Herculase buffer | 10 | 40 |
| dNTPs 10 mM | 4 | 16 |
| Primer P1- for 10 µM | 2.5 | 10 |
| Primer A-rev 10 µM | 2.5 | 10 |
| Enzyme herculase | 0.5 | 2 |
| Sample | 7.5 | 30 |
| Total | 50 | 200 |

An HPLC vial with insert was prepared. The volume of the sample was measured and the volume (102 µl) was transferred into the insert. The vial was closed with the cap and placed in location P1A1. The sample was ran through HPLC until completion, which took about 20 min. the results from HPLC were analyzed and if needed, the fractions were ran on 3% agarose gel. The concentration was measured in Qubit™ fluorometer and 2 nM beads were prepared. Procedures in round #2 were repeated as many rounds as needed. Most abundant functional aptamers in the resulting pool was sequenced based on standard methods. The identified aptamers were validated in apoptosis assay using cancer cells.

Example 4—Exemplary Functional Cell-SELEX Procedure

Three rounds of binding SELEX on cancer cells were performed (e.g., as described in Example 2). Specifically, A ssDNA library constructed of a random core flanked by constant regions is folded in the presence of constant region-complementary oligonucleotides (termed caps). Folding was carried out by incubation at 95° C. for 5 min, cooling on ice for 10 min, and an additional 10 min incubation at 37° C. Folded library and cells were incubated together in the target cell medium supplemented with 10% human serum for 1h. Library concentration in the incubation step was set to 500 nM. After each round, the sample was washed to dilute unbound candidates $10^4$-fold for the first selection round and $10^6$-fold from the second round forth. To prepare the next round's input library, the bound fraction was eluted by incubation at 95° C. for 10 min. From the 2nd round on a negative selection was added. The eluted library was folded again and incubated with the non-target cells as described above, this time the unbound fraction is taken as an input for an asymmetric PCR (aPCR) process. ssDNA was purified from the aPCR product using preparative HPLC on an Agilent® 1100 High-performance liquid chromatography (HPCL) instrument. Samples of output libraries from all rounds were stored for evaluation.

Figure 5:
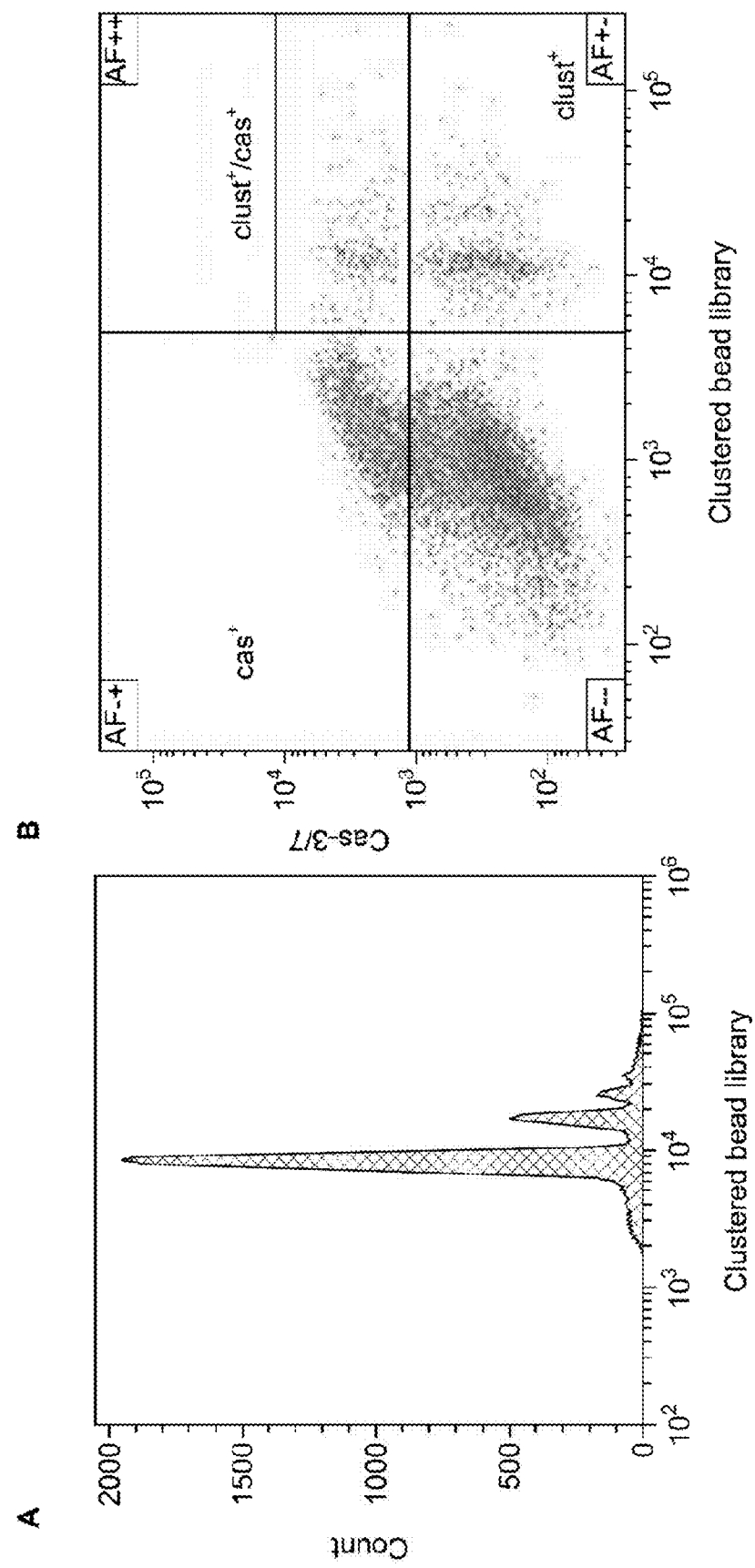
FIG. 5 is an exemplary flow cytometry gating and sorting strategy. Panel A is a histogram of the microbead clustered library before incubation with the target cells. Panel B is a scatter plot of the microbead clustered library incubated with the target cells followed by incubation with a caspase-3/7 probe (Cas-3/7).

Following three rounds of binding SELEX, the binding-enriched library is amplified unto microbeads in a water-in-oil emulsion such that each picoliter droplet contains, on average, a single sequence of the binding-enriched library. Emulsion PCR is then carried out, via IonTorrent® One-Touch™ automated sample prep system, to amplify each aptamer onto the surface of the bead inside the droplet picoreactor. This is followed by breaking of the emulsion. The aptamer bead library is comprised of $10^8$ microbeads, each clustered with multiple copies of a single oligo. This library is used in the first round of the Functional SELEX. The bead library is prepared for incubation with the cells with a rapid thermal ramp including oligo Caps that complement the flanking regions of the library, these contain a fluorescence functional label (FIG. 5A).

A bead can hold several candidates. The more candidates each bead holds, the bigger variety of candidates can be screened for a given number of beads. However, increasing the number of candidates on a single bead reduces the effective concentration for each of the candidates. To generate the clustered beads the Ion Proton sample prep Ion PI™ Hi-Q™ OT2 200 Kit and an Ion OneTouch™ automated sample prep system was used. The protocol supplied with the kit is optimized for proton sequencing technology, where the creation of a high percentage of monoclonal beads is a priority. Instead of the manufacturer's recommended use of a 6-8 μl of a 100 pM stock to generate about 10% templated beads, 1 μl of a 2 nM stock was used to generate about 40% templated beads. The Poisson distribution that fits this percent of templated beads shows that >0.75 of the population of templated beads are monoclonal, ~ 0.195 of the templated beads are biclonal and only ~0.05 of this population holds 3 oligo candidates or above. With the number of beads per reaction as the limiting factor, this translates to ~$642 \times 10^6$ oligos represented over ~$500 \times 10^6$ beads. With the exception of higher than the recommended amount of template, the Ion PI™ Hi-Q™ OT2 200 Kit user manual instructions were followed. Enrichment QC was done using the Ion Sphere™ Quality Control Kit according to the manufacturer instructions. Ion spheres were labeled using Cy5 conjugated caps in order to help with their detection in the FACSMelody™ cell sorter.

Figure 6:
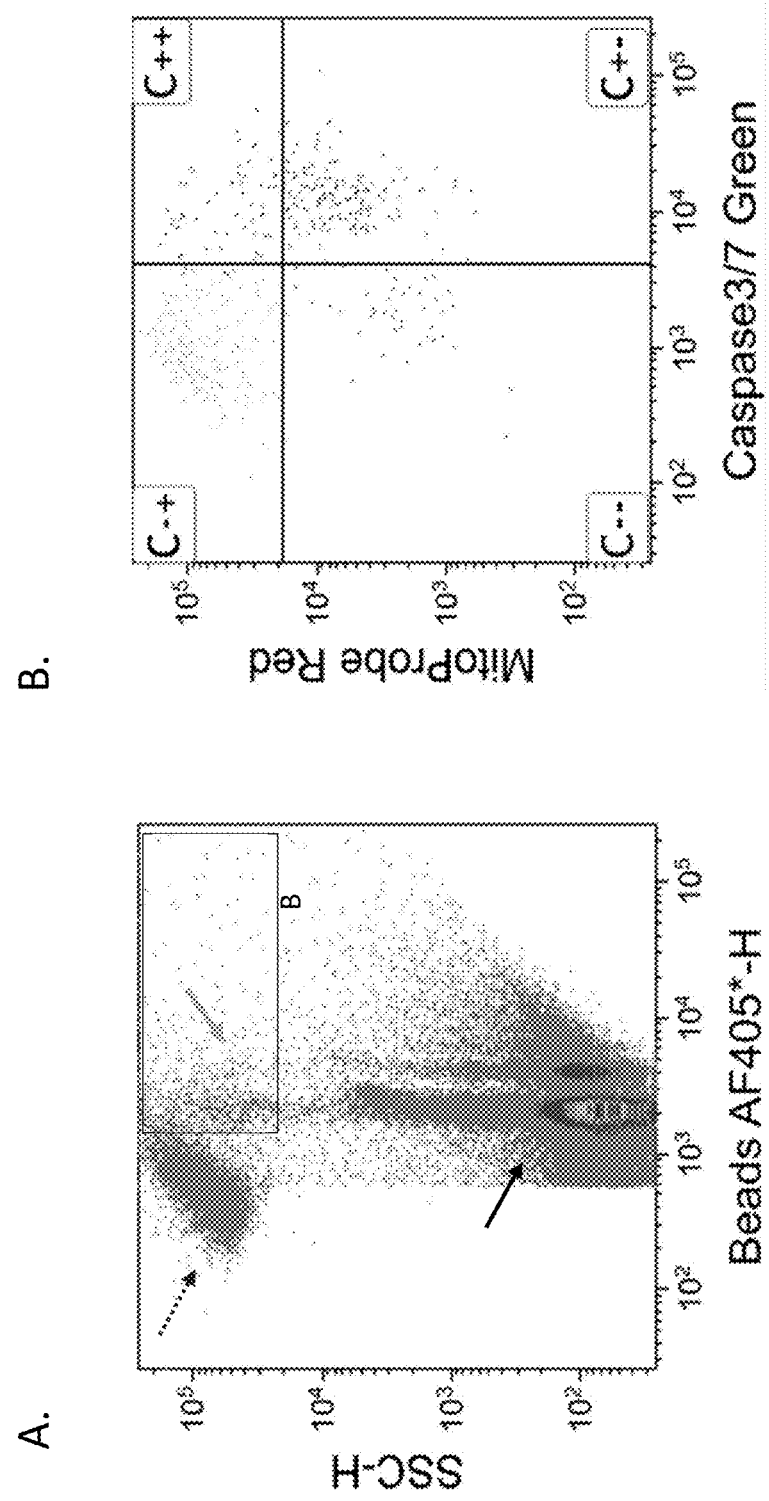
FIG. 6 is an exemplary flow cytometry gating and sorting strategy involving two functional probes. Panel A is a scatter plot showing cells bound to the clustered bead library in the black rectangle. Panel B is a scatter plot of events from the black rectangle in Panel A, showing events probed for caspase-3/7 and mitochondrial membrane potential (MitoProbe™ Red).

Target cancer cells were prepared a day in advance by splitting the cells at a ratio of 1:2/1:3 to reach 90% confluence in a culture dish. Two controls were prepared: cells only (negative control) and cells with toxin (positive control). The cell culture media was changed to condition medium 1 hour before the bead library was added. Culture media was aspirated and the aptamer bead library, which was diluted in medium containing 10% human serum, was added to the cells and incubated for 1.5-2 hours at 37° C. under gentle shaking conditions. Unbound aptamers were collected from the media supernatant and transferred to a new tube. The target cells containing bound aptamers were gently lifted off the plate and merged into one collection tube. The cells were incubated with 1.5 μL of functional probe CellEvent™ Caspase-3/7 from a stock concentration of 500 nM for 15 minutes at 37° C. in the dark. In some cases, two functional probes were incubated simultaneously on target cell and bead library mixture, such as CellEvent™ Caspase-3/7 and MitoProbe™ Dilc1 (FIG. 6). Functional labeling was also carried out in which the cells that were initially stained with one functional probe were followed by incubation with a second functional probe to better differentiate between signal to noise in the FACS analysis. Exemplary alternative probes that can be used in Functional Cell Selex procedures are provided in Table 14.

TABLE 14

Exemplary probes

| Probe Name | Distributer | CAT# |
|---|---|---|
| CellEvent Caspase-3/7 | Invitrogen | C10423 |
| MitoProbe Dilc1(5) | Invitrogen | M34151 |
| Annexin V | BioLegend | 640945 |
| Violet Ratiometric Membrane Asymmetry | Invitrogen | A35137 |
| Violet Live Cells Caspase | BD Pharmigen | 565521 |
| Caspase-8 (active) | abcam | ab65614 |
| Caspase-9 (active) | abcam | ab65615 |
| MitoProbe $DiOC_2(3)$ | Invitrogen | M34150 |
| CellTrace Calcein Violet | Invitrogen | C34 858 |

Two FACS tubes pre-coated with BSA were labeled as dead complex (tube #1) and live complex (tube #2). The samples were ran in BD FACSMelody™ Cell Sorter (controls were ran first to adjust the gain). The sample was sorted based on yield for round 1 and purity for round 2 and so on. Only morphological intact cells were gated on during sorting. Cells which were bound to beads and were positive for caspase-3/7 staining (clust+/cas+) were considered 'Positive Events.' Cells that were bound to beads but negative for caspase3/7 staining (clust+) were also collected for future analysis and classified as 'Negative Events.' An exemplary gating strategy is illustrated in FIG. 5B. Both sorted cells, the dead cancer cells in complex with bead aptamer in tube #1, and the live cancer cells in complex with bead aptamer in tube #2, were obtained. The bound DNA was eluted by heating at 95° C. for 10 min sand centrifuged at 300×g for 5 min at room temperature. The supernatant was transferred into a new tube. Events that were positive for the caspase-3/7 dye and bead label were amplified by emulsion PCR to obtain a bead library for the next round of Functional SELEX. Functional SELEX and emulsion PCR were repeated until a functional enrichment was observed in the target cell population incubated with the beads.

Example 5—Validation of Cytotoxicity on Different Tumor Cells by Functionally-Enriched Aptamer Library Multiple rounds of the functional cell SELEX process described in Example 7 were performed on the following cancer cell lines:
A. HCT116 human colorectal cancer cell line
B. 4T1 murine breast cancer cell line
C. CT26 murine colorectal cancer cell line
D. Kasumi-1 human acute myeloid leukemia (AML) cell line
E. AML1 primary AML myeloblasts from a donor
F. AML9 primary AML myeloblasts from a donor
G. CLL1 primary chronic lymphocytic leukemia (CLL) lymphocytes from a donor With the exception of the Kasumi-1 cells, the functional cell SELEX process was initiated following three rounds of Binding SELEX and caspase-3/7 apoptosis was measured. For Kasumi-1 cells, Functional SELEX was initiated from a random library (not binding-enriched) and mitochondrial membrane potential (MitoProbe™ DilC1 (5)) was measured.

Figure 7:
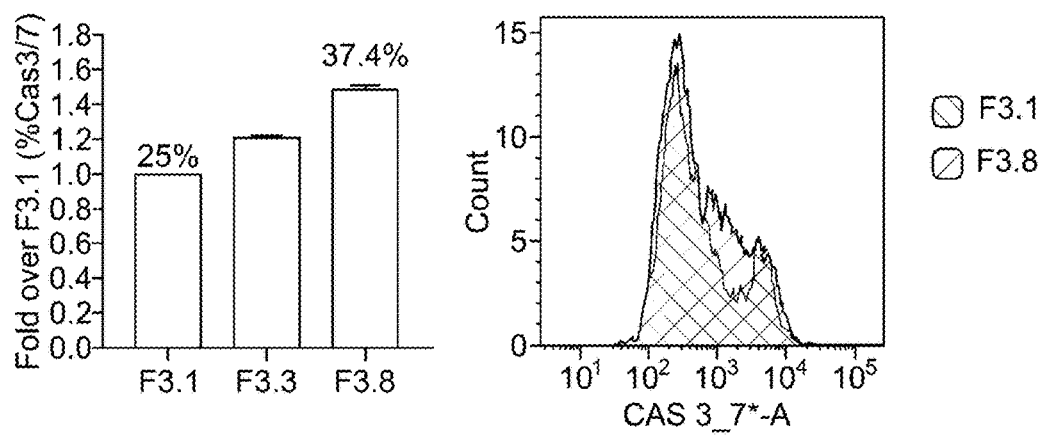
FIG. 7 shows the functional enrichment by exemplary methods provided herein of aptamer libraries for aptamers that induce apoptosis of the indicated cells. The bar graph on the left of each panel reflects the fold over increase of caspase-3/7 (Cas3/7) or mitochondrial membrane potential (DilC1 (5)) for each different round of functional enrichment. The histogram on the right of each panel shows an overlay of the enriched libraries of the first round (black) and final round (grey) of functional enrichment. With the exception of Kasumi-1, all results displayed were from functional enrichment initiated from the third round of Binding SELEX. Kasumi-1 results displayed were from functional enrichments initiated from a random library (not binding-enriched). Panel A shows results from HCT116 human colorectal cancer cell line. Panel B shows results from 4T1 murine breast cancer cell line. Panel C shows results from CT26 murine colorectal cancer cell line. Panel D shows results from Kasumi-1 human acute myeloid leukemia (AML) cell line. Panel E shows results from AML1 primary AML PBMCs from a donor. Panel F shows results from AML9 primary AML PBMCs from a donor. Panel G shows results from CLL1 primary chronic lymphocytic leukemia (CLL) PBMCs from a donor.
Figure 7:
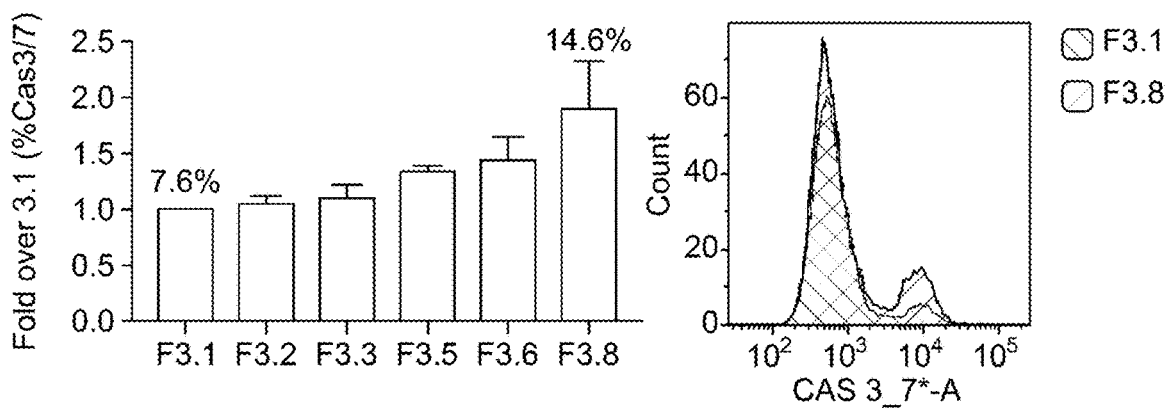
Figure 7:
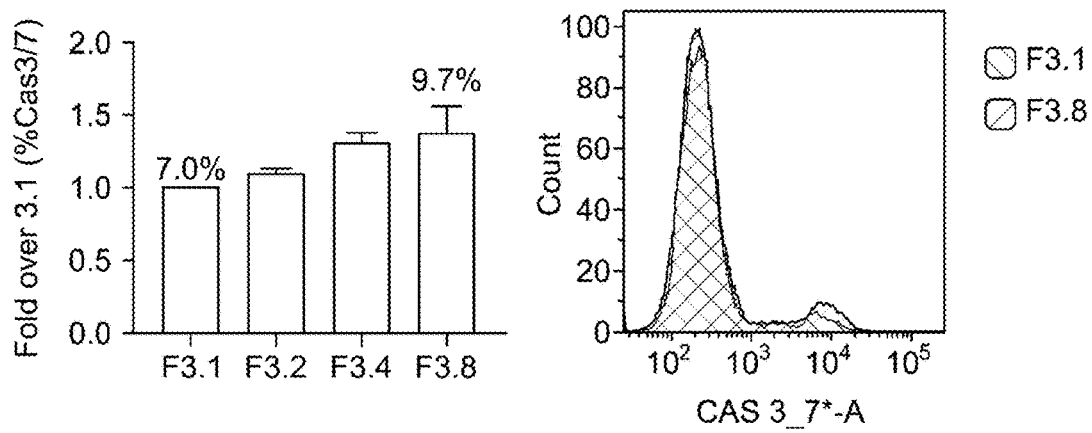
Figure 7:
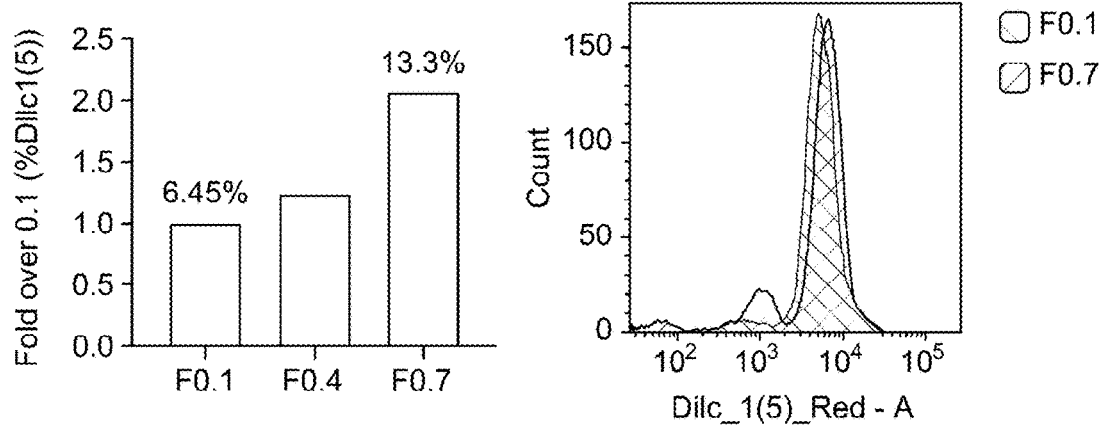
Figure 7:
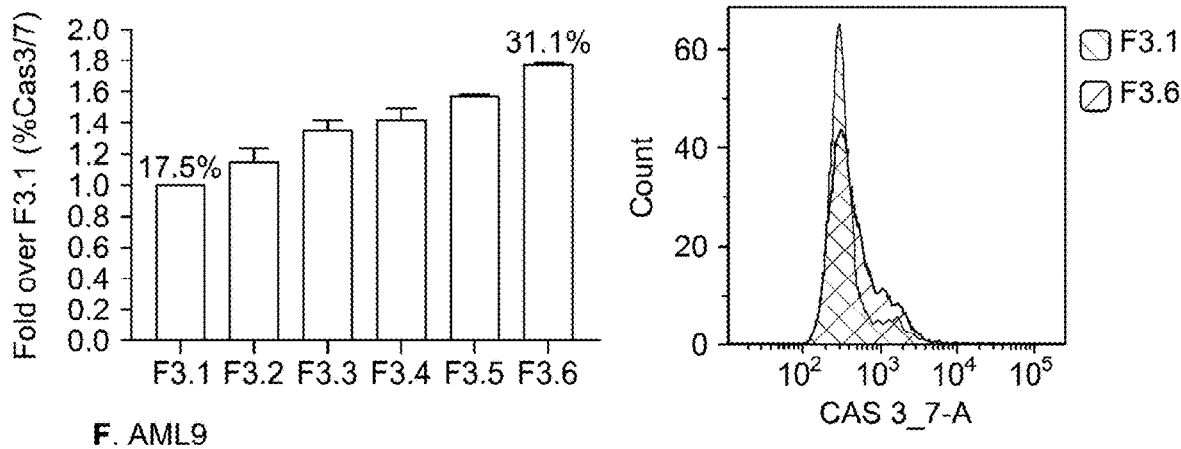
Figure 7:
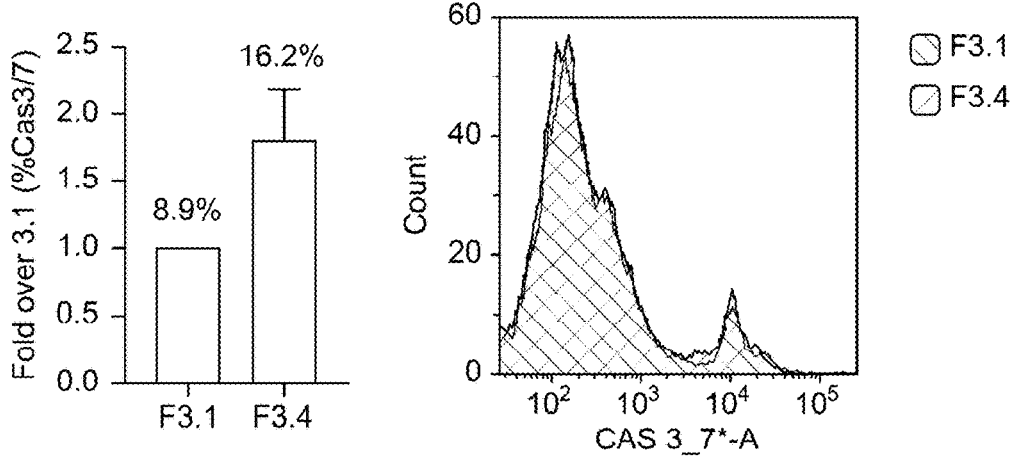
Figure 7:
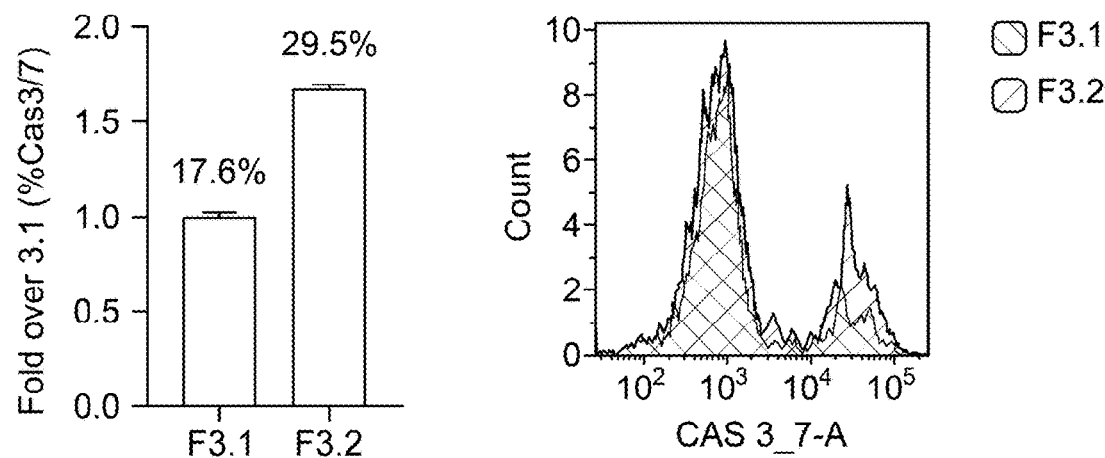

Functional enrichment is validated via a Functional Assay in which bead libraries from all/most Functional SELEX rounds are incubated with the target cell population and the apoptosis enrichment is compared across the different bead populations (FIG. 7). With the exception of Kasumi-1, all of the functional processes displayed were performed with Caspase3/7 as an apoptosis probe, and were initiated with a library which is enriched for binding, after three rounds of Binding SELEX. Kasumi-1 was performed with Mito-Probe™ DilC1 (5) mitochondrial membrane potential probe, and the initial functional library was random library (not binding-enriched).

A final round of Functional SELEX was carried out in which the final clustered microbead library was incubated with the positive target cells and then with negative counter selection cells. For human suspended cells (primary or cell lines), PBMCs from a healthy donor were used at negative counter selection cells. For human adherent cell lines, MCF10a cell line or PBMCs from a healthy donor were used at negative counter selection cells. For mouse adherent cell lines, freshly isolated splenocytes were used at negative counter selection cells. Positive events that appeared during counter selection were used to remove promiscuous functional leads during Illumina® next-generation sequencing analysis.

Figure 8:
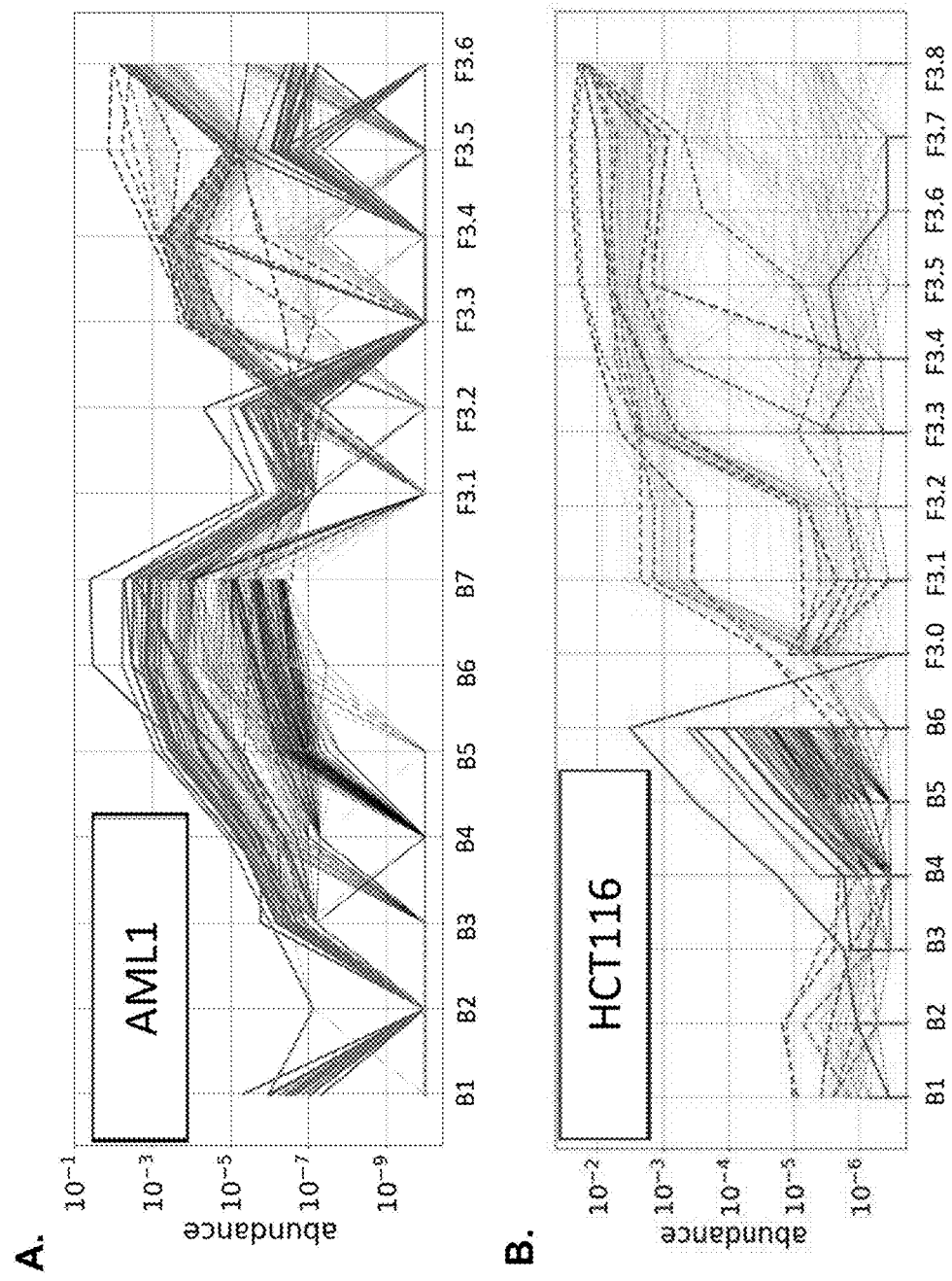
FIG. 8 shows Illumina® next-generation sequencing abundance profiles of aptamer enriched libraries from multiple rounds of Binding Cell-SELEX and functional enrichment. The x-axis shows the different selection rounds, where "B" corresponds to Binding Cell-SELEX rounds and "F"

Example 6—Comparison of Binding-Enriched Aptamer Libraries to Functionally-Enriched Aptamer Libraries Libraries from all Functional SELEX rounds generated above, including the negative events of each round and the positive events from the counter selection cells, were prepared for Illumina® next-generation sequencing. Sequencing was performed on Illumina® NextSeq® 500 sequencer using NextSeq® 500/550 High Output Kit. Sequencing abundance profiles compared aptamers of Binding Cell-SELEX rounds to aptamers of Functional Cell-SELEX rounds for selection carried out in AML1 primary human myeloblasts and HCT116 colorectal cancer cell line. Each SELEX process initiated with $10^{-6}$ log abundance and completed with 10 3 or $10^{-2}$ log abundance for the final enriched aptamer library. As seen in FIG. 8, for both tissue sources, there was very little intersection observed for the 10,000 most abundant aptamers between binding-enriched and functionally enriched libraries at the final SELEX round. There was also no intersection observed for the 10 most abundant aptamers between the binding-enriched and functionally enriched libraries at the final SELEX round.

Final enriched libraries from Binding SELEX were also compared to final enriched libraries of Functional SELEX for their caspase-3/7 activation ability after selection in AML1 and HCT116 tissue/cell sources. Binding-enriched libraries or functionally-enriched libraries were clustered onto microbeads and incubated with target cells for 2 h at 37° C. followed by incubation with caspase-3/7 probe. Percent of microbead-bound and caspase-3/7-positive cells were gated on and measured by flow cytometry. Functionally enriched libraries demonstrated an increase in caspase-3/7 activity. For AML1 target cells, round #7 of the binding-enriched library was compared to round #7 of the functionally-enriched library, and incubation with the functionally-enriched library showed a 1.5-fold increase in caspase-3/7 (FIG. 9, Panel A). For HCT116 target cells, round #7 of the binding-enriched library was compared to round #8 of the functionally-enriched library, and incubation with the functionally-enriched library showed a 2-fold increase in caspase-3/7 (FIG. 9, Panel B).

Example 7—Selection of Lead Aptamer Oligonucleotide Candidate and Functional Validation Functional enrichment of aptamers that mediate apoptosis of patient-derived xenograft (PDX)-derived triple negative breast cancer (TNBC) cells, termed TNBC9 (Example 8) was followed by selection of lead molecules. Based on sequencing analysis (FIG. 10, Panel A), the 10 most abundant sequences in the functionally enriched aptamer population were selected, synthesized, and folded. The sequences of the selected candidate aptamers are provided in Table 15.

TABLE 15

Sequences of candidate aptamers identified from pool of apatamers functionally enriched for induction of apoptosis of triple negative breast cancer cells.

| Aptamer | Seq ID No. | Sequence |
|---|---|---|
| E1 | 1 | TAAGGGTAGCAATGCGTTAGTCGCTTAAAATTCGATTTGCGCATAACACCTCAT |

TABLE 15-continued

Sequences of candidate aptamers identified from pool of
apatamers functionally enriched for induction
of apoptosis of triple negative breast cancer cells.

| Aptamer | Seq ID No. | Sequence |
|---|---|---|
| E2 | 2 | CACAAGGGCAGTACTCTCGAGATTAATGTGTACATGCACTCGCGAAATGTTGAG |
| E3 | 3 | TGCGTAGTATAACCGCTAATCAATCGTACAATGTAACCTTGACCGCACACGGCC |
| E4 | 4 | CACACAGCGACAGCATAGTCTCGTACTGGCTTAAAACATGAAGTTGCGATTAAT |
| E5 | 5 | AACACCGCTATCTATCGTCATGTCAGGCGTGTACTTGACTTACATCTATTGACC |
| E6 | 6 | ACATCACATTTGCCTGCGATCAAGCTAACACGCATGATACCATCATGATTAACC |
| E7 | 7 | TTGCTGCTCGGATCAGGCAAGACGCTACCCACAACTCGGTTTGTAAGACTACAC |
| E8 | 8 | CGGACTCACGCAAGAGCGTTTGGCAGTGTAAAACTGTTTAACGTATCTGCTCGC |
| E9 | 9 | ATTGCGAGATCACTATGTTTTAGTCTAGGCTAGCACGCTACTTGGGACTGTAGA |
| E10 | 10 | CACGACGAGATACCGTGGTCCTTTGGACGCGAATGTCATTTAGCACTTAGCATT |

The effectiveness of the selected candidate aptamers in target killing was measured on TNBC9 cells. Specifically, candidate aptamers were synthesized, folded, directly tested for induction of caspase-3/7 activation in TNBC9 cells. As seen in Panel B of FIG. 10, all of the selected candidate aptamers induced significant levels of apoptosis in these cells as compared to vehicle alone or random oligonucleotides.

Aptamer E8 was identified as the most effective of the selected aptamers at inducing apoptosis (FIG. 10, Panel B), and was selected for further analysis. Notably, the observed level of direct target killing by E8 in-vitro and ex-vivo ranged between ~20-40% in independent biological replicate experiments, which is comparable to the levels observed with approved anti-cancer biologicals. (See, e.g., Yamashita, M. et al. A novel method for evaluating anti-body-dependent cell-mediated cytotoxicity by flow cytometry using cryopreserved human peripheral blood mononuclear cells. *Sci. Rep.* 6, 19772 (2016); Romano, E. et al. Ipilimumab-dependent cell-mediated cytotoxicity of regulatory T cells ex vivo by nonclassical monocytes in melanoma patients. *Proc. Natl. Acad. Sci. U.S.A* 112, 6140-6145 (2015); Kumar, R. et al. PD-1 blockade restores impaired function of ex vivo expanded CD8 T cells and enhances apoptosis in mismatch repair deficient EpCAMPD-L1 cancer cells. *Onco. Targets. Ther.* 10, 3453-3465 (2017), each of which is hereby incorporated by reference.). E8 demonstrated remarkable selectivity at the target cell level, killing TNBC9 but not MCF10A cells, which were used as negative targets in the in-vitro evolution process (FIG. 10, Panel C). E8 was not exclusive to TNBC9 and showed a remarkable effect on MDA-MB-231 cells as well (FIG. 10, Panel D). In preparation for in-vivo testing, these effects were re-validated using E8 modified with poly-ethylene glycol (PEG), a modification that extends in-vivo stability and half-life of the oligonucleotide, demonstrating that the effect was retained with PEG (FIG. 10, Panel E). In addition, E8 retained function in mouse serum (FIG. 10, Panel F).

Example 8—Biodistribution and Efficacy of Lead Aptamer Candidate in an Animal Model The in-vivo biodistribution of aptamer E8 (described in Example 10) was determined using fluorescently-labeled E8. The E8 was labeled as previously described for aptamer in vivo imaging probes (Bouvier-Müller, A. & Ducongé, F. Application of aptamers for in vivo molecular imaging and theranostics. *Adv. Drug Deliv. Rev.* 134, 94-106 (2018); Kryza, D. et al. Ex Vivo and In Vivo Imaging and Biodistribution of Aptamers Targeting the Human Matrix Metal-loProtease-9 in Melanomas. *PLOS One* 11, e0149387 (2016); Théodorou, I. et al. In Vitro and In Vivo Imaging of Fluorescent Aptamers. *Methods Mol. Biol.* 1380, 135-150 (2016), each of which is hereby incorporated by reference in its entirety). The aptamer molecule was modified at the 5' with Cy5.5 and at the 3' with poly-ethylene glycol (PEG), a modification that extends the in-vivo stability and half-life of the oligonucleotide. The fluorescently-labeled E8 was injected intravenously in two doses (6 and 60 mg/kg) into NOD/SCID mice in which MDA-MB-231 tumors were induced on the right hind limb. Fluorescence was measure in-vivo at 0.1 h, 24 h, and 48 h after injection. The E8 lead aptamer candidate localized and was significantly retained in tumors at 24 hours and 48 hours post-injection (FIG. 11, Panels A-C). Specifically, E8 retention levels peaked at 1-3 h post-injection and then fall, but were still maintained up to 48 h post-injection.

Varying concentrations of E8 aptamer candidate were incubated with red blood cells and, separately, with PBMCs from healthy donors to ensure E8 administration is applicable in a clinical setting. No effects of blood agglutination or red blood cell hemolysis were measured. Only minor release of certain cytokines was detected after cytokine antibody array assay on PBMCs.

To evaluate the efficacy of E8 on tumor volume, the PEGylated aptamer was injected once every 2 days during the course of an 11-day period, at a dose of 100 mg/kg (equivalent in molar terms to standard chemotherapy). Over this 11-day period, tumor volumes decreased significantly in E8-treated animals compared to the vehicle-treated animals, where tumors extracted from E8-treated animals exhibited macroscopic signs of tissue death (final volumes on day 11: 168±39 vs 301±51 mm$^3$ in E8-treated animals and vehicle-treated ones, respectively) (FIG. 11, Panel D). Tumors extracted from E8-treated animals exhibited macroscopic signs of tissue death (FIG. 11, Panel E). Histochemical analysis of caspase-3 activity in tumor-derived tissue sections of vehicle-treated and E8-treated animals showed significant staining in tumors of E8-treated animals (FIG. 11, Panels F-I). TUNEL analysis, which measures apoptotic DNA fragmentation, additionally demonstrated the increase in cell death from tumor-derived tissue sections of E8-treated animals. No significant changes of physical appearance or body weight was observed following injection of E8 compared to the PBS control.

Example 9—Efficacy of Lead Aptamer Candidate in Human Ex-Vivo Organ Cultures (EVOC)

The efficacy of aptamer E8 (described in Example 10) was evaluated in human ex-vivo organ cultures (EVOC). EVOCs were freshly derived from two representative TNBC patients and were prepared by Curesponse. 250 μm wide tissue slices were plated onto a 24 well plate in culture medium at high oxygen conditions. Cancer cells of the primary tumor were kept viable for up to 14 days.

The E8 aptamer and other chemotherapies (palbociclib, everolimus, fulvestrant) were administered at concentrations of 20-50 μM to the EVOCs. Following day 1, sample medium was replaced and a second dose of the same concentration of therapies were administered. After 5 days, samples were fixed with 4% w/v paraformaldehyde and histological sections were prepared and stained with hematoxylin-eosin. Effects were graded by 2 blinded pathologists on a 0-4 scale. Pathological assessment showed that E8 candidate had a significant effect (grades 3-4 on a 0-4 scale) on tumor cells in EVOC samples derived from 2 patients that both showed resistance to at least one chemotherapy (FIG. 12).

INCORPORATION BY REFERENCE

All publications, patents, and patent applications mentioned herein are hereby incorporated by reference in their entirety as if each individual publication, patent or patent application was specifically and individually indicated to be incorporated by reference. In case of conflict, the present application, including any definitions herein, will control.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A method for generating a functionally enriched population of aptamers, the method comprising:
   (a) contacting target cells with a reporter of a cell function and a plurality of particles on which are immobilized a library of aptamer clusters ("aptamer cluster particles"), wherein at least a subset of the immobilized aptamer clusters bind to at least a subset of the target cells to form cell-aptamer cluster particle complexes;
   (b) incubating the cell-aptamer cluster particle complexes for a period of time sufficient for at least some of the target cells in the cell-aptamer cluster particle complexes to undergo the cell function;
   (c) detecting the cell-aptamer cluster particle complexes undergoing the cell function using the reporter of the cell function;
   (d) separating cell-aptamer cluster particle complexes comprising target cells undergoing the cell function detected in step (c) from other cell-aptamer cluster particle complexes; and
   (e) amplifying the aptamers in the separated cell-aptamer cluster particle complexes to generate a functionally enriched population of aptamers.

2. The method of claim 1, wherein steps (c) and (d) are performed using a flow cytometer.

3. The method of claim 1, further comprising step (f): (i) forming aptamer cluster particles from the functionally enriched population of aptamers of step (e); and (ii) repeating steps (a)-(e) using the newly formed aptamer cluster particles to generate a further functionally enriched population of aptamers.

4. The method of claim 3, wherein step (f) further comprises applying a restrictive condition in the successive rounds of enrichment, and wherein the restrictive condition is selected from: (i) reducing the total number of particles, (ii) reducing copy number of aptamers per particle, (iii) reducing the total number of target cells, (iv) reducing the incubation period, and (v) introducing errors to the aptamer sequences by amplifying the population of aptamers using error-prone polymerase.

5. The method of claim 1, further comprising a step of identifying the enriched population of aptamers via sequencing after the step (e).

6. The method of claim 1, further comprising the step of generating the aptamer cluster particles prior to step (a).

7. The method of claim 6, wherein the step of generating the aptamer cluster particles comprises:
   (1) immobilizing a plurality of aptamers from an aptamer library on particle surfaces; and
   (2) amplifying the plurality of immobilized aptamers locally on the particle surfaces to form the aptamer cluster particles.

8. The method of claim 1, wherein the aptamer clusters comprise aptamers comprising a region of conserved sequence and a region of randomized sequence.

9. The method of claim 8, wherein the region of conserved sequence is capped.

10. The method of claim 1, wherein the particles are selected from a polymer bead, an agarose bead, a polystyrene bead, an acrylamide bead, a solid core bead, a porous bead, a paramagnetic bead, glass bead, controlled pore bead, a microbead, and a nanoparticle.

11. The method of claim 1, wherein the library of aptamer clusters comprise aptamers that were previously selected via one or more processes selected from the group consisting of binding cell SELEX, negative SELEX, and in vitro evolution.

12. The method of claim 1, wherein the target cell is a prokaryotic cell.

13. The method of claim 1, wherein the target cell is a eukaryotic cell.

14. The method of claim 1, wherein the target cell is contacted with the reporter of the cell function prior to or after contacting the target cell with the aptamer cluster particles.

15. The method of claim 1, wherein the reporter of the cell function is a fluorescent dye, and wherein the fluorescent dye is a calcium sensitive dye, a cell tracer dye, a lipophilic dye, a cell proliferation dye, a cell cycle dye, a metabolite sensitive dye, a pH sensitive dye, a membrane potential sensitive dye, a mitochondrial membrane potential sensitive dye, or a redox potential dye.

16. The method of claim 1, wherein the reporter of the cell function is an activation associated marker, an oxidative stress reporter, an angiogenesis marker, an apoptosis marker, an autophagy marker, a cell viability marker, or a marker for ion concentrations.

17. The method of claim 1, wherein the cell function is cell viability, apoptosis, cell proliferation, gene expression, cell morphology, cellular activation, phosphorylation, calcium mobilization, degranulation, cellular migration, or cellular differentiation.

* * * * *